(12) United States Patent
Andreev et al.

(10) Patent No.: US 8,140,609 B2
(45) Date of Patent: Mar. 20, 2012

(54) CONGRUENCY AND SIMILARITY OF INFORMATION TECHNOLOGY (IT) STRUCTURES AND ASSOCIATED APPLICATIONS

(75) Inventors: Dmitry Andreev, Port Chester, NY (US); Paul Gregory Greenstein, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

(21) Appl. No.: 11/626,865

(22) Filed: Jan. 25, 2007

(65) Prior Publication Data

US 2008/0183782 A1 Jul. 31, 2008

(51) Int. Cl.
*G06F 15/16* (2006.01)
(52) U.S. Cl. ...................................... 709/200
(58) Field of Classification Search .......... 703/2; 705/7, 705/7.12, 348; 706/53; 708/200; 709/223, 709/224, 200, 220; 717/121
See application file for complete search history.

(56) References Cited

U.S. PATENT DOCUMENTS

| | | | |
|---|---|---|---|
| 5,960,200 A | 9/1999 | Eager et al. | |
| 6,031,984 A | 2/2000 | Walser | |
| 6,041,041 A | 3/2000 | Ramanathan et al. | |
| 6,151,582 A | 11/2000 | Huang et al. | |
| 6,161,101 A | 12/2000 | Guinta et al. | |
| 6,167,564 A | 12/2000 | Fontana et al. | |
| 6,249,769 B1 | 6/2001 | Ruffin et al. | |
| 6,256,773 B1 | 7/2001 | Bowman-Amuah | |
| 6,260,065 B1 | 7/2001 | Leiba et al. | |
| 6,621,505 B1 | 9/2003 | Beauchamp et al. | |
| 6,968,324 B1 * | 11/2005 | Ruffin et al. | 705/400 |
| 6,983,449 B2 | 1/2006 | Newman | |
| 7,143,420 B2 | 11/2006 | Radhakrishnan | |
| 7,162,427 B1 | 1/2007 | Myrick et al. | |
| 7,222,255 B1 | 5/2007 | Claessens et al. | |
| 7,224,968 B2 | 5/2007 | Dobson et al. | |
| 7,313,568 B2 | 12/2007 | Cutlip et al. | |
| 7,406,534 B2 | 7/2008 | Syvanne et al. | |
| 7,437,675 B2 | 10/2008 | Casati et al. | |
| 7,523,092 B2 | 4/2009 | Andreev et al. | |
| 7,523,190 B1 | 4/2009 | Bickerstaff et al. | |
| 7,568,022 B2 | 7/2009 | Andreev et al. | |

(Continued)

OTHER PUBLICATIONS

'Application Performance Management in Virtual Server Environments', Khanna, Department of Electrical and Computer Engineering, Purdue University, Oct. 23, 2006.*

(Continued)

*Primary Examiner* — Jerry Dennison
(74) *Attorney, Agent, or Firm* — Schmeiser, Olsen & Watts; William E. Schiesser

(57) ABSTRACT

A method and system for consolidating N elements of an enterprise IT structure that consists of L elements ($N \leq L$). All combinations of M elements of the N elements are generated ($M<N$). M is a specified positive integer of at least 1 and less than N. One or more pairs of combinations selected from all of the combinations are ascertained such that each ascertained pair consists of IT structures S1 and an IT structure S2 which are specifically congruent with respect to each other. Specifically congruent means composition congruent, topologically congruent, interface congruent, composition congruent and topologically congruent, composition congruent and interface congruent, topologically congruent and interface congruent, or fully congruent. At least one pair of combinations selected is consolidated. Consolidating each pair P reduces a goal function G that is a function of a total cost of ownership (TCO) of the enterprise IT structure.

30 Claims, 37 Drawing Sheets

U.S. PATENT DOCUMENTS

| | | | |
|---|---|---|---|
| 7,594,016 | B1 | 9/2009 | Zhou et al. |
| 7,797,739 | B2 | 9/2010 | Andreev et al. |
| 7,886,040 | B2 | 2/2011 | Andreev et al. |
| 7,937,462 | B2 | 5/2011 | Andreev et al. |
| 8,028,334 | B2 | 9/2011 | Andreev et al. |
| 2002/0069102 | A1 | 6/2002 | Vellante et al. |
| 2002/0104071 | A1 | 8/2002 | Charisius et al. |
| 2002/0129001 | A1 | 9/2002 | Levkoff et al. |
| 2002/0129345 | A1 | 9/2002 | Tilden |
| 2002/0194147 | A1 | 12/2002 | Ricke |
| 2002/0198727 | A1 | 12/2002 | Ann et al. |
| 2003/0140128 | A1 | 7/2003 | Cox et al. |
| 2003/0149685 | A1 | 8/2003 | Trossman et al. |
| 2003/0158842 | A1* | 8/2003 | Levy et al. ............... 707/3 |
| 2003/0172145 | A1* | 9/2003 | Nguyen ............... 709/223 |
| 2003/0197743 | A1 | 10/2003 | Hill et al. |
| 2004/0049295 | A1 | 3/2004 | Wojsznis et al. |
| 2004/0156391 | A1 | 8/2004 | Bushnell |
| 2004/0230464 | A1 | 11/2004 | Bliss, Jr. et al. |
| 2004/0267679 | A1 | 12/2004 | Fromherz et al. |
| 2005/0002380 | A1 | 1/2005 | Miller et al. |
| 2005/0027858 | A1 | 2/2005 | Sloth et al. |
| 2005/0049910 | A1 | 3/2005 | Lancaster et al. |
| 2005/0066015 | A1 | 3/2005 | Dandekar et al. |
| 2005/0165922 | A1* | 7/2005 | Hatano ............... 709/223 |
| 2005/0198486 | A1 | 9/2005 | Desmond et al. |
| 2006/0031472 | A1 | 2/2006 | Rajavelu et al. |
| 2006/0041935 | A1 | 2/2006 | Conley et al. |
| 2006/0123518 | A1 | 6/2006 | Olsen et al. |
| 2006/0125847 | A1 | 6/2006 | Andreev et al. |
| 2006/0129419 | A1 | 6/2006 | Flaxer et al. |
| 2006/0129518 | A1 | 6/2006 | Andreev et al. |
| 2006/0130133 | A1 | 6/2006 | Andreev et al. |
| 2006/0150143 | A1 | 7/2006 | Andreev et al. |
| 2006/0156274 | A1 | 7/2006 | Andreev et al. |
| 2006/0171538 | A1 | 8/2006 | Larson et al. |
| 2006/0248501 | A1 | 11/2006 | Andreev et al. |
| 2006/0271390 | A1 | 11/2006 | Rich et al. |
| 2006/0283938 | A1 | 12/2006 | Kumar et al. |
| 2007/0136676 | A1 | 6/2007 | Kruempelmann et al. |
| 2007/0289008 | A1 | 12/2007 | Andreev et al. |
| 2008/0077873 | A1 | 3/2008 | Peterson |
| 2008/0204452 | A1 | 8/2008 | Lau |
| 2009/0031234 | A1 | 1/2009 | McKay et al. |
| 2009/0204693 | A1 | 8/2009 | Andreev et al. |
| 2009/0287808 | A1 | 11/2009 | Andreev et al. |

OTHER PUBLICATIONS

Chou et al.; Guided simulated annealing method for optimization problems; The American Physical Society; Physical Review E 67, 066704 (2003); pp. 1-6.

Reliability and Availability Basics, Apr. 1, 2002, EventHelix; [online]. 5 pages [retrieved on Dec. 5, 2007]. Retrieved from the Internet: <http://web.archive.org/web/20020401235342/www.eventhelix.com/RealtimeMantra/FaultHandling/reliability_availability_basics.htm>.

System Reliability and Availability, Apr. 1, 2002, EventHelix; [online]. 4 pages.[retrieved on Dec. 5, 2007. Retrieved from the Internet: <http://web.archive.org/web/20020401235056/www.eventhelix.com/RealtimeMantra/FaultHandling/system_reliability_availability.htm>.

What is Optimization?; [online]. 3 pages.[retrieved on Jun. 11, 2008]. Retrieved from the Internet: <htty://www-fp.mcs.anl.gov/OTC/Guide/OptWeb/opt.html>.

Office Action (Mail Date May 27, 2008) for U.S. Appl. No. 11/011,449, filed Dec. 14, 2004; Confirmation No. 6365.

Final Office Action (Mail Date Dec. 3, 2008) for U.S. Appl. No. 11/011,449, filed Dec. 14, 2004; Confirmation No. 6365.

Office Action (Mail Date Dec. 14, 2007) for U.S. Appl. No. 11/263,498, filed Oct. 31, 2005; Confirmation No. 2739.

Final Office Action (Mail Date Jun. 25, 2008) for U.S. Appl. No. 11/263,498, filed Oct. 31, 2005; Confirmation No. 2739.

Notice of Allowance (Mail Date Dec. 19, 2008) for U.S. Appl. No. 11/263,498, filed Oct. 31, 2005; Confirmation No. 2739.

Office Action (Mail Date May 27, 2010) for U.S. Appl. No. 12/508,048, filed Jul. 23, 2009; Confirmation No. 7228.

Notice of Allowance (Mail Date Sep. 28, 2010) for U.S. Appl. No. 12/508,048, filed Jul. 23, 2009; Confirmation No. 7228.

Office Action (Mail Date Jun. 8, 2010) for U.S. Appl. No. 11/741,885, filed Apr. 30, 2007; Confirmation No. 3872.

Notice of Allowance (Mail Date Dec. 28, 2010) for U.S. Appl. No. 11/741,885, filed Apr. 30, 2007; Confirmation No. 3872.

Office Action (Mail Date Aug. 19, 2009) for U.S. Appl. No. 11/159,918, filed Jun. 23, 2005, Confirmation No. 4650.

Office Action (Mail Date Mar. 31, 2010) for U.S. Appl. No. 11/159,918, filed Jun. 23, 2005, Confirmation No. 4650.

Office Action (Mail Date Oct. 7, 2010) for U.S. Appl. No. 11/159,918, filed Jun. 23, 2005; Confirmation No. 4650.

Office Action (Mail Date Feb. 20, 2009) for U.S. Appl. No. 11/135,599; filed May 23, 2005; Confirmation No. 4050.

Final Office Action (Mail Date Jul. 2, 2009) for U.S. Appl. No. 11/135,599; filed May 23, 2005; Confirmation No. 4050.

Office Action (Mail Date Nov. 17, 2009) for U.S. Appl. No. 11/135,599, filed May 23, 2005; Confirmation No. 4050.

Notice of Allowance (Mail Date May 18, 2010) for U.S. Appl. No. 11/135,599, filed May 23, 2005; Confirmation No. 4050.

Office Action (Mail Date Sep. 15, 2010) for U.S. Appl. No. 12/424,698, filed Apr. 16, 2009; Confirmation No. 1059.

Office Action (Mail Date Feb. 25, 2011) for U.S. Appl. No. 12/424,698, filed Apr. 16, 2009, Confirmation No. 1059.

Office Action (Mail Date Oct. 15, 2009) for U.S. Appl. No. 11/120,678, filed May 3, 2005; Confirmation No. 3799.

Office Action (Mail Date Mar. 10, 2010) for U.S. Appl. No. 11/120,678, filed May 3, 2005; Confirmation No. 3799.

Final Office Action (Mail Date Sep. 9, 2010) for U.S. Appl. No. 11/120,678, filed May 3, 2005; Confirmation No. 3799.

Office Action (Mail Date Dec. 9, 2008) for U.S. Appl. No. 11/452,181, filed Jun. 13, 2006; Confirmation No. 2623.

Final Office Action (Mail Date May 18, 2009) for U.S. Appl. No. 11/452,181, filed Jun. 13, 2006; Confirmation No. 2623.

Notice of Allowance (Mail Date Mar. 24, 2009) for U.S. Appl. No. 11/060,007, filed Feb. 17, 2005;Confirmation No. 2527.

Notice of Allowance (Mail Date May 23, 2011) for U.S. Appl. No. 11/120,678, filed May 3, 2005; Confirmation No. 3799.

Advisory Action (Mail Date Feb. 13, 2009) for U. S. Appl. No. 11/011,449, filed Dec. 14, 2004, Confirmation No. 6365.

Mar. 2, 2009 Filed Notice of Appeal for U.S. Appl. No. 11/011,449, filed Dec. 14, 2004; Confirmation No. 6365.

Jun. 19, 2009 Filed Appeal Brief for U.S. Appl. No. 11/011,449, filed Dec. 14, 2004; Confirmation No. 6365.

Examiner's Answer to Appeal Brief (Mail Date Jul. 13, 2010) for U.S. Appl. No. 11/011,449, filed Dec. 14, 2004; Confirmation No. 6365.

Appeal Docketing Notice (Mail Date Oct. 26, 2010) for U.S. Appl. No. 11/011,449, filed Dec. 14, 2004; Confirmation No. 6365.

Advisory Action (Mail Date Nov. 9, 2009) for U.S. Appl. No. 11/452,181, filed Jun. 13, 2006; Confirmation No. 2623.

Nov. 16, 2009 Filed Notice of Appeal for U.S. Appl. No. 11/452,181, filed Jun. 13, 2006; Confirmation No. 2623.

Jan. 14, 2010 Filed Appeal Brief for U.S. Appl. No. 11/452,181, filed Jun. 13, 2006; Confirmation No. 2623.

Examiner's Answer to Appeal Brief (Mail Date Apr. 13, 2010) for U.S. Appl. No. 11/452,181, filed Jun. 13, 2006; Confirmation No. 2623.

Reply Brief Noted—BPAI (Mail Date Jun. 23, 2010) for Reply Brief filed Jun. 14, 2010 for U.S. Appl. No. 11/452,181, filed Jun. 13, 2006; Confirmation No. 2623.

Appeal Docketing Notice (Jul. 2, 2010) for U.S. Appl. No. 11/452,181, filed Jun. 13, 2006, Confirmation No. 2623.

Advisory Action (Mail Date Dec. 10, 2010) for U.S. Appl. No. 11/159,918, filed Jun. 23, 2005; Confirmation No. 4650.

Jan. 3, 2011 Filed Request for Continued Examination with Preliminary Amendment for U.S. Appl. No. 11/159,918, filed Jun. 23, 2005; Confirmation No. 4650.

Notice of Allowance (Mail Date Oct. 17, 2011) for U.S. Appl. No. 12/424,698; filed Apr. 16, 2009; Confirmation No. 1059.

* cited by examiner

IT ENTITIES setRelationship() Method addElement() Method deleteElement() Method setAvailable() Method ensureDependencies() METHOD

IT STRUCTURE COMPOSITION

IT DEVELOPMENT PROCESS

TRANSLATION OF IT STRUCTURE INSTANCE

ADJUSTING CHARACTERISTICS OF IT STRUCTURE INSTANCE

SELECTION OF SUBCLASS OF IT STRUCTURE

SELECTION OF TRANSLATION CANDIDATE

REVERSE SPECIFICATION

CLASS HIERARCHY EXAMPLE

DELIVERY BINDING

INITIAL IT STRUCTURE

| COMPONENT | MODEL | AVAILABILITY, % | AVERAGE RESPONSE TIME, MS | CPU, MHz | RAM, GB | SOFTWARE INSTALLED | | COMPONENT MONTHLY TCO, $ |
|---|---|---|---|---|---|---|---|---|
| | | | | | | SOFTWARE COMP | MONTHLY LICENSING COSTS, $ | |
| FIREWALL 1 | CATALYST 6500 | 99.9998 | 10 | | | | | 120 |
| FIREWALL 2 | CATALYST 6500 | 99.9998 | 10 | | | | | 120 |
| LOAD BALANCER 1 | ALTEON AD4 | 99.9998 | 12 | | | | | 120 |
| LOAD BALANCER 2 | ALTEON AD4 | 99.9998 | 12 | | | | | 120 |
| HTTP SERVER 1 | x345 | 99.0 | 100 | 2 x 1200 | 2 | IBM HTTP SERVER | 22 | 200 |
| HTTP SERVER 2 | x345 | 99.0 | 100 | 2 x 1200 | 2 | IBM HTTP SERVER | 22 | 200 |
| APP SERVER 1 | x440 | 99.0 | 800 | 4 x 1800 | 8 | WEBSPHERE APPLICATION SERVER | 50 | 410 |
| APP SERVER 2 | x440 | 99.0 | 800 | 4 x 1800 | 8 | WEBSPHERE APPLICATION SERVER | 50 | 410 |
| MESSAGING SERVER 1 | x345 | 99.0 | 100 | 2 x 1200 | 4 | WEBSPHERE MQ | 28 | 200 |
| MESSAGING SERVER 2 | x345 | 99.0 | 100 | 2 x 1200 | 4 | WEBSPHERE MQ | 28 | 200 |
| DATABASE SERVER 1 | x440 | 99.0 | 800 | 4 x 1800 | 16 | DB2 UDB | 82 | 450 |
| DATABASE SERVER 2 | x440 | 99.0 | 800 | 4 x 1800 | 16 | DB2 UDB | 82 | 450 |
| TOTAL: | | 100.0 | 1822 | | | | | 3000 |

*FIG. 33*

CONTROL PARAMETERS AND THEIR DOMAINS

|  | MODEL | AVAILABILITY, % | AVERAGE RESPONSE TIME, MS | CPU, MHz | RAM, GB | SOFTWARE INSTALLED | | COMPONENT MONTHLY TCO, $ |
|---|---|---|---|---|---|---|---|---|
|  |  |  |  |  |  | SOFTWARE COMP | MONTHLY LICENSING COSTS, $ |  |
| CONTROL PARAMETER, Y/N | Y |  |  | Y | Y | Y |  |  |
| DOMAIN | x342 x345 x440 p610 p620 |  |  | 1,2,4,8,16 CPU | 1,2,4,8,16 | NUMBER OF A SERVER WITHIN THE SAME SECURITY TIER OF THE IT STRUCTURE WHERE THE SOFTWARE COMPONENT IS RUNNING |  |  |

*FIG. 34*

OPTIMIZED IT STRUCTURE

| COMPONENT | MODEL | AVAILABILITY, % | AVERAGE RESPONSE TIME, MS | CPU, MHz | RAM, GB | SOFTWARE INSTALLED | | COMPONENT MONTHLY TCO, $ |
|---|---|---|---|---|---|---|---|---|
| | | | | | | SOFTWARE COMP | MONTHLY LICENSING COSTS, $ | |
| FIREWALL 1 | CATALYST 6500 | 99.9998 | 10 | | | | | 120 |
| LOAD BALANCER 1 | ALTEON AD4 | 99.9998 | 12 | | | | | 120 |
| APP SERVER 1 | x440 | 99.0 | 1800 | 2 x 1800 | 8 | WEBSPHERE APPLICATION SERVER | 50 | 360 |
| | | | | | | IBM HTTP SERVER | 22 | |
| APP SERVER 2 | x440 | 99.0 | 1800 | 2 x 1800 | 8 | WEBSPHERE APPLICATION SERVER | 50 | 360 |
| | | | | | | IBM HTTP SERVER | 22 | |
| MESSAGING SERVER 1 | x345 | 99.0 | 100 | 2 x 1200 | 4 | WEBSPHERE MQ | 28 | 200 |
| MESSAGING SERVER 2 | x345 | 99.0 | 100 | 2 x 1200 | 4 | WEBSPHERE MQ | 28 | 200 |
| DATABASE SERVER 1 | x440 | 99.0 | 800 | 4 x 1800 | 16 | DB2 UDB | 82 | 450 |
| DATABASE SERVER 2 | x440 | 99.0 | 800 | 4 x 1800 | 16 | DB2 UDB | 82 | 450 |
| TOTAL: | | 99.9996 | 3622 | | | | | 2260 |

*FIG. 35*

CONGRUENCY AND SIMILARITY OF INFORMATION TECHNOLOGY (IT) STRUCTURES AND ASSOCIATED APPLICATIONS

RELATED APPLICATION

The present patent application relates to: copending U.S. patent application Ser. No. 11/263,498, filed Oct. 31, 2005 and entitled "Optimization of Aspects of Information Technology Structures"; and to copending U.S. patent application Ser. No. 11/011,449, filed Dec. 14, 2004 and entitled "Automation of Information Technology System Development", both of which are incorporated herein by reference in their entirety.

BACKGROUND OF THE INVENTION

1. Technical Field

The present invention relates to a method and system for utilizing congruent and similar IT structures.

2. Related Art

A number of activities are associated with use of a computer. These activities may be grouped into several categories: development, deployment, operations and maintenance, and productive use. The category of development comprises determination of specific hardware, software, and networking required to satisfy the specific usage needs; planning of a production system.

The category of deployment comprises implementation of the developed production system, ranging from acquisition of the appropriate hardware and software to installation, configuration, and customization of acquired software, hardware and network devices, to verification of correctness of the built system.

The category of operations and maintenance comprises operation of the deployed production system and introduction of changes to it.

The category of productive use comprises application of the deployed production system to activities for which it is intended.

The preceding categories of activities are common to computing systems, be it a stand-alone personal computer, or a geographically dispersed collection of highly complex systems supporting an international corporation. The first three of the preceding categories of activities (i.e., development, deployment, operations) are a liability required in support of the last activity category of productive use of a computer system. While for a single stand-alone personal computer, development, deployment and operations may involve miniscule investment of time and/or money (with the exception of the acquisition of the necessary hardware and software), in large institutions, these preceding three activities occupy armies of technical and administrative personnel and entail high costs, primarily due to complexity of computer systems, exacerbated by constantly evolving technology and business requirements.

Thus, there is a need for a method and system to reduce costs pertaining to Information Technology (IT) development.

SUMMARY OF THE INVENTION

The present invention provides a method for consolidating N elements an enterprise Information Technology (IT) structure that consists of L elements, L being a positive integer of at least 2, N being a specified positive integer of at least 2 subject to N not exceeding L, said method comprising:

generating all combinations of M elements of the N elements, wherein M is a specified positive integer of at least 1 and less than N, each combination being an IT structure of the M elements that said each combination consists of;

ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent, topologically congruent, interface congruent, composition congruent and topologically congruent, composition congruent and interface congruent, topologically congruent and interface congruent, and fully congruent; and consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure.

The present invention provides a process for deploying computing infrastructure, said process comprising integrating computer-readable code into a computing system, wherein the code in combination with the computing system is capable of performing a method for consolidating N elements an enterprise Information Technology (IT) structure that consists of L elements, L being a positive integer of at least 2, N being a specified positive integer of at least 2 subject to N not exceeding L, said method comprising:

generating all combinations of M elements of the N elements, wherein M is a specified positive integer of at least 1 and less than N, each combination being an IT structure of the M elements that said each combination consists of;

ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent, topologically congruent, interface congruent, composition congruent and topologically congruent, composition congruent and interface congruent, topologically congruent and interface congruent, and fully congruent; and consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure.

The present invention provides a method and system to utilize congruent and similar IT structures.

BRIEF DESCRIPTION OF THE DRAWINGS

FIG. 33 is a table listing the initial IT structure of the example of FIG. 32, in accordance with embodiments of the present invention.

FIG. 34 is a table listing the control parameters of the example of FIG. 32, in accordance with embodiments of the present invention.

FIG. 35 is a table listing the optimized IT structure of the example of FIG. 32, in accordance with embodiments of the present invention.

DETAILED DESCRIPTION OF THE INVENTION

The detailed description of the present invention is organized into the following sections:
1. Nomenclature;
2. Information Technology (IT) Entity Model (defines basic IT entities and describes their properties and associated processes);
3. Optimization of Aspects of IT Structures;
4. Congruent and Similar IT Structures;
5. Computer System (describes computer system used to implement an IT Entity Model and associated processes)
1. Nomenclature
1.1 Flow Charts
The flow charts in the Figures comprise, inter alia, the following block shapes:
1) Rectangular: represents execution of code as described (e.g., FIG. 3, block 2202); and
2) Diamond: represents a decision block (e.g., FIG. 3, block 2203).
1.2 Abbreviations
The following abbreviations are utilized herein.
CASE—computer-aided software engineering
CICS—Customer Information Control System
CPU—central processor unit
DASD—direct access storage device
DB—database
DNS—domain name server
GB—gigabyte
GUI—graphical user interface
HTTP—HyperText Transfer Protocol
HTTPS—HTTP Secure
IDE—integrated development environment IP—internet protocol
IT—information technology
KB—kilobyte
KW—kilowatt
LAN—local-area network
LOC—lines of code
Mbps—megabits per second
MHz—mega-Hertz
MP—multi-processor
NIC—network interface card
NOOP—no operation (moot)
OS—operating system
PM—person/month
POTS—"plain old telephone service"
RAM—random-access memory
RISC—reduced instruction set computer
SL—service level
SMTP—Simple Mail Transfer Protocol
S/N—serial number
TCO—total cost of ownership
TCP/IP—transmission control protocol/internet protocol
UI—user interface
UML—universal modeling language
UP—uni-processor
UPS—uninterruptible power supply 2. Information Technology (IT) Entity Model IT systems and environments may be described in terms of IT entities. The term "entity" is understood to denote "IT entity" herein.

The base entity model comprises IT entities, relationships among the IT entities, and interfaces and methods provided by these IT entities.

For illustrative purposes, Java-like syntax is used herein as a specification language for IT structures. An IT structure is a set of IT entities. Generally, another programming language (e.g., object oriented, procedural, high- or low-level) may be used instead of Java.; a modeling language (e.g., UML) may be used instead of Java; and a specialized language could be defined and implemented solely for the purpose of definition of IT structures.

2.1 IT Entities

Figure 1:
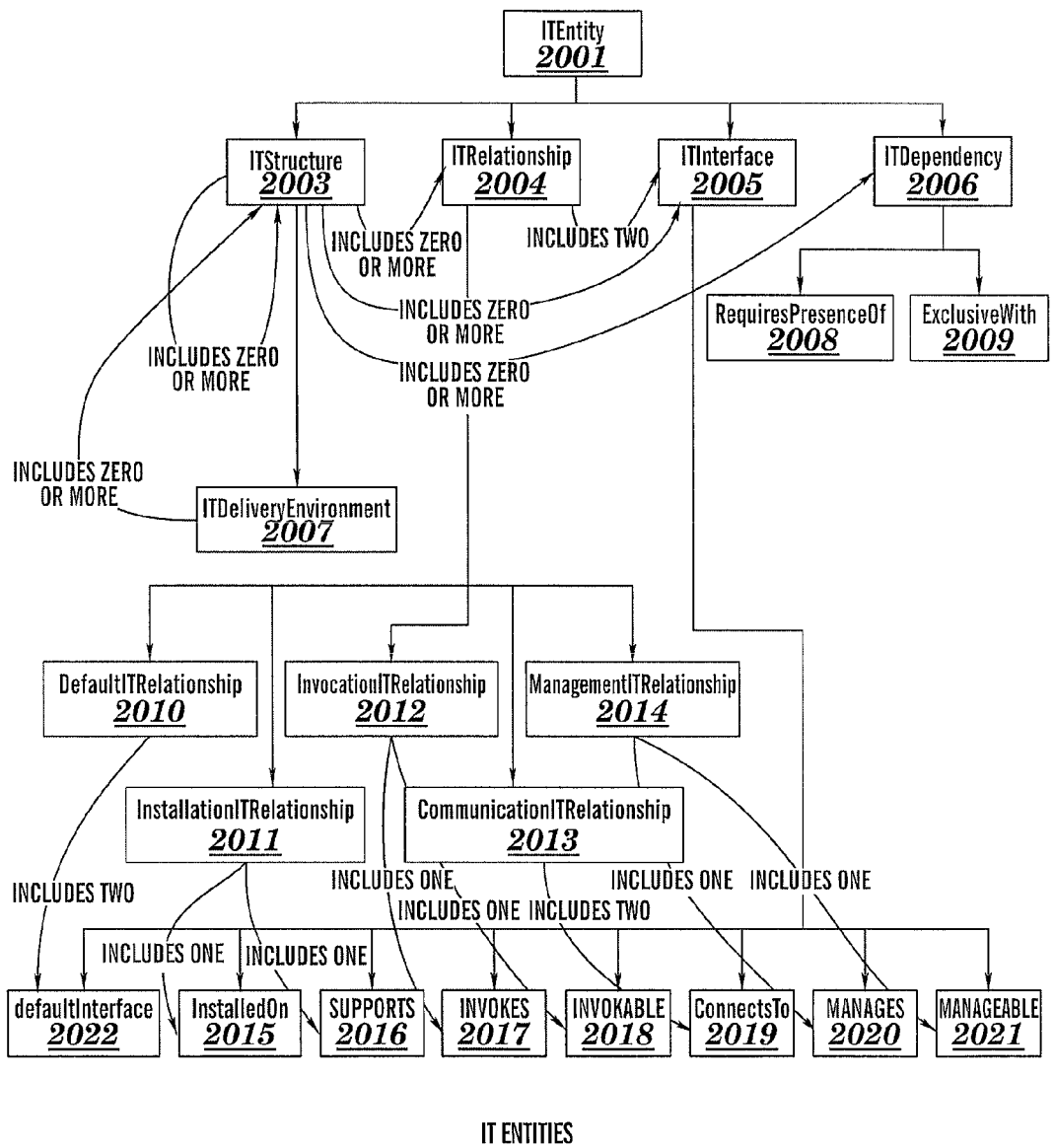
FIG. 1 is a diagram illustrating Information Technology (IT) entities included in the base entity model, and organized in a class hierarchy, in accordance with embodiments of the present invention.

FIG. 1 is a diagram illustrating IT entities included in the base entity model, and organized in a class hierarchy as shown in Table 1, in accordance with embodiments of the present invention.

TABLE 1

```
ITEntity 2001
    ITStructure 2003
        ITDeliveryEnvironment 2007
    ITInterface 2005
        defaultInterface 2022
        InstalledOn 2015
        Supports 2016
        Invokes 2017
        Invokable 2018
        ConnectsTo 2019
        Manages 2020
        Mangeable 2021
    ITRelationship 2004
        DefaultITRelationship 2010
        InstallationITRelationship 2011
        InvocationITRelationship 2012
        CommunicationITRelationship 2013
        ManagementITRelationship 2014
    ITDependency 2006
        RequiresPresenceOf 2008
        ExclusiveWith 2009
```

IT entities may be qualified as real, virtual, or abstract. A real IT entity has no undefined characteristic and may therefore be represented physically. A virtual IT entity has exactly one undefined characteristic and thus cannot have more than one undefined characteristic. An abstract IT entity has at least two undefined characteristics. Examples of real entities, virtual entities, and abstract entities will be presented infra. For convenience, class Type is introduced as follows:

Enumeration Type:=(abstract, virtual, real)

2.1.1 ITEntity Class

ITEntity class is introduced for convenience as a root class for the other IT entity classes listed above. ITEntity has the following methods:

1) constructor(String name [, Type type])—creates an instance of ITEntity with the specified name and of optionally specified type
2) boolean is Abstract( ), returns true if ITEntity is abstract, false otherwise
3) boolean is Virtual( ), returns true if ITEntity is virtual, false otherwise
4) boolean is Real( ), returns true if ITEntity is real, false otherwise
5) getName( )—returns ITEntity name
6) setType(Type type)—changes IT entity type as specified 2.2 IT Structures An IT structure is either a primitive IT structure or a complex IT structure.

A primitive IT structure is an IT entity representing materials or labor, indivisible within a particular view to a structural model, and a set of method associated with characteristics of the represented materials or labor.

A real primitive IT structure represents a specific single physical object or a specific unit of labor. Examples of real primitive IT structure include:

1) RS/6000 model F50 S/N 123456-AB. There is one and only one RS/6000 model F50 with this particular S/N.
2) Software product Ppppp version vvvvv license key 12345678-AB-9ABCD-XYZ.

A virtual primitive IT structure represents a class of specific physical objects. Examples of virtual primitive IT structure include:

1) RS/6000 model F50. Since no s/n is specified, there is a class of RS/6000 model F50 this virtual primitive IT structure corresponds to, and RS/6000 model F50 with any s/n belongs to this class.
2) Software product Ppppp version vvvvv.

An abstract primitive IT structure represents an abstract view of materials or labor. In this embodiment, abstract primitive IT structures include the same out-of-model IT entity, called abstractPrimitive. Other embodiment may have a multiplicity of abstract primitive out-of-model entities. Examples of abstract primitive IT structure include:

1) RS/6000. Since no model is specified, any RS/6000, including model F50, as well as any other models, belongs to this class.
2) Computer. Since no architecture, type, or any other characteristics are specified, any computer, including any model of RS/6000, belongs to this class.
3) Software product Ppppp.
4) Software product.

Primitive IT structures are indivisible only within a particular model. For example, a computer may be viewed as indivisible in the context of the model used in this embodiment. In a different embodiment, however, a different model may exist in which a computer may be represented as an IT structure (see discussion infra of a complex IT structure), comprising several primitive IT structures; e.g., the following collection of primitive IT structures: processor, memory, DASD, and network interface.

A complex IT structure is a non-empty collection of IT structures, a defined set of relationships (see below) among these IT structures, and a description of this IT structure's characteristics. Examples of a complex primitive IT structure include:
1) a personal computer
2) a network of Lotus Domino servers
3) a zSeries sysplex
4) a collection of programs running on a particular computer
5) a collection of software and hardware required to run Ariba Buyer application
6) a hosted application service
7) a professional service In the process of formation of an IT structure, values of properties of elements of this IT structure's composition (see below) may change; e.g., assignment of a name to a computer may be required to include that computer in an IT structure.

The set of relationships is imposed by a particular IT structure, rather than being intrinsic for the primitive IT structures comprising the IT structure. Thus, multiple complex IT structures may be created from the same set of primitive IT structures, and uniqueness of the assigned name (i.e., its inequality to any other computer name) may be imposed on a primitive IT structure representing a computer, included in a complex IT structure.

An IT structure composition is the list of IT structures included in a complex IT structure, or an out-of-model entity describing the entity represented by a primitive IT structure (e.g., a String, or a reference to a DB record).

An IT structure composition element is an IT entity included in an IT structure composition.

composition 2703 two other complex IT structures B 2704 and C 2705, and one abstract primitive IT structure D 2706. Complex IT structure B includes in its composition two primitive IT structures E 2708 and F 2709, and complex IT structure C includes in its composition two primitive IT structures, an abstract primitive IT structure G 2710, and a primitive IT structure H 2711. Both abstract primitive IT structures, D and H, represent the abstractPrimitive out-of-model entity 2712, while all other primitive IT structures represent respective non-abstract out-of-model entities 2713, 2714, 2715. The IT structure A primitive composition 2707 includes all primitive IT structures shown (and no complex IT structures), namely primitive IT structures E 2708, F 2709, G 2710, H 2711, and D 2706.

An abstract IT structure is an IT structure whose composition includes at least one abstract IT entity. Examples of an abstract IT structure include:
1) An abstract IT structure may include an Intel computer with a single 400 MHz Pentium processor, 1024 MB of main memory, 10 GB of DASD, and an Ethernet network interface; however, since no particular model of computer is specified, this IT structure would be abstract.
2) At a different (higher) level of abstraction, the same IT structure may include just a computer, without specification of its technology or characteristics.

A virtual IT structure is a non-abstract IT structure whose composition includes at least one virtual IT entity.

A real IT structure is a non-abstract and non-virtual IT structure.

From the above definitions, it follows that a real IT structure only includes real IT entities in its composition. From the above definitions, it also follows that in a real IT structure, each IT entity in its composition uniquely corresponds to a physical IT entity. Table 2 infra provides examples of IT structure composition.

TABLE 2

Examples of IT structure composition

| IT structure | Networking | Computers | Software | Labor |
| --- | --- | --- | --- | --- |
| Abstract IT structure with high degree of abstraction | network | computer | Ariba Buyer application | |
| Abstract IT structure with low degree of abstraction | TCP/IP network | platform | Ariba Buyer Application v7 | |
| Virtual IT structure | connectivity requirements | platform and associated parameters (memory, processor power, DASD space) | Ariba Buyer v7 for AIX on RS/6000 | installation and management |
| Delivery-bound IT structure | LAN segments with symbolic IP addresses | model | Ariba Buyer v7.02 for AIX on RS/6000 | specific installation activities; specific management activities |
| Real IT structure | LAN segments with real IP addresses | computer s/n specified | Ariba Buyer v7.02 for AIX on RS/6000, license # <lic. #> | skill level and quantity of labor by activity specified |

An IT structure primitive composition is the list of primitive IT structures included in an IT structure, where all complex IT structures are replaced with their respective primitive compositions.

Figure 8:
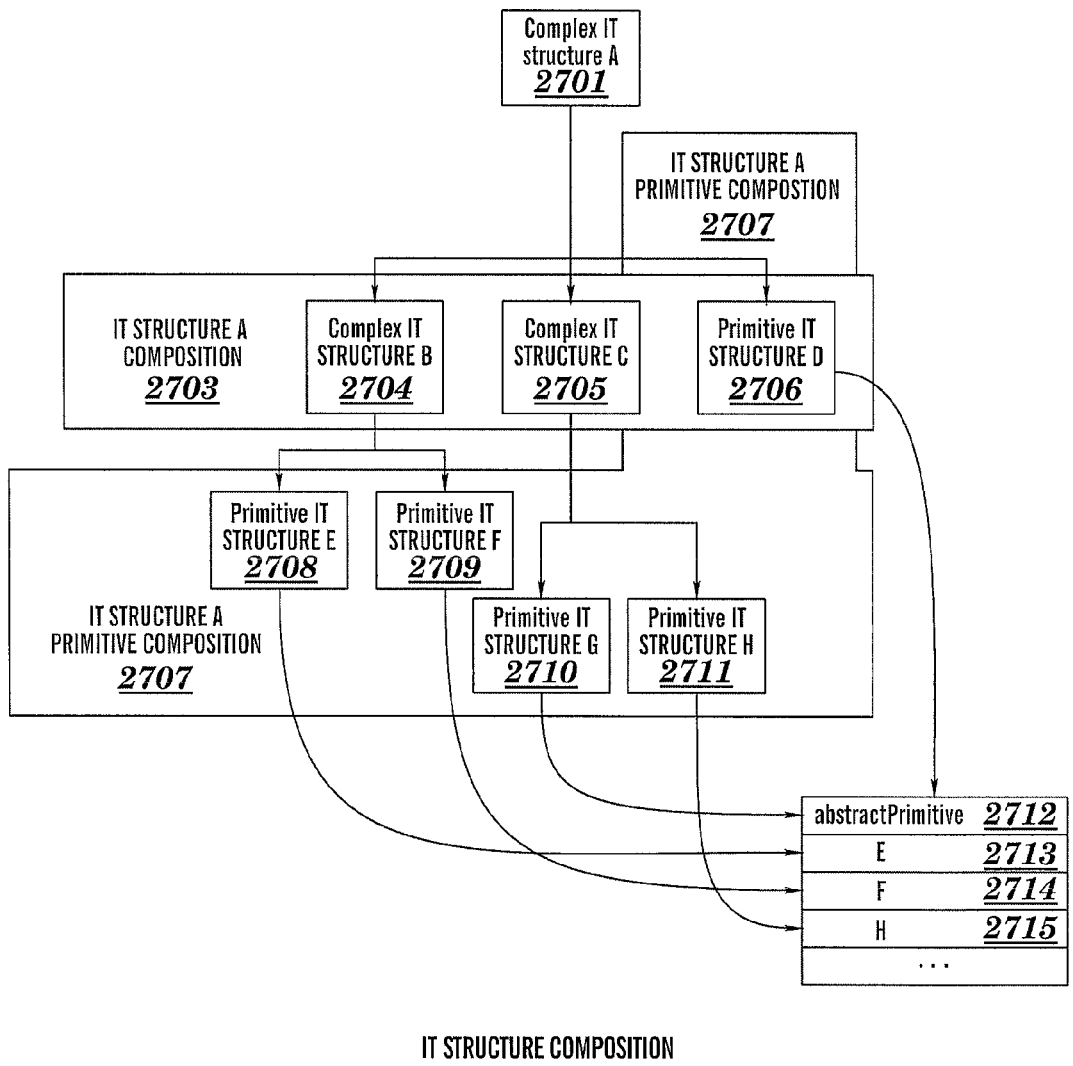
FIG. 8 is a diagram illustrating the concept of IT structure composition, in accordance with embodiments of the present invention.

FIG. 8 is a diagram illustrating the concept of IT structure composition, in accordance with embodiments of the present invention. A complex IT structure A 2701 includes in its An abstract IT structure with a high level of abstraction may be "an Ariba Buyer application running on a computer, connected to a network". The degree of abstraction can be lowered by restating the previous clause in more specific terms—"an Ariba Buyer application running on an RS/6000 computer, connected to a TCP/IP network".

The corresponding virtual IT structure may be "an Ariba Buyer version 7.0 for AIX on RS/6000 application, running on an AIX v5.0 operating system and RS/6000 model F50 computer with one 320 MHz CPU, 640 KB of main memory, and 128 GB of DASD in a single disk, connected through a 10 Gbps Ethernet LAN to a TCP/IP network—and—labor associated with installation and management of the above".

Once resolved into a delivery-bound IT structure, the previous IT structure may turn into something like "an Ariba Buyer version 7.0 path level 17.2 for AIX on RS/6000 application, running on an AIX v5.0 patch level 5.0.3.2 operating system and RS/6000 model F50-3745 computer with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above.

Once deployed in a data center, the corresponding real IT structure would be "an Ariba Buyer version 7.0 path level 17.2 for AIX on RS/6000 application, license #178215-04, running on an AIX v5.0 patch level 5.0.3.2 operating system, license #514ABC-AE, and RS/6000 model F50-3745 computer, s/n 6734-FWU, with one 320 MHz CPU, 640 KB of main memory, 128 GB of DASD in a single disk, and a NIC (network interface card), connected through a 10 Gbps Ethernet LAN to a TCP/IP network on a single segment with a symbolic IP address of a.b.c.d and specific installation and management activities associated with the above, including quantity of labor and level of skills for each.

A delivery-bound IT structure is a virtual IT structure ready for provisioning in a particular delivery environment (see below) with no additional input/sources of information. "In a particular delivery environment" means "at the level of detail required by the provisioning process of the delivery environment". For example, a delivery-bound IT structure may include a specification of 10/100 Mbps Ethernet card, without regard to the manufacturer of that card.

An operating IT structure instance is a collection of physical hardware, software, networking, and labor, resulting from deployment of a real IT structure.

2.2.1 ITStructure Class

An IT Structure is represented by a class ITStructure, which inherits from ITEntity class and has the following methods:

1) ITStructure(String name, String function, Vector functions, Vector operationalCharacteristics)—constructor
Note: Type is not specified for an ITStructure class—it is always derived based on ITStructure composition using the type definition as a rule.
2) Vector getFunctions( )—returns list of functions (String) supported by ITStructure (always non-null)
3) Vector setFunctions(Vector V)—adjusts IT structure for support of one or more functions whose names were previously returned by getFunction( ) method; the list V is a list of pairs (<function>,<value>), where <function> is one of the list returned by getFunction( ) method and <value> is the associated setting. The method returns an empty Vector if the method execution was successful, and a list of error messages otherwise. If an error occurs, the method has not altered the IT structure.
4) Vector getOperationalCharacteristics( )—returns a list of pairs of names (String) and values (String) of operational characteristics of this IT structure
5) Vector setOperationalCharacteristics(Vector V)—adjusts IT structure operational characteristics as specified by the input parameters. The input parameter is a list of pairs of (operational characteristic name (String), characteristic value), where operational characteristic name is one of the values returned by the getOperaitonalCharacteristics( ) method, and characteristic value is specific to the operational characteristic being modified. The list V corresponds to all of or a subset of the list returned by getOperationalCharacteristics( ) method. The method returns an empty Vector if the method execution was successful, and a list of error messages otherwise. If an error occurs, the method has not altered the IT structure.
6) Vector getResolutionValues( )—returns a list of pairs of names (String) and values (String) of abstraction resolution parameters of this IT structure
7) JavaClass resolve(Vector V), where V is Vector of pairs (String resolution_parameter, value)—returns a less abstract ITStructure instance, instantiated with the specified resolution parameters if execution was successful; returns a Vector of error messages if no resolution was possible (in which case the IT structure is left unmodified)
8) boolean isPrimitive( ) )—returns true if this IT structure is primitive
9) boolean isComplex( )—returns true if this IT structure is complex
10) Vector getComposition( )—for a complex IT structure, returns list of other IT structures comprising this IT structure; for a primitive IT structure, returns the list including the IT structure itself.
11) Vector getPrimitiveComposition( )—returns primitive composition Of an IT; returns the IT structure itself if invoked for a primitive IT structure.
12) Vector getInterfaces( )—returns the list of IT interfaces this IT structure possesses
13) Vector getExternalInterfaces( )—returns the list of IT interfaces this IT structure possesses, which are intended for establishing IT relationships with other IT structures (i.e., "external" to this IT structure), rather than with the elements or substructures within this IT structure
14) Vector getRelationships( )—returns a list of IT relationships elements of this IT structure's composition are involved in; returns an empty Vector if no IT relationships exist among elements of this IT structure's composition.
15) Vector getPrimitiveRelationships( )—returns a list of IT relationships elements of this IT structure's primitive composition are involved in; returns an empty Vector if no IT relationships exist among elements of primitive composition of this IT structure.
16) ITRelationship getRelationship(ITStructure A, ITStructure B)—returns the ITRelationship instance for relationship of IT structures A and B within the composition of this IT structure or null if IT structures A and B are not involved in an IT relationship
17) Vector setRelationship(ITStructure x, ITInterface xi, ITStructure y, ITInterface yi, Relationship r)—establishes the relationship r between IT structures x and y within the composition of this IT structure. Returns a null Vector if relationship was established successfully, and a Vector of error messages if relationship could not be established.
18) Vector setDependency({<add>|<remove>}, ITDependency x)—adds or removes the specified IT dependency to or from this IT structure. Returns a null Vector if dependency was added or removed successfully, and a Vector of error messages if dependency could not be added. Removal of an IT dependency is always successful. Addition of an IT dependency may fail if x contradicts an existing dependency—e.g., x indicates mutual exclusivity with IT structure Y and a dependency on presence of Y is already stated.

19) Vector getDependencies( )—returns a list of IT dependencies of this IT structure. The optional list of parameters D1 . . . Dn specify names of ITDependency subclasses to be returned by the getDependencies( ) method. If D1 . . . Dn are specified, only IT dependencies of subclasses with names D1 . . . Dn will be returned by the getDependencies( ) method.

19a) Vector getPrimitiveDependencies([String D1 [, D2 . . . [, Dn]]])—returns a list of IT dependencies among the elements of the IT structure primitive composition. The optional list of parameters D1 . . . Dn specify names of ITDependency subclasses to be returned by the getPrimitiveDependencies( ) method. If D1 . . . Dn are specified, only IT dependencies of subclasses with names D1 . . . Dn will be returned by the getPrimitiveDependencies( ) method.

20) Vector addElement(ITStructure A)—adds IT structure A to the composition of this IT structure. Returns a null Vector if addition was successful, and a Vector of error messages if addition failed. In order to ensure uniqueness of identifiers (computer names, network addresses) within IT structures, each identifier within IT structure A being added is prefixed with string A.getName( )+".". As a part of the addition process, addElement( ) method verifies that:

a. addition of IT structure A to the composition of this IT structure does not violate any IT dependencies for any IT structure already included in the composition of this IT structure b. addition of IT structure A to the composition of this IT structure does not violate any IT dependencies for IT structure A and ensures that IT dependencies of the IT structure being added are satisfied. Each added IT structure composition element's name is prefixed with the IT structure name to ensure uniqueness.

21) Vector ensureDependencies(ITStructure A)—ensures that IT dependencies of the class requiresPresenceOf of ITStructure A in the composition of this IT structure are satisfied. If processing is unsuccessful, a Vector of error message(s) is returned, otherwise, a null Vector is returned.

22) Vector deleteElement(ITStructure A [, <force>])—removes IT structure A from the composition of this IT structure. Returns a null Vector if removal was successful, and a Vector of error messages if removal failed. <force> indicates that A should be removed regardless of relationships with or dependencies on it by other elements of this IT structure's composition.

23) Vector setOptimizationFunctions(Vector F)— specifies a prioritized list (starting with the highest priority and ending with the lowest) of optimization classes (see Optimization) to be applied to this IT structure. Returns a null Vector if processing is successful, and a Vector of error messages otherwise.

24) Vector getOptimizationFunctions( )—returns the prioritized list of optimization classes to be applied to this IT structure.

25) Vector optimize( )—performs optimization of the IT structure using the specified prioritized list of optimization classes and applying each optimization function to the IT structure in turn, starting with the highest and ending with the lowest priority of optimization classes. Returns a Vector, containing the optimized IT structure as its first element if optimization was successful, and a list of error messages otherwise.

26) Vector setTargetITDeliveryEnvironments(Vector D)—specifies a list of target IT delivery environments (see below) for this IT structure. Returns a list of error messages if an error occurs (e.g., invalid specification of a target IT delivery environment), and a null Vector otherwise.

27) Vector getTargetITDeliveryEnvironments( )—returns the list of target IT delivery environments for this IT structure.

28) getID( )—returns a real IT structure's unique identifier; returns null if invoked for a non-real IT structure.

29) setID( )—sets real IT structure unique identifier; NOOP for a non-real IT structure.

30) Vector SLmaintenance(Vector V)—optional, supported for Autonomic IT System Improvement Cycle (see below); obtains a list of pairs of operational characteristics and associated values provided by monitoring facilities, and performs adjustment of the operational characteristics to sustain the SL. Returns a null Vector if processing is successful and a list of error messages if processing is unsuccessful.

31) Boolean is External( )—returns true if this IT structure is an external entity, and false otherwise. An external IT structure may be defined for completeness, and represents an IT structure outside the normal operational boundaries, yet which can engage in IT relationships. External IT structures are excluded from the sets of entities returned by getcomposition( ) or getPrimitiveComposition( ) methods of the ITStructure class, yet IT relationships can be established to them and will be included in the sets of entities returned by getRelationships( ) or getPrimitiveRelationships( ) methods of the ITStructure class. E.g., for an IT structure defining a server and network configuration for a Web service, a client (or a set of clients) connecting to the Web service through Internet may be defined as an external IT structure. External IT structures are exempt from error verification or optimization, and are ignored when an IT structure comparison is performed, or when a reverse-specification of an IT structure is performed. External IT structures are presumed to be outside of an IT delivery environment, and will not result in generation of real IT entities as a part of the translation or delivery binding processes.

32) Int getTCO( )—returns the Total Cost of Ownership (TCO) of an IT structure, as calculated or measured by the appropriate financial tracking system(s), expressed in monetary units (e.g., U.S. dollars) per time period (e.g., 1 year). Note that TCO only includes operations and maintenance (defect repair) costs, and does not include development and deployment costs.

2.2.2 Detailed Description of Non-Trivial Methods 2.2.2.1 SetFunctions

A composition of an IT structure instance and relationships among elements of its composition may depend on particular function(s) this IT structure instance is intended to perform. The purpose of this method is to perform the necessary adjustments within IT structure instance that tailor IT structure composition and relationships among composition's elements as appropriate. This method also performs enforcement of function-specific rules. The setFunctions( ) method is subclass-specific. Class ITStructure includes a placeholder that does nothing other than store the specified business function. ITStructure examples include:

1) IT structure X has three functions—A, B, C. However, these functions cannot be fulfilled indiscriminately (by their nature)—either A, or B and/or C, but not A and B, A and C, or A, B, and C can be supported by any instance of IT structure X. The setFunctions( ) method, when invoked, would ensure proper combination of functions requested from the instance of X, and prohibit improper modifications in the future.

2) Composition of instance of X may depend on the functions it performs. To perform function A, X may need to include an Intel server running Windows OS, an Oracle DB and a specific program package supporting function A. To perform functions B or C, X may need to include an RS/6000 server (whose power depends on whether only one of functions B and C, or both of these functions are supported), with a DB2 DB and specific program packages supporting functions B or C. So, the composition of X will be altered by the setFunctions( ) method appropriately, based on specification of functions.

2.2.2.2 SetOperationalCharacteristics

A composition of an IT structure instance and relationships among elements of its composition, given a particular set of functions supported by the IT structure instance, may depend on operational characteristics associated with support of particular functions. The purpose of this method is to perform the necessary adjustments within IT structure instance that tailor IT structure composition and relationships among composition's elements as appropriate. This method also performs enforcement of operational-characteristic-specific rules.

The setOperationalCharacteristics( ) method is subclass-specific. Class ITStructure includes a placeholder that does nothing other than store the specified operational characteristic values.

EXAMPLES

1) IT structure X function A potentially supports up to 500 users. Its response time depends on the power and amount of memory of the processor that runs function A and an increment in the number of supported users can be translated into a processor power and memory increments. An instance of X is created, whose requirement is to support up to 200 users. setOperationalCharacteristics(new Vector("users", 200)) can be used to specify that number and adjust the configuration of the Intel server supporting function A in the composition of instance of X to ensure it supports the required number of users.

2) Availability of IT structure X instance supporting function A may be 80% or 99.8%, depending on configuration of processors and software supporting function A. If a single set of hardware and software elements support function A, availability is 80%; if supporting hardware and software are duplicated and appropriate monitoring software is added to permit takeover between the two sets of hardware and software, availability is 99.8%. setOperationalCharacteristics(new Vector("availability", "high")) can be used to indicate that instance of X when supporting function A must provide 99.8% availability.

3) The above operational characteristics settings may be combined: setOperationalCharacteristics(new Vector(("users", 200), ("availability", "high")))

2.2.2.3 Resolve

A composition of an IT structure instance and relationships among elements of its composition, given a particular set of functions supported by the IT structure instance and given a particular set of operational characteristics associated with support of the particular set of functions, may depend on additional factors. A purpose of this method is to perform the necessary adjustments within IT structure instance that tailor IT structure composition and relationships among composition's elements as appropriate.

The resolve( ) method is subclass-specific. Class ITStructure includes a placeholder that does nothing other than store the specified resolution values.

Example: Two hardware and operating systems platforms exist that provide equivalent (both in terms of scale and cost) performance, permitting an instance of IT structure X to support the required number of users with equivalent operational characteristics for its function A. For example, the choice of either of the two hardware and operating system platforms for the composition of an instance of IT structure X providing function A will produce an equivalent result. Further, the delivery environment in which the instance of X will operate, support both combinations of hardware and operating system with equivalent costs and service levels. The resolve( ) method may be used to specify which of the two combinations of hardware and operating system platforms to use based on other factors. For example, IT developer's preference or similarity with hardware and operating system platforms of other IT structures involved in a solution.

Assume the two combinations of hardware and operating system platforms are (a) AIX on RS/6000 and (b) Linux on Intel. So, IT structure X may provide a resolution characteristic "platform preference" which may be specified as "AIX" or "Linux", resulting in the choice of (a) or (b) for the instance of IT structure X.

2.2.2.4 SetRelationship

Once an IT structure is added to the composition of the IT structure being developed, the developer may specify IT relationships between the added IT structure and other elements of the composition or primitive composition of the IT structure being developed.

Figure 2:
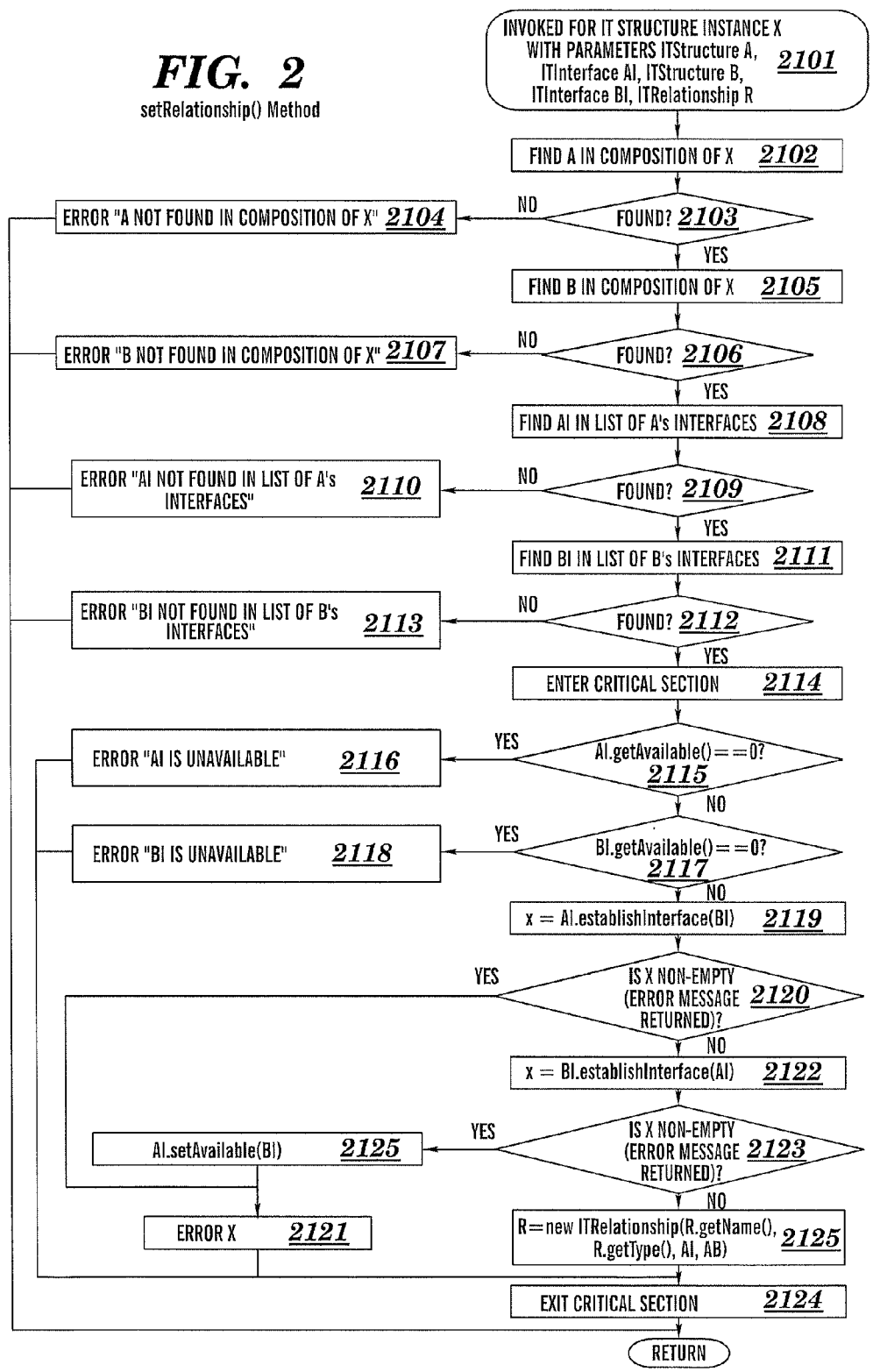
FIG. 2 is a flow chart depicting the logic of set Relationship( ) method, in accordance with embodiments of the present invention.

FIG. 2 is a flow chart depicting the logic of set Relationship( ) method, in accordance with embodiments of the present invention. The Vector setRelationship(ITStructure x, ITInterface xi, ITStructure y, ITInterface yi, Relationship r) establishes the relationship r between IT structures x and y within the composition of this IT structure. The setRelationship( ) method returns a null Vector if relationship was established successfully, and a Vector of error messages if relationship could not be established. The setRelationship( ) method for ITStructure instance X is invoked with parameters ITStructure A, ITInterface AI, ITStructure B, ITInterface BI, ITRelationship R 2101. The method attempts to find IT structure A in the composition of X 2102. If IT structure A is not found in the composition of X 2103, an error message is returned 2104 and processing terminates. The method then attempts to find IT structure B in the composition of X 2105. If IT structure B is not found in the composition of X 2106, an error message is returned 2107 and processing terminates. The method then proceeds to finding IT interface AI in the list of IT interfaces of IT structure instance A 2108. If AI is not found 2109, an error message is returned 2110 and processing terminates. The method then attempts to find IT interface BI in the list of IT interfaces of IT structure instance B 2111. If BI is not found 2112, an error message is returned 2113 and processing terminates.

Upon ascertaining presence of both specified IT structure instances A and B and IT interfaces AI and BI within A and B, the method execution enters a critical section 2114 which is used to serialize updates to the IT interface states. A critical section is a portion of the method which cannot be executed concurrently in a multi-threaded fashion, and entry to which must be serialized. No particular method of serialization for critical sections of programs is prescribed by this embodiment—known methods include (but are not limited to) semaphores, process queues, process locks, TS (Test and Set) instruction, CS (Compare and Swap) instruction.

The method then checks availability of IT interface AI by invoking the getAvailable( ) method of IT interface AI; if AI is unavailable 2115, an error message is returned 2116, previously entered critical section is exited 2124, and processing terminates. The method proceeds to checking availability of IT interface BI by invoking the getAvailable( ) method of IT interface BI; if BI is unavailable 2117, an error message is returned 2118, previously entered critical section is exited 2124, and processing terminates.

Upon ascertaining availability of both AI and BI interfaces, the method attempts to relate IT interfaces AI and BI. Vector x is allocated (not shown in the figure) to contain error message strings from attempts to establish the interface between AI and BI. The method attempts to update IT interface AI as interfacing with IT interface BI by invoking AI method establishInterface(BI), passing it BI as the parameter 2119. If an error occurs during the establishInterface(BI) method of AI invocation 2120, Vector x contains error messages, which are returned to the invoker of setRelationship( ) method of IT structure instance X 2121 upon exiting the critical section 2124. The method then attempts to update IT interface BI as interfacing with IT interface AI by invoking BI method establishInterface(AI), passing it AI as the parameter 2122. If an error occurs during the establishInterface(BI) method of AI invocation 2123, Vector x contains error messages, which are returned to the invoker of setRelationship( ) method of IT structure instance X 2121 upon exiting the critical section 2124, but only after the error cleanup is performed and the previously established update of IT interface AI is reversed by invoking its method setAvailable(BI) 2125.

If interface establishment was successful, IT relationship R is updated to contain the interface AI and BI 2125 prior to completion of method execution.

2.2.2.5 Addelement

Figure 3:
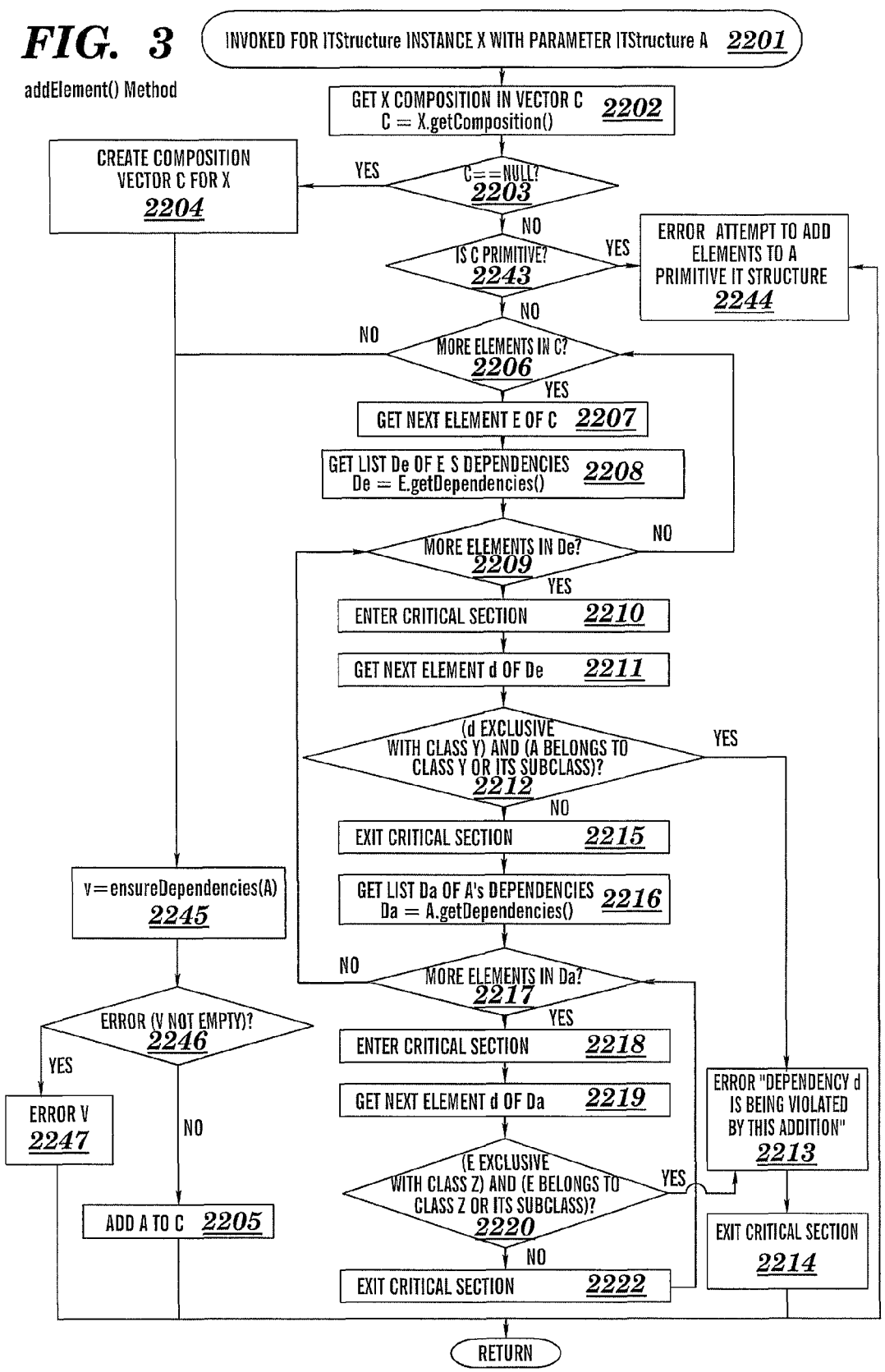
FIG. 3 is a flow chart depicting the logic of addElement( ) method, in accordance with embodiments of the present invention.

FIG. 3 is a flow chart depicting the logic of addElement( ) method, in accordance with embodiments of the present invention. The Vector addElement(ITStructure A) method adds IT structure A to the composition of IT structure X. The IT structures A and X may each independently be an abstract IT structure, a virtual IT structure, or a real IT structure. However, the resulting IT structure will have the highest degree of abstraction of that of X and A. For example, if X is abstract the result will be abstract even if A is not abstract, and if A is abstract the result will be abstract even if X is not abstract. As another example, if either X or A is virtual, and both X and A are not abstract, the result will be virtual.

The addElement( ) method returns a null Vector if addition was successful, and a Vector of error messages if addition failed. The addElement( ) method of ITStructure instance X is invoked with parameter ITStructure A, referencing the ITStructure instance to be added to X's composition 2201. The method retrieves composition of X as a Vector C 2202. If C is null (there are no composition elements for X) 2203, this is the addition of the first element, and no additional checks are necessary. The method creates a composition Vector C for X 2204, adds ITStructure A to C 2205, and returns.

If ITStructure X is a primitive IT structure (X.isPrimitive( )==true) 2243, an error message is stored 2244 and processing terminates.

If ITStructure X already has non-empty composition 2203, the method iterates through X's composition elements making sure no IT dependencies of either X or A are violated by the addition of A to X. While there are elements in C 2206, the next unprocessed element E of C is obtained 2207, and its list of IT dependencies De is extracted using the getDependencies( ) method of E 2208.

While there are unprocessed elements in De (list of IT dependencies of ITStructure E) 2209, the following is performed. A critical section is entered 2210. The next element d of De is obtained 2211. If d (which belongs to the class ITDependency) indicates exclusion with class Y and IT structure A belongs to class Y or its subclass 2212, an error message is stored 2213, and upon exiting from the critical section 2214, processing terminates. Otherwise, critical section is exited 2215.

The method execution then proceeds to obtaining the list Da of IT dependencies of A using the getDependencies( ) method of A 2216. While there are unprocessed elements in Da (list of IT dependencies of ITStructure A) 2217, the following is performed. A critical section is entered 2218. The next element d of Da is obtained 2219. If d (which belongs to the class ITDependency) indicates exclusion with class Z and IT structure E belongs to class Z or its subclass 2220, an error message is stored 2213, and upon exiting from the critical section 2214, processing terminates. Otherwise, critical section is exited 2222.

When all possible combinations of potential dependencies of IT structure A and all elements of the composition of X are exhausted, and no violation has been found, the add Element( ) method invokes method ensureDependencies(A) 2245 to ensure that any of A's IT dependencies of the class requiresPresenceOf are satisfied. If ensureDependencies( ) method's processing was not successful 2246, any error messages returned by the ensureDependencies( ) method's invocation are returned, otherwise, A is added to the composition A is added to the composition C of IT structure X 2205.

2.2.2.6 EnsureDependencies

Figure 7:
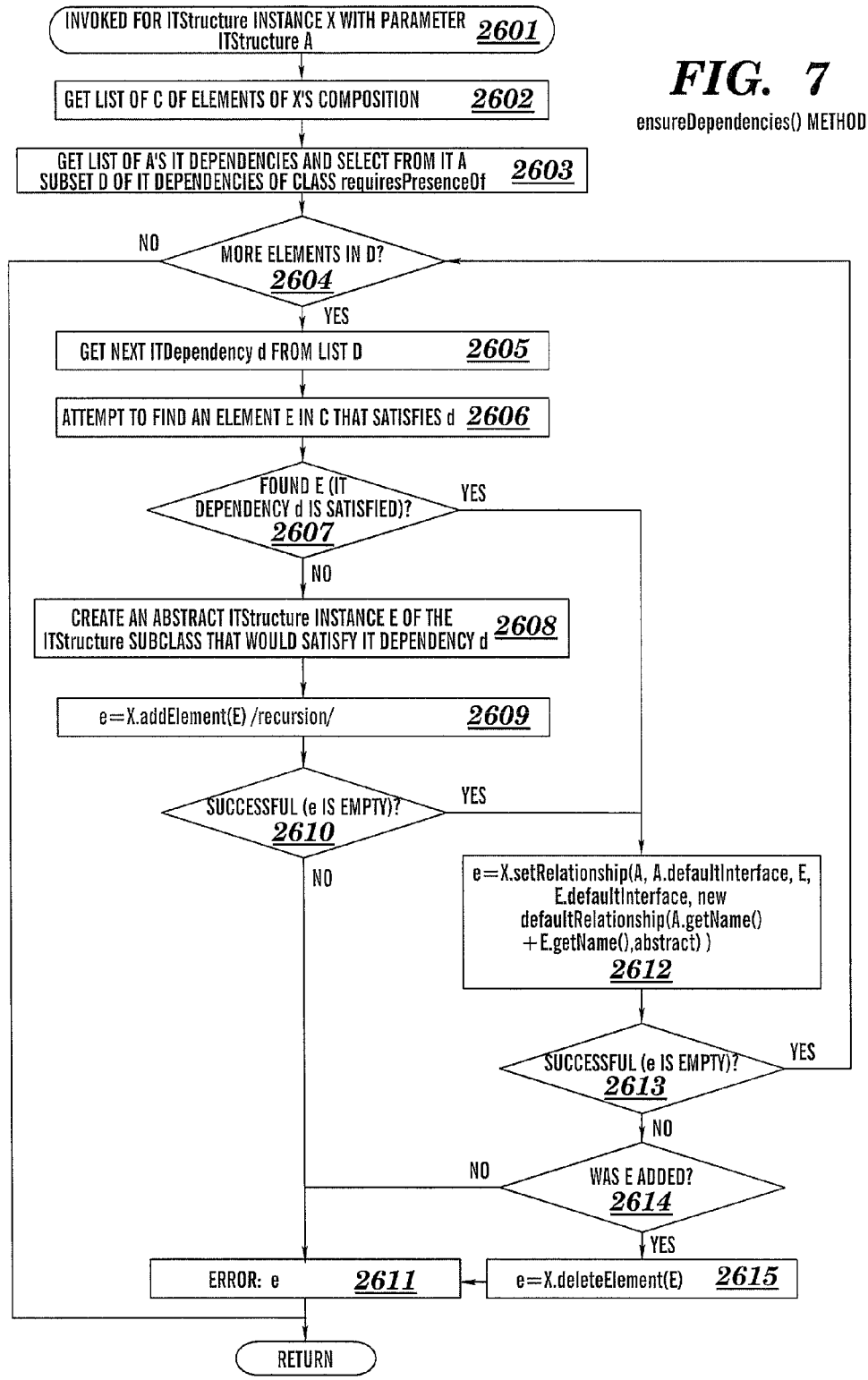
FIG. 7 is a flow chart depicting the logic of ensureDependencies( ) method, in accordance with embodiments of the present invention.

FIG. 7 is a flow chart depicting the logic of ensureDependencies( ) method, in accordance with embodiments of the present invention. The ensureDependencies(ITStructure A) method ensures that IT dependencies of the class requiresPresenceOf of ITStructure A in the composition of this IT structure are satisfied. If processing is unsuccessful, a Vector of error message(s) is returned, otherwise, a null Vector is returned. The ensureDependencies( ) method is invoked for IT structure instance X with parameter ITStructure A 2601. The method retrieves composition of X as Vector C 2602 and the list of A's IT dependencies, from which it selects a subset (list D) of IT dependencies of class requiresPresenceOf 2603. The method then iterates through list D of IT dependencies of class requiresPresenceOf of IT structure A, until the end of the list is reached 2604. Each element d of list D is an IT dependency d of class requiresPresenceOf. The method retrieves the next element d from the list 2605 and attempts to find an element of C (IT structure X composition) that satisfies the IT dependency d 2606. If an element E of C satisfying IT dependency d is found 2607, IT dependency d is considered to be satisfied.

ensureDependencies( ) method then creates an abstract IT structure E of ITStructure subclass that satisfies IT dependency d 2608 and attempts to add E to the composition of IT structure X using a recursive invocation of X.addElement(E) 2609. If execution of X.addElement(E) failed (i.e., E could not be added to X's composition—e.g., because it is exclusive with some element of X's composition) 2610, any error messages returned by X.addElement(E) are returned 2611 and processing terminates. Otherwise, addition of E to X's composition was successful, IT dependency d is now considered to be satisfied.

An abstract IT relationship (defaultRelationship) between E (either found in the composition C of IT structure X, or newly created) and A using defaultInterface of both is created and added to IT structure X) 2612. If establishment of the IT relationship was unsuccessful 2613, error message(s) are returned to the invoker 2611. If E was newly added 2614, it is removed 2615 to maintain the composition of IT structure X unchanged.

If establishment of the new IT relationship was successful 2613, the next element d of A's dependencies is considered.

2.2.2.7 DeleteElement

Figure 4:
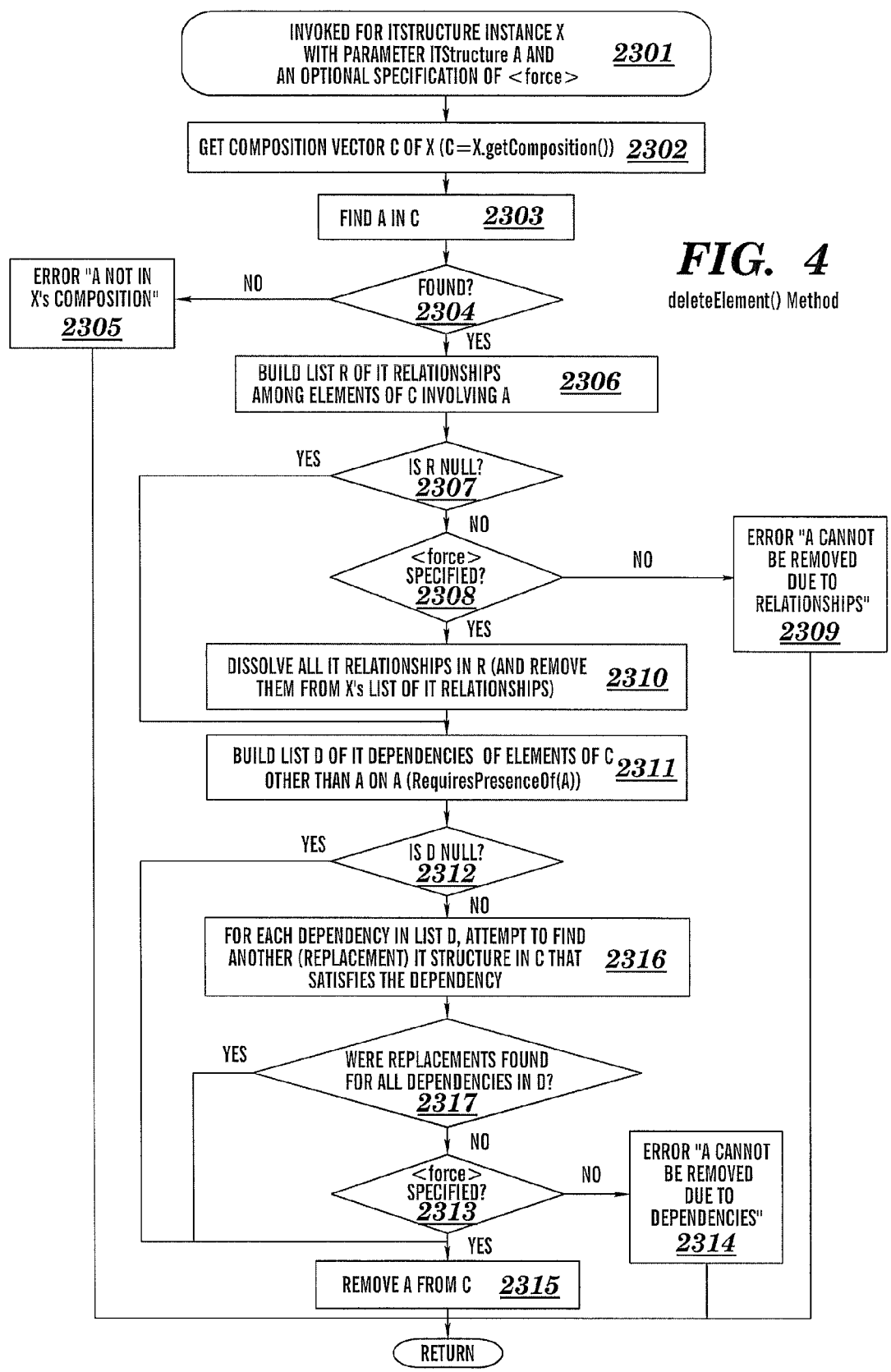
FIG. 4 is a flow chart depicting the logic of delete Element( ) method, in accordance with embodiments of the present invention.

FIG. 4 is a flow chart depicting the logic of delete Element( ) method, in accordance with embodiments of the present invention. The deleteElement(ITStructure A [, <force>]) method removes IT structure A from the composition of this IT structure. Returns a null Vector if removal was successful, and a Vector of error messages if removal failed. <force> indicates that A should be removed regardless of relationships with or dependencies on it by other elements of this IT structure's composition. In a first embodiment the <force> option is available for being selected, and in a second embodiment the <force> option is not available for being selected. Thus, the <force> option may not be specified because: (1) the <force> option is not available for being selected or (2) the <force> option is available for being selected but was not selected. The deleteElement( ) method is invoked for IT structure instance X with parameter ITStructure A and an optional specification of <force> 2301. The method retrieves composition of X as Vector C 2302 and attempts to find IT structure A in C 2303. If A is not found in C 2304, an error message is stored 2305 and processing terminates. Otherwise, the method proceeds through the attempt to remove A from C.

The method builds the list R of IT relationships of elements of C that involve A 2306. If R is not null (i.e., A is involved in IT relationships with at least one other element of composition of X) 2307, the method checks whether the <force> option was specified 2308, and if not, A cannot be removed from the composition of X, an error message is stored 2309, and processing terminates. If, however, <force> was specified, the method removes all IT relationships in the list R and removes them from the list of IT relationships of elements of C 2310.

The method then proceeds to check IT dependencies involving A. The method builds a list D of all dependencies of elements of C other than A itself on A 2311. If the list D is not null 2312, for each dependency in list D, the method attempts to find an element in C other than A that would satisfy the dependency 2316. If replacements were not found for any dependencies in list D 2317, the method checks whether the <force> option was specified 2313, and if not, A cannot be removed from the composition of X, an error message is stored 2314, and processing terminates.

Otherwise, if all previous checks indicate that removal of A will not damage IT structure X, or if the <force> option specification overrides the possible damage, the method removes A from C 2315.

2.3 IT Interfaces

An IT Interface is a characteristic of an IT structure, specifying a type of relationship this IT structure can engage in relative to other IT structures.

An abstract IT interface instance is an IT interface instance involving at least one abstract IT structure.

A virtual IT interface instance is a non-abstract IT interface instance involving at least one virtual IT structure.

A real IT interface instance is an IT interface instance involving only real IT structures.

A multi-connection IT interface is an IT interface to which multiple IT structures can relate (connect). For example, multiple invokers can call a single program—sometimes, concurrently.

A single-connection IT interface is an IT interface to which a single IT structure can relate (connect). For example, only a single cable can be plugged into a single printer port of a personal computer.

An available IT interface is an IT interface to which one or more IT structures can relate (connect).

A busy or Unavailable IT interface is an IT interface which has exhausted its ability to relate, and cannot be involved in any additional relationships (i.e., the maximum number of relationships have already been established). For example, a printer port of a personal computer is available if nothing is connected to it, and busy/unavailable if a printer cable is plugged into it.

2.3.1 ITInterface Class

An ITInterface class inherits from ITEntity class and has the following methods:
1) ITInterface(String name, Type type)—constructor, creates an ITInterface instance with specified name and type
2) boolean is SingleConnection( )—returns true if this ITInterface is a single-connection IT interface, and false otherwise
3) boolean isAvailable([int p])—returns true if ITInterface is available, false otherwise; optional parameter p indicates the specific connection for a multi-connection interface
4) setAvailable([ITInterface i])—makes ITInterface available; an ITInterface parameter i may be specified for multi-connection IT interfaces to indicate which of the multiple connections is to be made available
5) Vector establishInterface(ITInterface i [, int p])—establishes an interface with the parameter IT interface; returns an empty Vector if interface was established successfully, and a list of error messages otherwise. For a multiple-connection IT interface, may be optionally provided with the second parameter p specifying the connection.
6) int getAvailable( )—for multi-connection IT interfaces returns the number of available connections; always returns zero (unavailable) or one (available) for single-connection IT interfaces; always returns "high integer" for multi-connection IT interfaces with unlimited number of connections
7) int getRelated( )—returns the number of ITInterface instances related to this ITInterface
8) Vector getRelatedITInterfaces( )—returns a list of zero or more ITInterface instances related to this ITInterface
9) Vector verifyValidity(ITInterface Y)—returns null Vector if a connection between this IT interface instance and IT interface instance Y would be valid—i.e., the ITInterface subclass of this instance correlates with the ITInterface subclass of ITInterface instance Y; returns a Vector containing error message(s) if subclasses of X and Y do not correlate.

Note that the verifyValidity( ) method is a NOOP in the ITInterface class—each subclass of ITInterface, with the exception of DefaultInterface, overrides this method with the appropriate logic. Also note that an ITInterface cannot be instantiated—only ITInterface subclasses have practical uses.

2.3.2 ITInterface Subclasses

A number of different interfaces may exist among IT structures. Each IT structure, by definition, includes the DefaultInterface, which is used to establish relationships not involving real interfaces, such as "requires presence of . . . to install". DefaultInterface supports any relationships.

Other ITInterface subclasses are ("correlates" in this context means "can only be related to"):

InstalledOn(<single>)—IT structure is installed using this interface (correlates with Supports)

Supports({<single>|<multiple>})—IT structure(s) can be installed on this interface (correlates with InstallsOn)

ConnectsTo(<connection type>, {<single>|<multiple>})—can connect to IT structure(s) using <connection type>, correlates with ConnectsTo where:

<connection type>::={<direct>|<network>|<messaging>|<other>}

Invokes(<invocation type>, <single>)—can invoke IT structure using <invocation type>, correlates with Invokable Invocable(<invocation type>, {<single>|<multiple>})—can be invoked by IT structure(s) using <invocation type>, correlates with Invokes where:
<invocation type>::={<direct>|<interrupt>|<other>}
   Manages({<single>1<multiple>})—is managing IT structure(s), correlates with Manageable
   Manageable(<single>)—is managed by IT structure, correlates with Manages Table 3 shows valid ITInterface subclass correlations, wherein "yes" denotes a pair of correlated IT interfaces.

TABLE 3

Interface correlations

| | Default Interface | Installed On | Supports | Connects To | Invokes | Invocable | Manages | Manageable |
|---|---|---|---|---|---|---|---|---|
| DefaultInterface | yes | yes | yes | yes | yes | yes | yes | yes |
| InstalledOn | yes | | yes | | | | | |
| Supports | yes | yes | | | | | | |
| ConnectsTo | yes | | | yes | | | | |
| Invokes | yes | | | | | yes | | |
| Invocable | yes | | | | yes | | | |
| Manages | yes | | | | | | | yes |
| Manageable | yes | | | | | | yes | |

Figure 5:
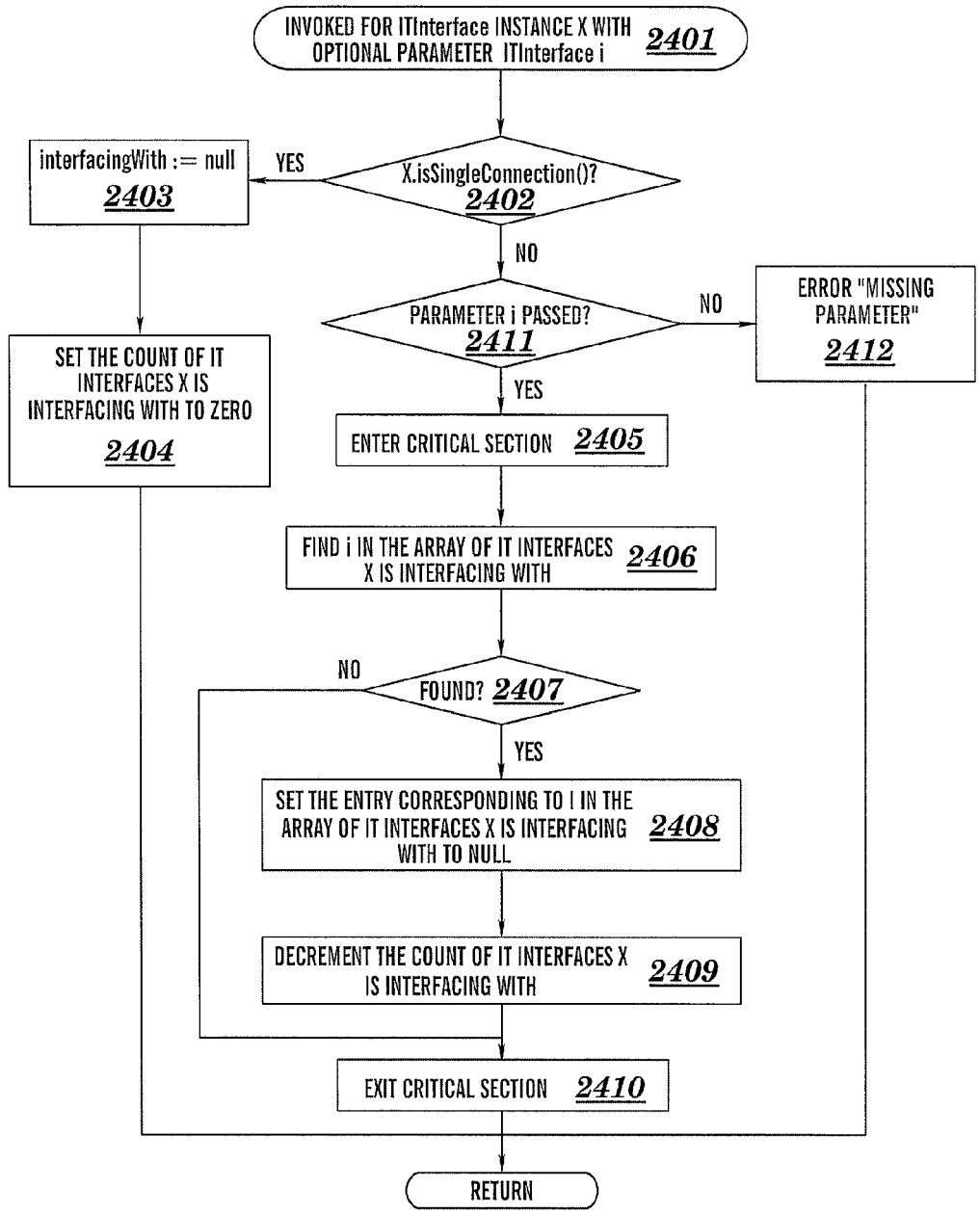
FIG. 5 is a flow chart, depicting the logic of setAvailable( ) method, in accordance with embodiments of the present invention.

The IT interface subclasses are summarized as follows in terms of IT1, IT2, IF1, and IF2:
   IT1: IT structure 1
   IT2: IT structure 2
   IF1: interface of IT structure 1
   IF2: interface of IT structure 2
   1) Installed On: a characteristic of IF1 permitting IT1 to be installed on IT2
   2) Supports: a characteristic of IF2 permitting IT1 to be installed on IT2
   3) ConnectsTo: a characteristic of IF1 permitting IT1 to connect to IT2
   4) Invokes: a characteristic of IF1 permitting IT1 to invoke IT2
   5) Invocable: a characteristic of IF2 permitting IT2 to be invoked by IT1
   6) Manages: a characteristic of IF1 permitting IT1 to manage IT2
   7) Manageable: a characteristic of IF2 permitting IT2 to be managed by IT1
Examples of IT interfaces are as follows:
A program is installed on a computer
A computer supports one or more programs to be installed on the computer
Computer A connects to computer B through a network
Program A invokes program B
Program B is invocable by program A
Program A manages system B
System B is manageable by program A
In this embodiment, labor entities are associated with other entities by means of defaultInterface and defaultITRelationship. In another embodiment, a special ITInterface, laborInterface, may be defined, and used to comprise a labor Relationship to relate a labor entity to another entity.
2.3.3 Detailed Description of Non-Trivial Methods
2.3.3.1 SETAVAILABLE
   FIG. 5 is a flow chart, depicting the logic of setAvailable( ) method, in accordance with embodiments of the present invention. The setAvailable([ITInterface i]) method makes ITInterface available; an ITInterface parameter i may be specified for multi-connection IT interfaces to indicate which of the multiple connections is to be made available. The setAvailable( ) method is invoked for ITInterface instance X with an optional parameter ITInterface i 2401. If IT interface instance X is a single-connection IT interface (X.is Single-Connection( ) returns true) 2402, the field interfacingWith in ITInterface X is set to null 2403, and the count of IT interfaces X is interfacing with is set to zero 2404. Note that it is the responsibility of the invoker to ensure that the corresponding IT interface that was interfacing with X (if any) also becomes available.

Figure 6:
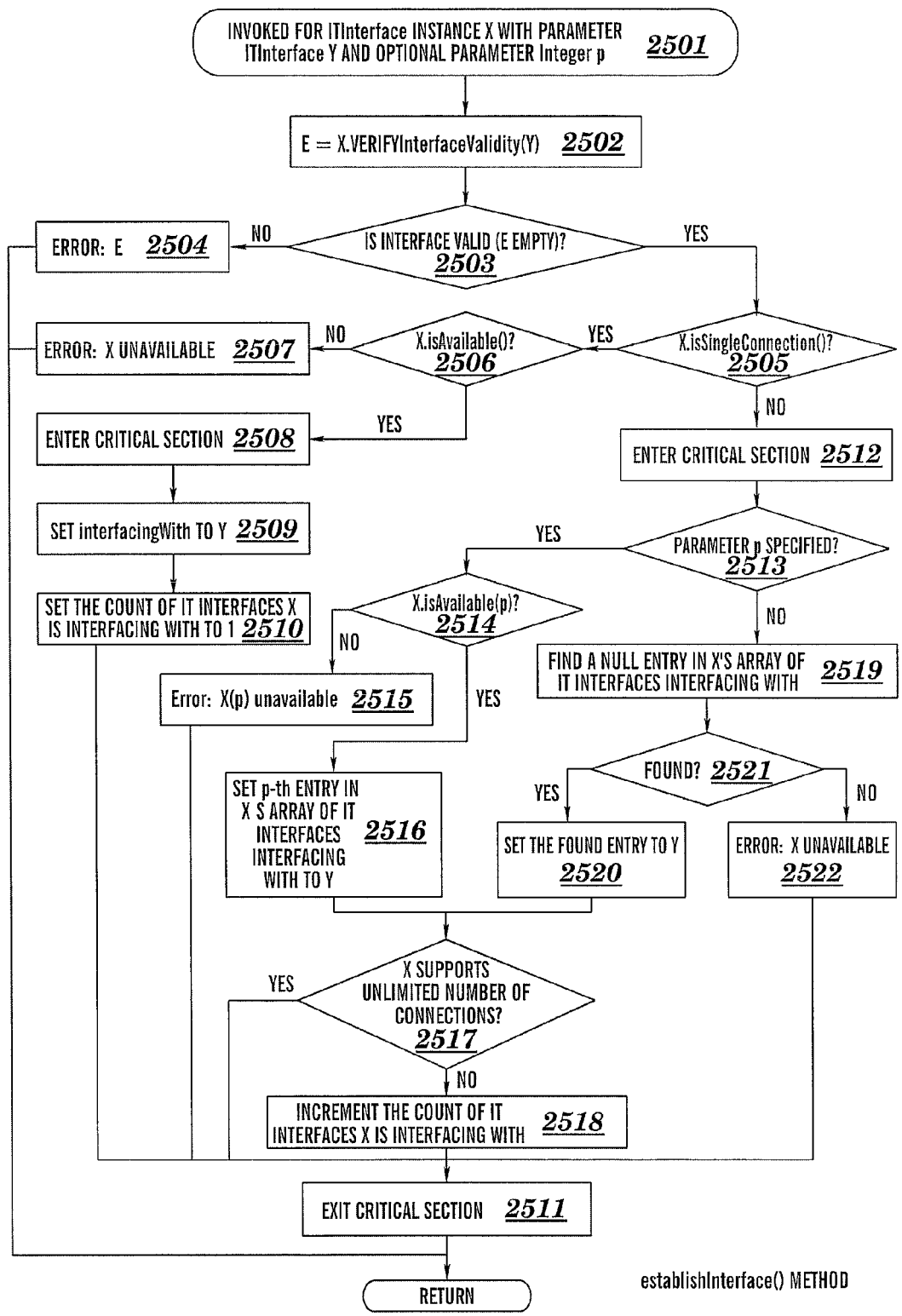
FIG. 6 is a flow chart depicting the logic of establishInterface( ) method, in accordance with embodiments of the present invention.

If ITInterface X is a multiple-connection IT interface 2402, processing ensures that a parameter i is passed, indicating which connection out of the multitude to make available. If parameter i is not passed 2411, and an error is signaled 2412, and processing terminates. The mechanism of signaling an error may vary, depending on implementation, and may include, but is not limited to, an error message, an exception, an ABEND, a log and/or a trace entry.
   Upon ascertaining availability of parameter i 2311, processing enters a critical section 2405. ITInterface i passed as the parameter to method setAvaliable( ) is located in the array of IT interfaces ITInterface X is interfacing with 2406. If i is not found 2407, processing terminates after exiting a critical section 2410. If i is found 2407, the method sets the entry in the array of IT interfaces ITInterface X is interfacing with that corresponds to i to null 2408, decrements the count of IT interfaces X is interfacing with 2409, and exits the critical section 2410.
2.3.3.2 EstablishInterface
   FIG. 6 is a flow chart depicting the logic of establishInterface( ) method, in accordance with embodiments of the present invention. The establishInterface(ITInterface i [, int p]) method establishes an interface with the parameter IT interface; returns an empty Vector if interface was established successfully, and a list of error messages otherwise. The establishInterface( ) method is invoked for ITInterface instance X with a parameter ITInterface Y and an optional parameter integer p 2501.
   The method starts by verifying validity of establishment of connection between X and Y (by invoking method X.verifyValidity(Y)) 2502. If establishment of connection between X and Y is invalid (X.verifyValidity(Y) returns error message(s)) 2503, method establishInterface( ) returns the error message(s) returned by X.verifyValidity(Y) invocation 2504 and terminates processing.
   If ITInterface X is a single-connection interface 2505, but X is available 2506, method establishInterface( ) returns and error message 2507 and terminates processing. Otherwise, if X is a single-connection interface 2505 and X is available 2506, a critical section is entered 2508 the interfacingWith reference of ITInterface X is set to Y 2509, the count of IT interfaces X is connected with is set to one 2510, the critical section is exited 2511, and processing completes successfully.

For a multiple-connection ITInterface X 2505, critical section is entered 2512. If the optional parameter p was specified on invocation of method establishInterface( ) 2513, but p-th entry of X's array of connections is not null (X.is Available (p)==false), indicating that the p-th connection of X is unavailable 2514, an error message is stored 2515, the critical section is exited 2511, and processing terminates. If, on the other hand, the p-th connection of X is available 2514, the p-th entry in X's array of connections is set to Y 2516.

If the optional parameter p was not specified on invocation of method establishInterface( ) 2513, an attempt is made to find an available (null) entry in X's array of connections 2519. If an available entry is found 2521, the found entry is set to Y 2520, otherwise an error message is stored 2522, and processing terminates after exiting the critical section 2511.

If a connection was established 2516 2520, if ITInterface X does not support an unlimited number of connections 2517, the count of connections of X is incremented 2518. The method establishInterface( ) then exits the critical section 2511 and completes its processing.

2.4 IT Relationships

An IT Relationship is a pair of associated (established) IT interfaces belonging to two different IT structure instances. Note that the notion of IT relationship is introduced for convenience. This notion is not absolutely necessary for the model, since a pair of established IT interfaces can always be considered in and of itself, but IT relationships represent a convenient way of tracking interfacing IT structure pairs.

A symmetric IT relationship is an IT relationship, involving IT interfaces of identical class. Examples of a symmetric IT relationship include:
1) IT structure A uses ConnectsTo interface to relate to IT structure B, and IT structure B uses ConnectsTo interface to relate to IT structure A.
2) IT structure A uses DefaultInterface to relate to IT structure B, and IT structure B uses DefaultInterface to relate to IT structure A.

An asymmetric IT relationship is an IT relationship, involving IT interfaces of different classes. As an example, IT structure A InstallsOn IT structure B, while IT structure B Supports IT structure A.

An abstract IT relationship instance is an IT relationship interface instance involving at least one abstract IT interface instance.

A virtual II relationship instance is a non-abstract IT relationship instance involving at least one virtual IT interface.

A real IT relationship instance is an IT relationship instance involving only real IT interface instances.

2.4.1 ITRelationship Class

ITRelationship class inherits from ITEntity class and has the following methods:
1) ITRelationship(String name, Type type[, ITInterface A, B])—constructor, establishes a relationship <name> of type <type> using IT interfaces A and B, or defaultInterface if A and B are not specified.
2) boolean is Symmetric( )—returns true if relationship is symmetric, false otherwise
3) [ ] ITInterface getRelatedITInterfaces( )—returns the pair of ITInterface instances involved in a relationship ITRelationship cannot be instantiated—only ITRelationship subclasses have practical uses.

2.4.2 ITRelationship Subclasses

Subclasses of the ITRelationship class are predicated by the types of IT interfaces included in the model. The following IT relationships may exist given the types of IT interfaces defined above:

DefaultITRelationship—two IT structures are related in an unidentified way

InstallationITRelationship—IT structure 1 is installed on IT structure 2

CommunicationITRelationship(<connection type>)—IT structure 1 communicates to IT structure 2 using <connection type>

InvocationITRelationship(<invocation type>)—IT structure 1 invokes IT structure 2

ManagementITRelationship—IT structure 1 manages IT structure 2

2.5 IT Dependencies

An IT dependency is a characteristic of an ITStructure class, indicating requirements of this ITStructure class instances for presence or absence of this or other ITStructure class instances.

A symmetric IT dependency is an IT dependency which can be applied to ITStructure subclasses involved, regardless of the order of ITStructure subclasses in the IT dependency predicate. For example, IT structure A depends on IT structure B, and IT structure B depends on IT structure A in the same way. The order of A and B in the previous sentence may be reversed without a change in meaning of the sentence.

An asymmetric IT dependency is a non-symmetric IT dependency (i.e., it cannot be applied to ITStructure subclasses involved regardless of their order in the IT dependency predicate). For example: IT structure A depends on IT structure B, but IT structure B does not depend on IT structure A.

2.5.1 ITDependency Class

ITDependency class inherits from ITEntity class and has the following methods:
1) ITDependency(String name, String A, B)—constructor, establishes a dependency of ITStructure subclass A on ITStructure subclass B, where A and B are names of subclasses.
2) boolean is Symmetric( )—returns true if relationship is symmetric, false otherwise
3) [ ] String getDependentClasses( )—returns the pair of names of ITStructure subclasses involved in an IT dependency.

ITDepdendency cannot be instantiated—only ITDependency subclasses have practical uses.

2.5.2 ITDependency Subclasses

A number of different dependencies may exist among IT structures comprising (i.e., included in a complex IT structure's composition) or potentially comprising an IT structure (i.e., having a potential of being included in a complex IT structure's composition). For the purposes of this definition, the following dependencies (ITDependency subclasses) are considered (i.e., other dependencies may be defined as appropriate for the structural model):
1) RequiresPresenceOf—as in "IT structure 1 requires presence of IT structure 2"
2) ExclusiveWith—Negation of 1—as in "IT structure 1 is exclusive with IT structure 2", IT structure 1 cannot be installed or operate in the presence of IT structure 2

In this embodiment, no difference is made between requirement of presence for installation and requirement of presence for operation, and the corresponding exclusivity. In another embodiment, such distinction could be made.

2.6 IT Delivery Environment

An IT delivery environment (or delivery environment) is a collection of rules, policies, practices, and associated support functions, including labor, physical space, power supply, hardware, software, networking, and management facilities involved in operating a data center, as well as means of provisioning and deployment of the aforementioned support functions. IT delivery environment also includes a collection of all delivery-bound real IT structures operating in it or in process of being deployed.

IT delivery environment may be null if every IT structure in it operates independently, does not use any data center services, no data center infrastructure exist, and no rules or standards are imposed on IT structures by the delivery environment. For example: a stand-alone personal computer is operated in a null IT delivery environment.

A delivery-bound IT structure is a virtual IT structure that can be provisioned and deployed in a particular IT delivery environment.

2.6.1 ITDeliveryEnvironment Class

ITDeliveryEnvironment class inherits from ITStructure and is always a complex IT structure. ITDeliveryEnvironment composition includes all IT structures deployed in the delivery environment. ITDeliveryEnvironment composition may (and normally would) also include one or more IT structures representing data center infrastructure.

Unlike ITStructure, ITDeliveryEnvironment permits an empty composition—empty composition is valid for the null IT delivery environment.

In addition to the standard ITStructure methods, ITDeliveryEnvironment includes the following methods:

1) Vector verifyConformance(ITStructure A)—verifies conformance of an IT structure to the rules of the IT delivery environments. Returns an empty Vector if the parameter IT structure conforms to the IT delivery environment rules, and a Vector containing a list of error message strings if the parameter IT structure does not conform to the IT delivery environment rules. This method is a NOOP for the null IT delivery environment.

Example: A set of product standards may be established by a data center, such that for certain types of products only products included in the standard set may be used—e.g., operating systems may be restricted to UNIX, and Windows; e.g., UNIX hardware platforms may be restricted to RS/6000 model F50 or H50 and no other computer may be used to run UNIX. verifyConformance( ) method in this case would examine the composition of its parameter IT structure (recursively, if the parameter IT structure is complex) and ensure that it only includes products for operating systems and hardware platform for UNIX that are either within the established set of standards or have higher level of abstraction than specific operating system and specific type of hardware.

2) Vector addElement({<new>|<update>}, ITStructure A)—overrides the parent class addElement( ) method; performs delivery binding of a virtual IT structure. Returns a Vector containing a delivery-bound IT structure as the first element if delivery binding is successful, and a list of error messages otherwise. This method is a NOOP (i.e., returns the input virtual IT structure as the first element of the returned Vector) for the null IT delivery environment. <new> or <update> input parameter may be specified to indicate whether this is a binding of a newly added IT structure, or an update of an existing IT structure.

3) Vector deploy({<new>|<update>}, ITStructure A)—initiates deployment of a delivery-bound IT structure. Returns a Vector containing error messages if processing is unsuccessful, and a null Vector otherwise. <new> or <update> input parameter may be specified to indicate whether this is a deployment of a new IT structure, or a change to an existing IT structure.

Note that all methods of ITDeliveryEnvironment class are subclass-specific. Class ITDeliveryEnvironment includes NOOP placeholders.

2.7 Extending Entity Model

The above model provides a foundation for building an IT class library. However, it is highly abstract and insufficient for effective modeling of IT. A set of general extensions, with its classes inheriting from the appropriate base IT classes, defining basic IT constructs, such as computers or network devices, is required as further foundation. Such extended class libraries exist—e.g., Common Information Model (CIM).

Figure 18:
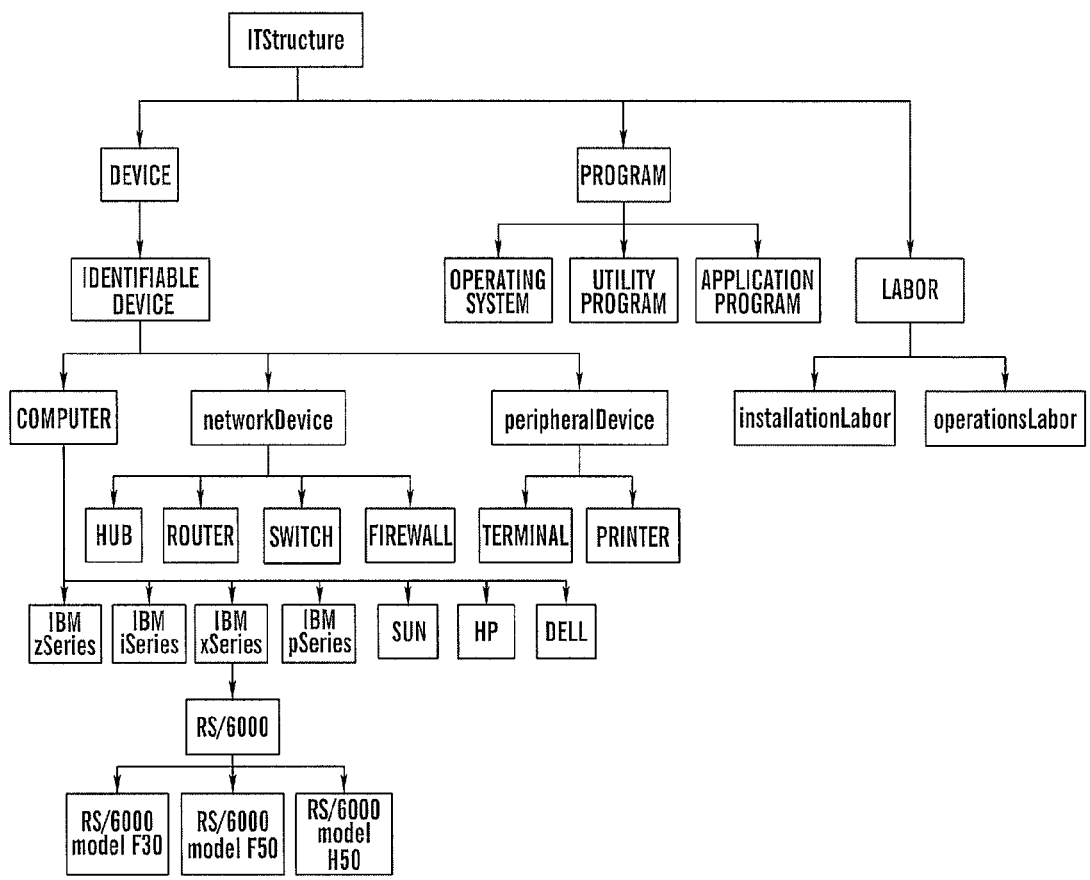
FIG. 18 is an extended class hierarchy example, in accordance with embodiments of the present invention.

Another example of such class hierarchy is described in FIG. 18, in accordance with embodiments of the present invention. FIG. 18 is an example of a set of extensions going from the class hierarchy origin (ITEntity) down to a set of specific computer models shown at a lowest hierarchical level as the virtual IT structures RS/6000 model F30, RS/6000 model F50, and RS/6000 model H50. FIG. 18 also shows intermediate hierarchical levels having successively lower degrees of abstraction. For example, consider the following example path through the hierarchical representation shown in FIG. 18: ITStructure, device, Identifiable Device, computer, IBM xSreies, RS/6000, RS/6000 model F50. In the preceding example, device is less abstract than ITstructure, IdentifiableDevice is less abstract than device, computer is less abstract than IBMxSeries, IBMxSeries is less abstract than RS/6000, and RS/6000 is less abstract than RS/6000 model F50. The lowest level IT structure of RS/6000 model F50 is a virtual IT structural, though not delivery bound.

The present invention discloses a translator (see Section 2.10 infra) to translate the abstract IT structure at the highest level (denoted as ITStrucure) to the virtual IT structures RS/6000 model F30, RS/6000 model F50, and RS/6000 model H50. To effectuate such translation, all of the intermediate IT structures shown in FIG. 18 may be stepped through in order to arrive at the final virtual IT structures (e.g., RS/6000 model F30, RS/6000 model F50, RS/6000 model H50, etc.). In some embodiments, however, the designer may provide sufficient input description (typically stored in libraries) so that the translator may not have to step through all of the intermediate IT structures shown in FIG. 18 to arrive at the final virtual IT structures. For example, a requirement that a particular IT structure can store and execute software may imply that the particular IT structure is a computer, so that the intermediate levels of device and IdentifiableDevice in the preceding example path could be skipped by the translator.

Figure 15:
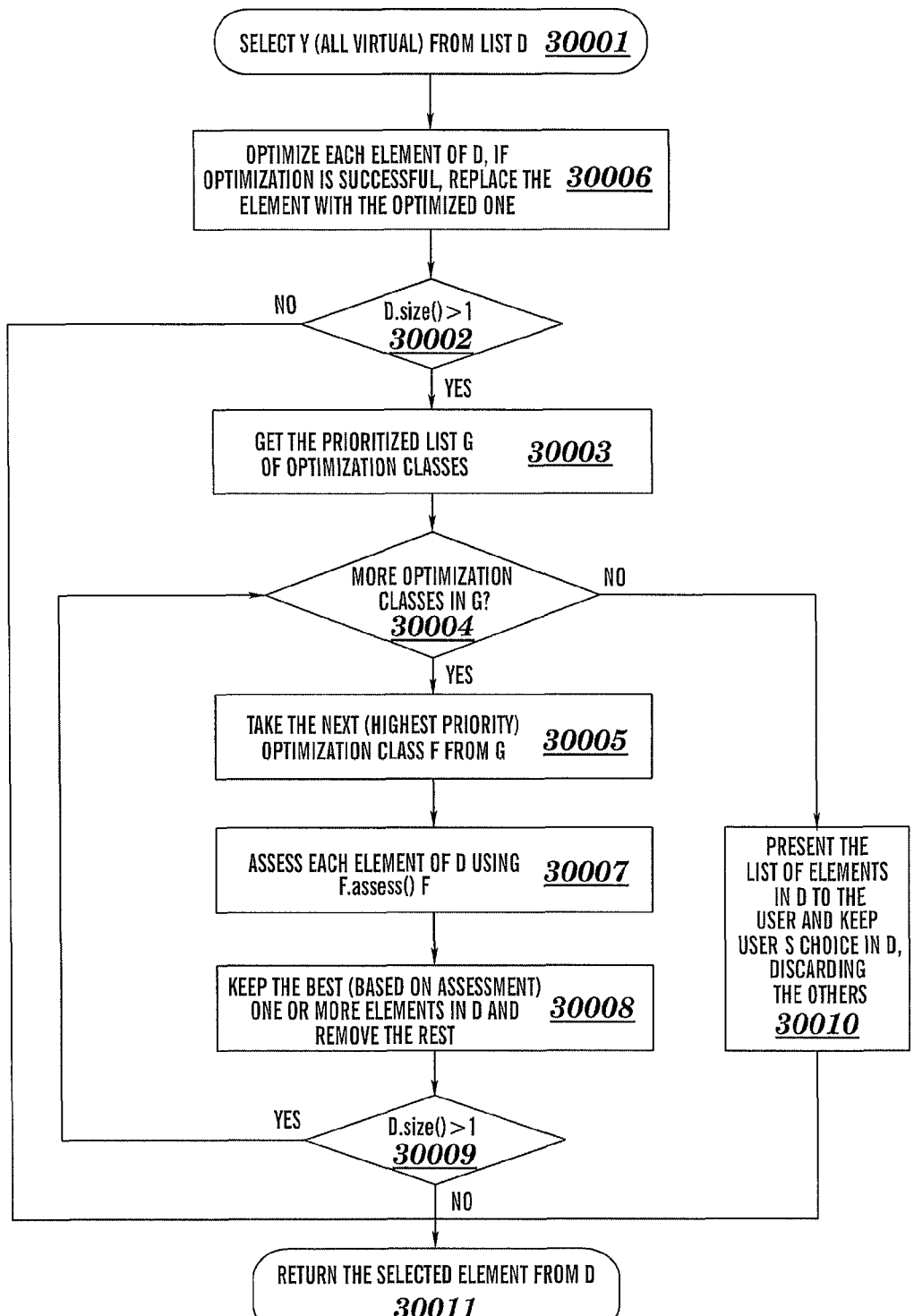
FIG. 15 is a flow chart depicting the process of selecting the best translation candidate from a list of translation candidates, in accordance with embodiments of the present invention.

Although each IT structure box in FIG. 18 is a primitive IT structure, a box appearing in the hierarchy of FIG. 15 could alternatively be a complex IT structure. For example, a box in the hierarchy could represent a client-server architecture as a complex IT structure having primitive elements of server and client.

2.8 Extended IT Delivery Environment

Similar to ITStructure subclasses, the ITDeliveryEnvironment class can have subclasses, used to define various delivery environments. All of ITDeliveryEnvironment subclasses must override two methods: verifyConformance( ) and addElement( ). The verifyConformance( ) method verifies whether a particular IT structure can be deployed and can operate within a given instance of an ITDeliveryEnvironment subclass. The addElement( ) method performs delivery binding of an IT structure to the IT delivery environment subclass instance if the IT structure has been previously verified via verifyConformance( ) to be deployable and operable within the IT delivery environment defined by the given instance of an ITDeliveryEnvironment subclass.

While this embodiment does not attempt to enumerate all possible delivery environments, an example ITDeliveryEnvironment subclass, called StandardizedITEnvironment is described. The key characteristic of the StandardizedITEnvironment is that it imposes product standards and restricts IT structures deployed and operated within it only to the allowable product set. So, the verifyConformance( ) method of StandardizedITEnvironment checks primitive composition of its argument target IT structure and indicates conformance only if every element of the primitive composition of the target IT structure belongs to the set of primitive IT structures permitted by the ITDeliveryEnvironment subclass. For example, the ITDeliveryEnvironment subclass may restrict a computer to be an IBM xSeries computer or an IBMzSeries computer.

Another embodiment for using the verifyConformance( ) method is a situation in which an IT structure is currently deployed in IT delivery environment A, but it is desired that this IT structure migrate to IT delivery environment B. Accordingly, this IT structure would be checked against the verifyConformance( ) method of delivery environment B to determine if this IT structure could be deployed in delivery environment B.

Figure 19:
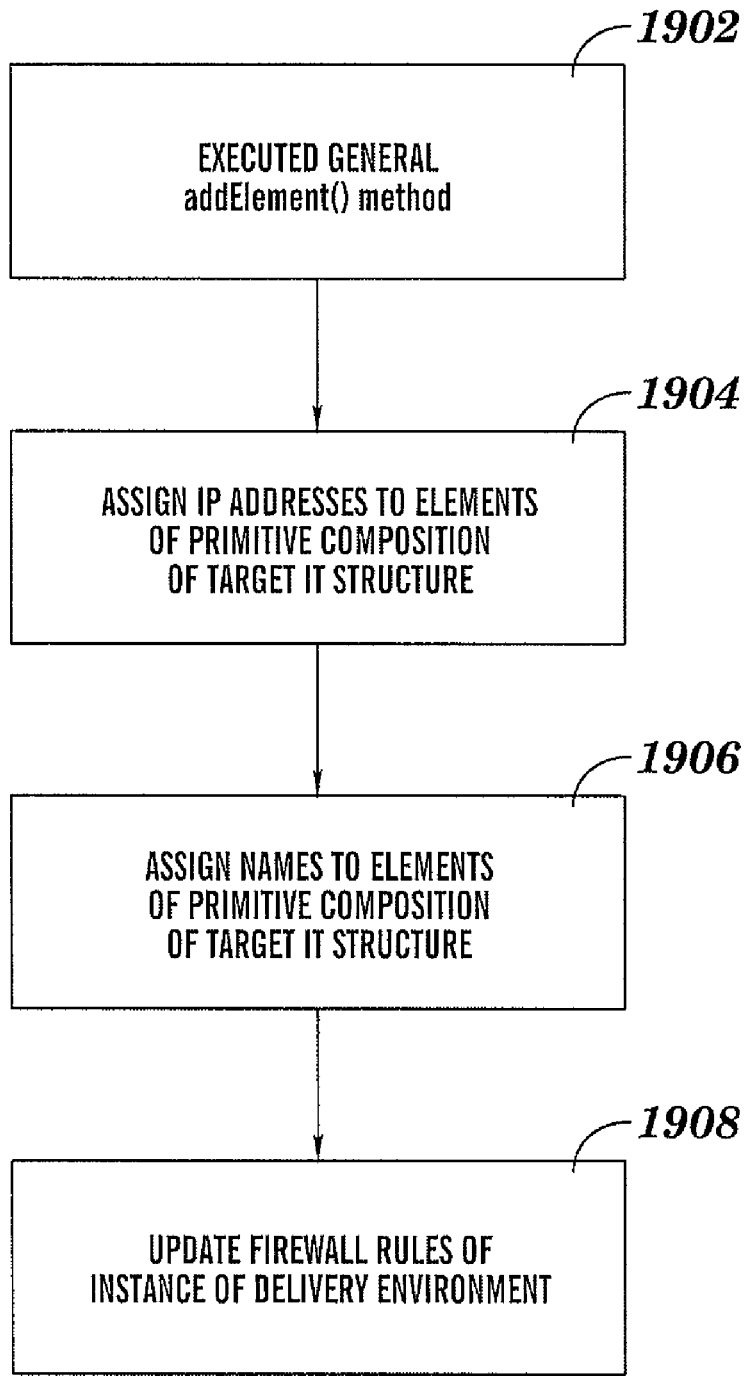
FIG. 19 is a flow chart for implementing delivery binding of an IT structure to a delivery environment, in accordance with embodiments of the present invention.

FIG. 19 is a flow chart depicting a modified addElement( ) method of StandardizedITEnvironment to perform delivery binding of the argument target IT structure to the instance of StandardizedITEnvironment, in accordance with embodiments of the present invention. The modified addElement( ) method effectuates IT delivery binding by invoking the general addElement( ) method of FIG. 3 with an addition of elements required to delivery bind the IT structure to a given IT delivery environment. As a part of this process, the modified addElement( ) method of FIG. 19 includes the general addElement( ) method 1902 of FIG. 3. If at least one element of the primitive composition of the delivery-bound IT structure requires access to the Internet, then the modified addElement( ) method assigns 1904 IP addresses to the elements of primitive composition of the target IT structure requiring IP addresses, these IP addresses being unique relative to the current primitive composition of the instance of StandardizedITEnvironment and adhering to the IP addressing policy of the instance of StandardizedITEnvironment. Similarly, the addElement( ) method assigns names 1906 to the elements of primitive composition of the target IT structure requiring names, and ensures uniqueness of these names relative to the current primitive composition of the instance of StandardizedITEnvironment and adherence of these names to the naming policies of the instance of StandardizedITEnvironment. If target IT structure requires access to the Internet through the firewall(s) provided by the instance of StandardizedITEnvironment, the firewall rules of the instance of StandardizedITEnvironment are updated 1908 to permit the appropriate communications.

2.8.1 Verifying Conformance of an ITStructure to an Exemplary Delivery Environment The exemplary delivery environment is a data center and is aimed at providing the highly-available branded infrastructure for Internet-accessible IT applications.

The data center is a new, state-of-the-art facility. It is built on today's technology and practices a philosophy of being a security-focused operation. Activities and services are monitored by an experienced technical staff 24×7 from the Network Operations Center (NOC).

The facilities include 3,000 square feet of raised floor, a network operations monitoring center, conference rooms, administrative space and coffee room.

The physical space of the data center has a secure co-location in a 3,000 square foot room with 18" raised floor and is ADA (Americans with Disabilities Act)-compliant. The physical space includes 27"×39"×84" cabinets with internal vertical cable management and vented front and back doors. All hardware must fit into cabinets. No space other than cabinets is provided.

The electrical power to the data center from NYSEG (New York State Electric and Gas Company) is delivered by dual redundant feeds. The electric service in the building is connected to a parallel redundant UPS. There is a backup 1000 KW diesel generator with 7-day fuel reserve.

Primary internet access of the data center is via AT&T Gigabit Ethernet over multi-mode fiber to their national fiber network node located in adjacent building. This network node has eight connections to the AT&T network. Alternate internet access is via 100 Mbps Ethernet over single-mode fiber connection to the Cable & Wireless Network.

Security for the data center includes access control by Smart Card system issued by NOC personnel staffed 24×7× 365 (24 hours, 7 days a week, 365 days a year). Data center floor access is controlled by access card and biometric scan. Visitors are granted access by duly authorized representatives of the data center clients. A biometric scan and surrender of the visitor's driver's license for a proxy card is required for visitors to gain access from the lobby to the administrative area. Another biometric scan and use of the access card is required to enter the raised floor area.

Figure 9:
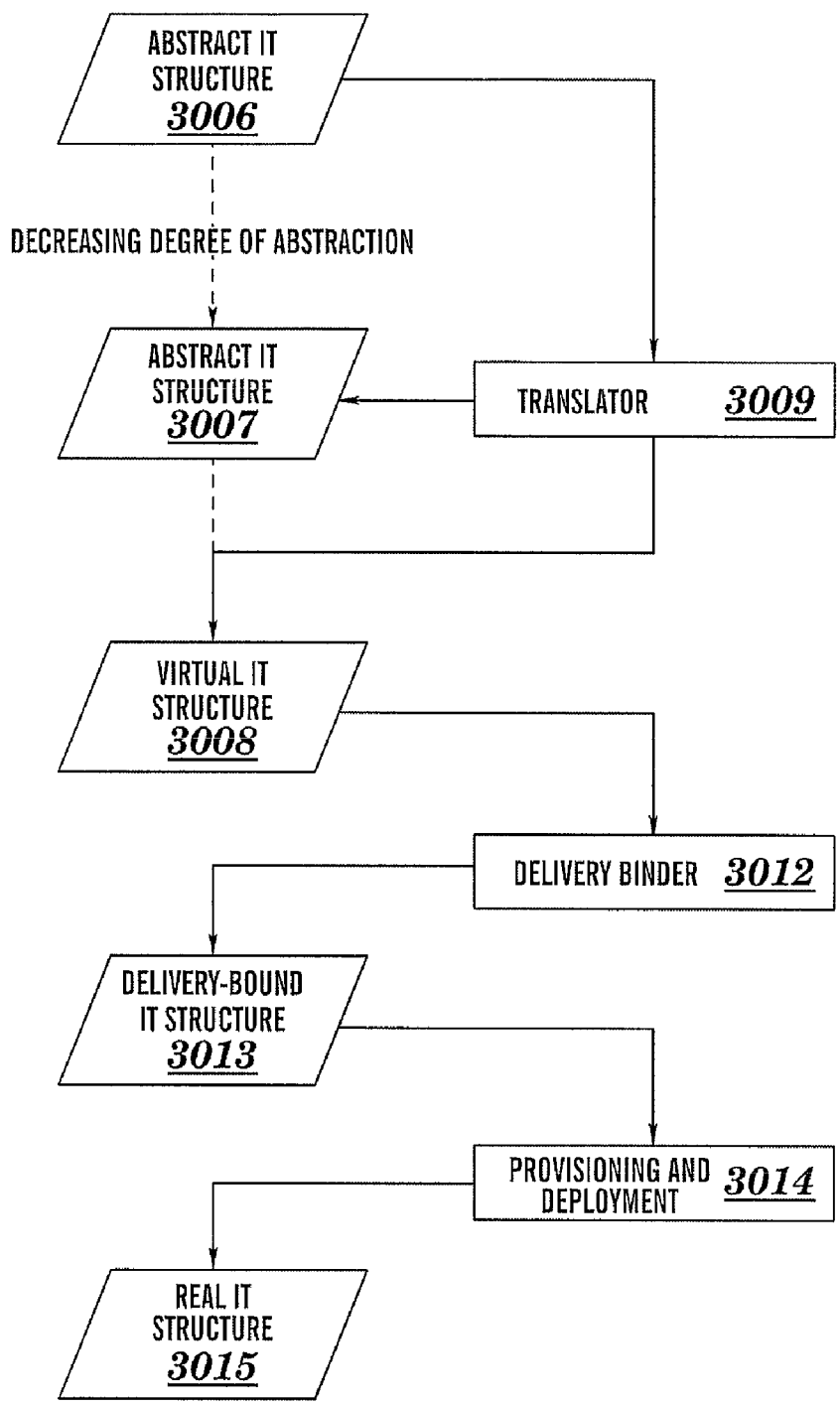
FIG. 9 is a chart depicting the IT development process, in accordance with embodiments of the present invention.
Figure 10:
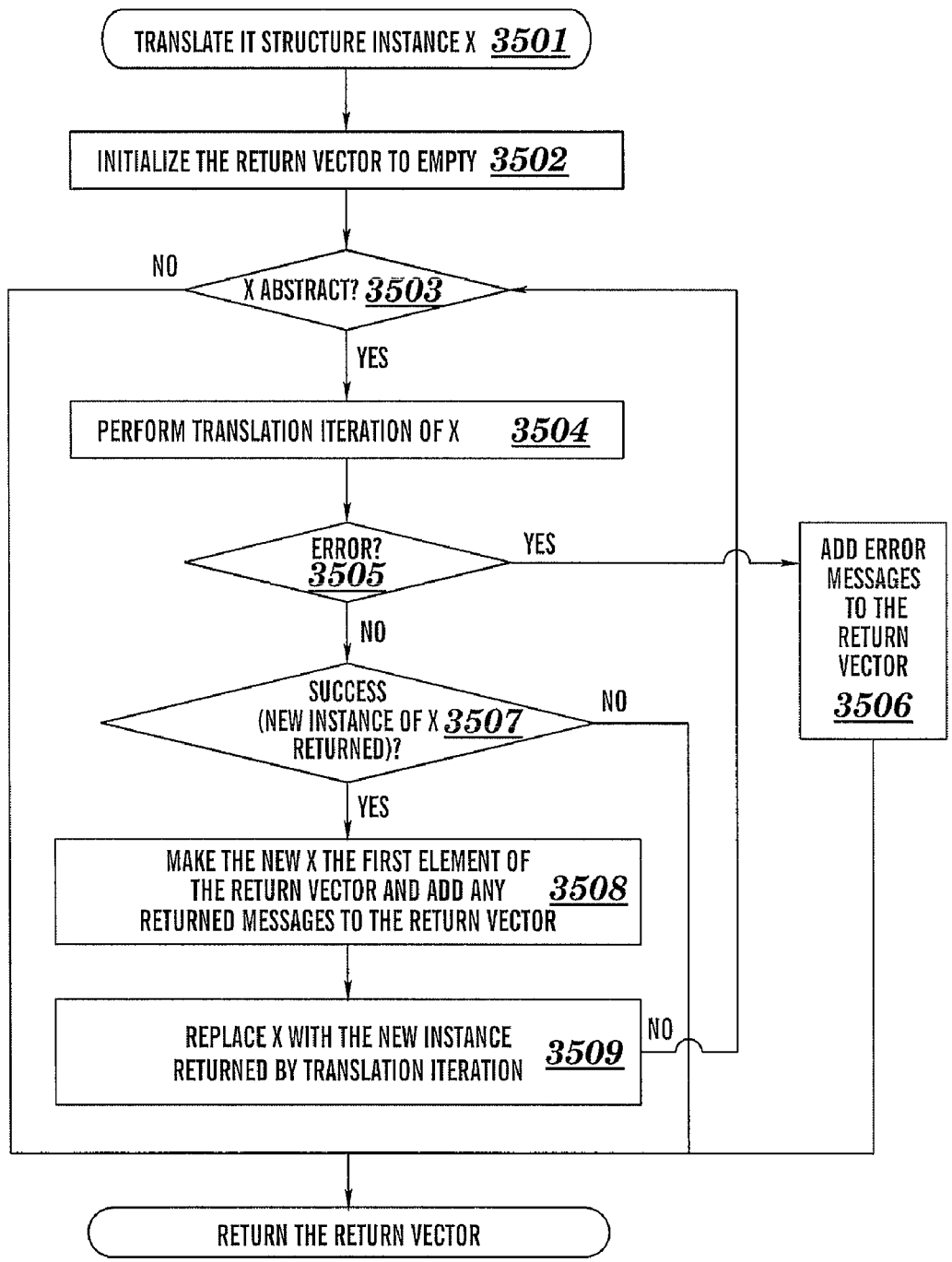
FIG. 10 is a flow chart depicting the process of translation of an IT structure instance, in accordance with embodiments of the present invention.

Conformance factors for the IT structure to the above IT delivery environment (i.e., data center) include:
  Electric power availability, reliability (and possibly voltage)
  Ability to introduce devices out of the list of "supported" devices
  Ability to use specific software, or requirement to run specific software (e.g., for monitoring or virus defense)
  Availability of specific rack sizes/space
  Ability to use geometrically non-standard devices
  Compliance to physical network layer (jack types; switches/hubs; network speed)
  Compliance to monitoring/admin access (e.g., there may be a requirement to have an extra network interface per physical box for admin access)
  Possible conflict of application availability requirements to DE service window
  Network bandwidth requirements
  Internet availability requirements (dual-ISP, etc. . . . )
  Architectural requirements with respect to network (layering, firewalls, IP addressing schema, network isolation requirements)
  Network traffic requirements (e.g., "This IT Delivery Environment will allow only HTTP/HTTPS traffic from the Internet to your hosts"; "We do not allow outgoing traffic on port 25 directly, you must use one of our SMTP servers if you want to send email")
  Application type limitations ("We do not allow mass-mailing applications")
  Security level provided by IT Delivery Environment versus IT structure security requirements 2.9 IT Development Process FIG. 9 is a chart depicting the IT development process, in accordance with embodiments of the present invention. Translator 3009 (see Sec. 2.10; FIG. 10) may be used in a translation process to translate an abstract IT structure 3006 into another abstract IT structure 3007 having a lower degree of abstraction than abstract IT structure 3006. This translation process may be recursively repeated until the abstract IT structure 3006/3007 has been translated into a virtual IT structure 3008 or until the translation process aborts due to an unsuccessful translation attempt. Alternatively, a single translation of abstract IT structure 3006 by translator 3009 may produce the virtual IT structure 3008. The virtual IT structure 3008 serves as input to the delivery binder 3012 (see Sec. 2.11; Sec. 2.2.2.5, addElement( ) method, FIG. 3), which translates the virtual IT structure into a delivery-bound IT structure 3013, elements of which are then provisioned and deployed 3014 (see Sec. 2.12; deploy( ) method), resulting in a real IT structure 3015 operating in the appropriate IT delivery environment.

2.10 Translation

Figure 11:
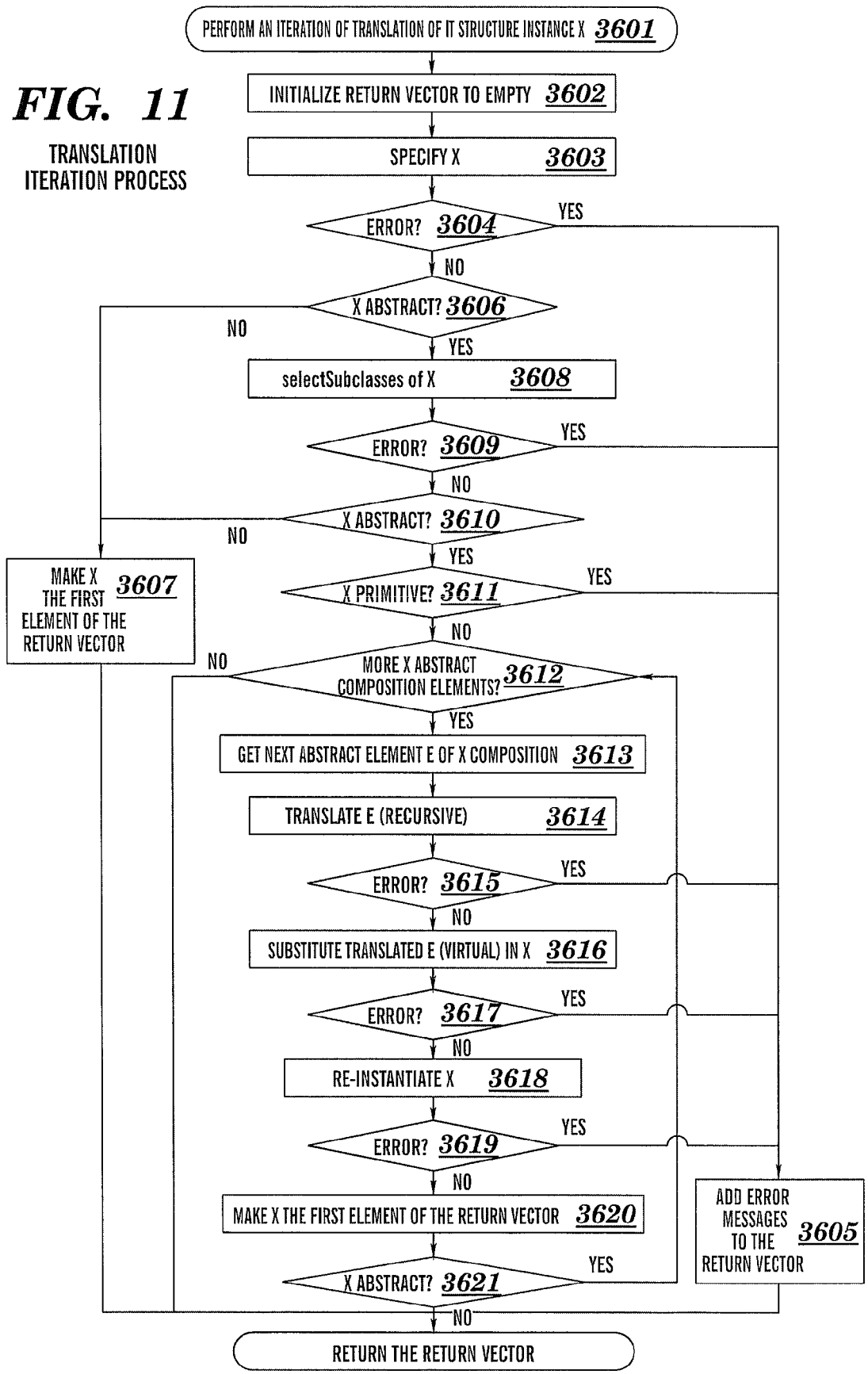
FIG. 11 is a flow chart depicting the translation iteration process, in accordance with embodiments of the present invention.

Translation is performed on an abstract IT structure instance with the intention of obtaining a virtual IT structure, which can then be optimized and bound to one or more IT delivery environment to obtain one or more real IT structure. FIGS. 10 and 11 collectively describe an IT translator (IT-RAN) adapted to translate an abstract IT structure to the virtual IT structure.

FIG. 10 is a flow chart depicting the process of translation of IT structure instance X 3501, in accordance with embodiments of the present invention. The process starts by initializing the return Vector 3508 to an empty Vector 3502. If X is not abstract 3503, no translation is necessary, and a null return Vector is returned to indicate that no action was performed (and no errors occurred).

The process then performs a series of iterations until either an error occurs or a virtual IT structure is obtained. The process invokes the translation iteration process 3504, as described infra in relation to FIG. 11, to iteratively translate the abstract elements of X (i.e., the IT structures in the composition of X) until an instantiation of X following said iterative translation is virtual. If an error is indicated by the translation iteration (by returning error message(s)) 3505, any error messages returned by the translation iteration process are added to the return Vector 3506 and processing terminates. If translation iteration processing did not indicate an error 3505, a check is performed to ascertain whether the translation iteration processing was successful 3507 (i.e., the translation iteration process returned a new instance of IT structure X), and if so, the new instance of IT structure X returned by the translation iteration process is made the first element of the return Vector 3508, and the current instance of IT structure X is replaced with the new instance of IT structure X returned by the translation iteration process 3509. The process then loops back to the check of whether the instance of IT structure X is still abstract 3503.

FIG. 11 is a flow chart depicting the translation iteration process, which is performed for an IT structure instance X 3601, in accordance with embodiments of the present invention. The process iterates through the abstract elements of X's composition to perform a translation of each abstract element of X, wherein the iterations end when a re-instantiation of X results in X being virtual (i.e., being in a virtual state).

The process starts by initializing the return Vector 3620 to an empty Vector 3602. The process then invokes the process of specification for X 3603, which may be a NOOP if X is fully specified, or, if X is not fully specified, full ensure full specification of characteristics of X. If an error occurs during the specification process for X 3604, any error messages returned by the specification process are added to the return Vector 3605 and processing terminates.

The process then checks whether X is abstract 3606, and if X is no longer abstract (i.e., X is now virtual), the process makes X the first element of the return Vector 3607 and returns.

If X is still abstract 3606, the process invokes selection of subclasses for X 3608. If an error occurs during subclass selection 3609, any error messages returned by the subclass selection process are added to the return Vector 3605 and processing terminates.

If subclass selection did not indicate an error 3609, the process checks whether X is still abstract 3610, and if X is no longer abstract (i.e., X is now virtual), the process makes X the first element of the return Vector 3607 and returns.

If X is still abstract 3610, the process checks whether X is primitive 3611, and if so, the process places a translation error message in the return Vector 3607 and processing terminates. The reason for this is that subclass selection process for a primitive IT structure has searched all possible subclasses of X (including any existing virtual IT structures) and has not found one that would represent a satisfactory translation result for X—i.e., no possible virtual IT structure exists that would satisfy functional, operational, and other requirements and/or constraints imposed on X.

If X is complex 3611, the process iterates through abstract elements of X's composition 3612. Because X is still abstract, by definition of abstract IT entities, X's composition includes at least one abstract element. Each iteration through X's composition finds the next abstract element E of X's composition 3613 and recursively invokes the translation process for E 3614. If an error occurs during translation of E 3615, any error messages returned by the recursive invocation of the translation process are added to the return Vector 3605 and processing terminates.

Figure 14:
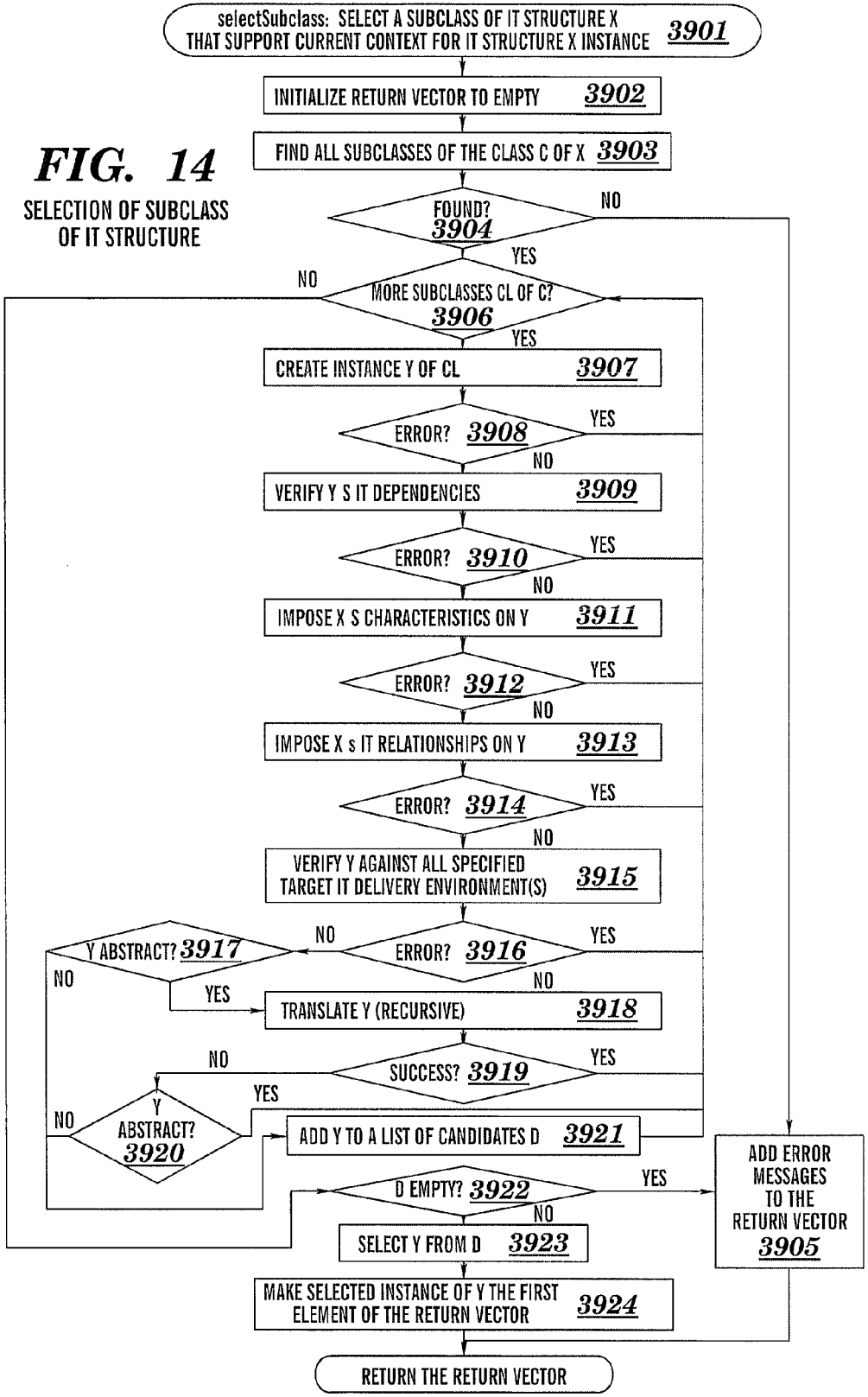
FIG. 14 is a flow chart depicting the process of selection a subclass of an IT structure, in accordance with embodiments of the present invention.

If translation process is successful and returns a new instance of E 3615, the new instance of E (denoted as $E_{NEW}$) is substituted for the current instance of E in the composition of X 3616. The process of substitution (not shown, but an analogous process is shown in FIG. 14) involves ensuring that any IT dependencies in X involving E are still satisfied, any IT relationships in X involving E are still valid and established, any characteristics of X (functional, operational, or other) are still supported, and X is still valid for any IT delivery environment for which it is targeted.

X (with $E_{NEW}$ substituted therein) is then re-instantiated 3618 to form an interim IT structure instance. If an error occurs during re-instantiation of X 3619 (e.g., if the interim IT structure instance is not virtual), error messages are added to the return Vector 3605 and processing terminates.

X (now re-instantiated) is then made the first element of the return Vector 3620. If X is no longer abstract 3621 (i.e., it is virtual), the return Vector (including X as its first element) is returned and processing terminates. If X is still abstract 3621, processing iterates to finding the next abstract composition element of X 3612.

Figure 12:
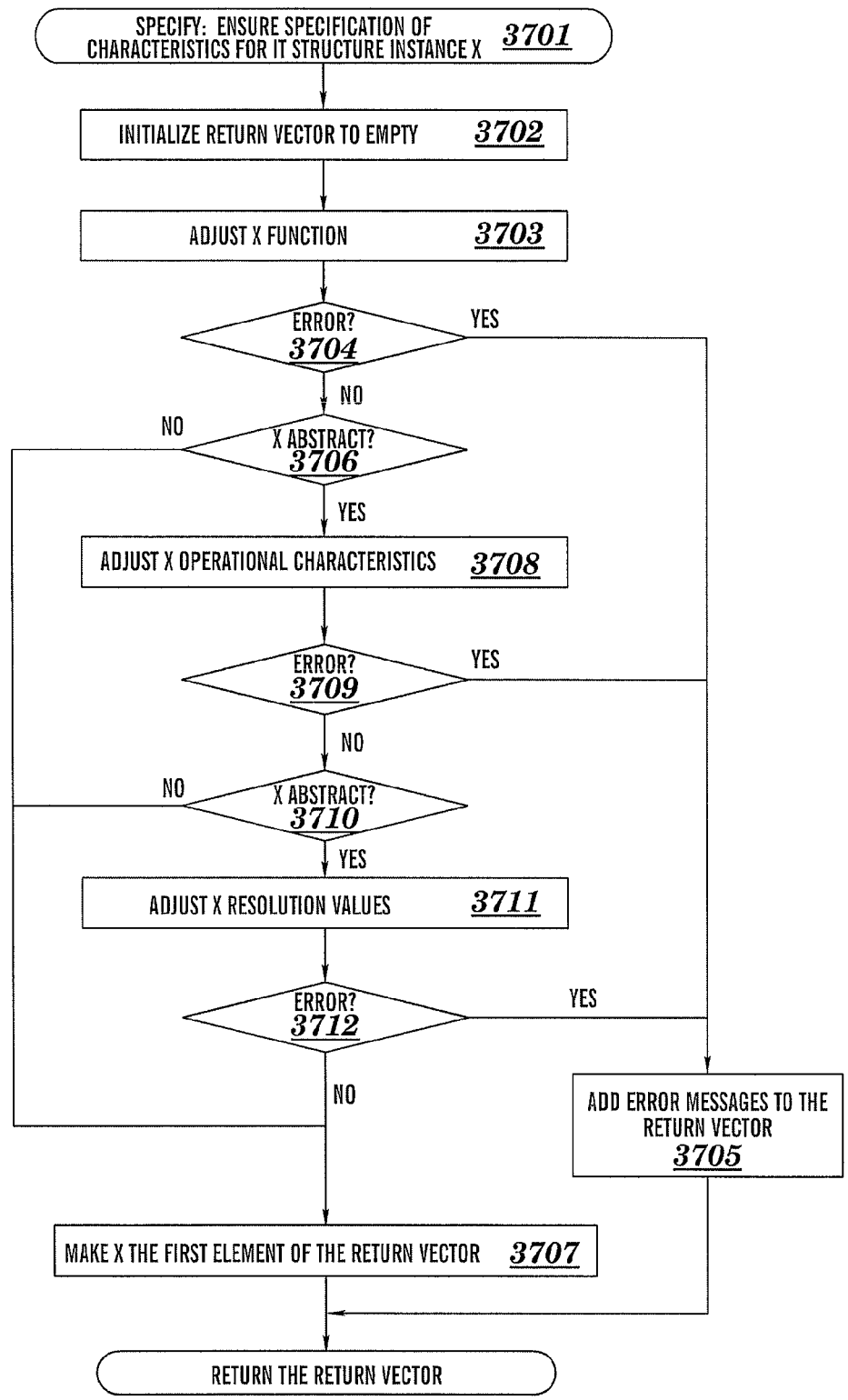
FIG. 12 is a flow chart depicting the process of ensuring specification of characteristics of an abstract IT structure instance, in accordance with embodiments of the present invention.

FIG. 12 is a flow chart depicting the process of ensuring specification of characteristics of abstract IT structure instance X 3701, in accordance with embodiments of the present invention. The process starts by initializing the return Vector 3707 to an empty Vector 3702. The process then invokes the adjustment process for the X's function(s) 3703. The adjustment process for a particular characteristic of an IT structure may be a NOOP if that characteristic is fully specified, or, otherwise, will ensure full specification of that characteristic. If an error occurs during the adjustment of X's function(s) 3704, any returned error messages are added to the return Vector 3705 and processing terminates.

The process then checks whether X is still abstract 3706. It is conceivable that as a result of invocation of setFunctions( ) method of X, X became virtual. If this is the case, X is made the first element of the return Vector 3707 and processing terminates.

If X is still abstract 3706, the process invokes the adjustment process for the X's operational characteristics 3708. If an error occurs during the adjustment of X's operational characteristics 3709, any returned error messages are added to the return Vector 3705 and processing terminates.

The process then once again checks whether X is still abstract 3710. It is conceivable that as a result of invocation of setOperationalCharacteristics( ) method of X, X became virtual. If this is the case, X is made the first element of the return Vector 3707 and processing terminates.

If X is still abstract 3710, the process invokes the adjustment process for the X's resolution values 3711. If an error occurs during the adjustment of X's resolution values 3712, any returned error messages are added to the return Vector 3705 and processing terminates, otherwise, the process makes X the first element of the return Vector 3707 prior to completion.

Figure 13:
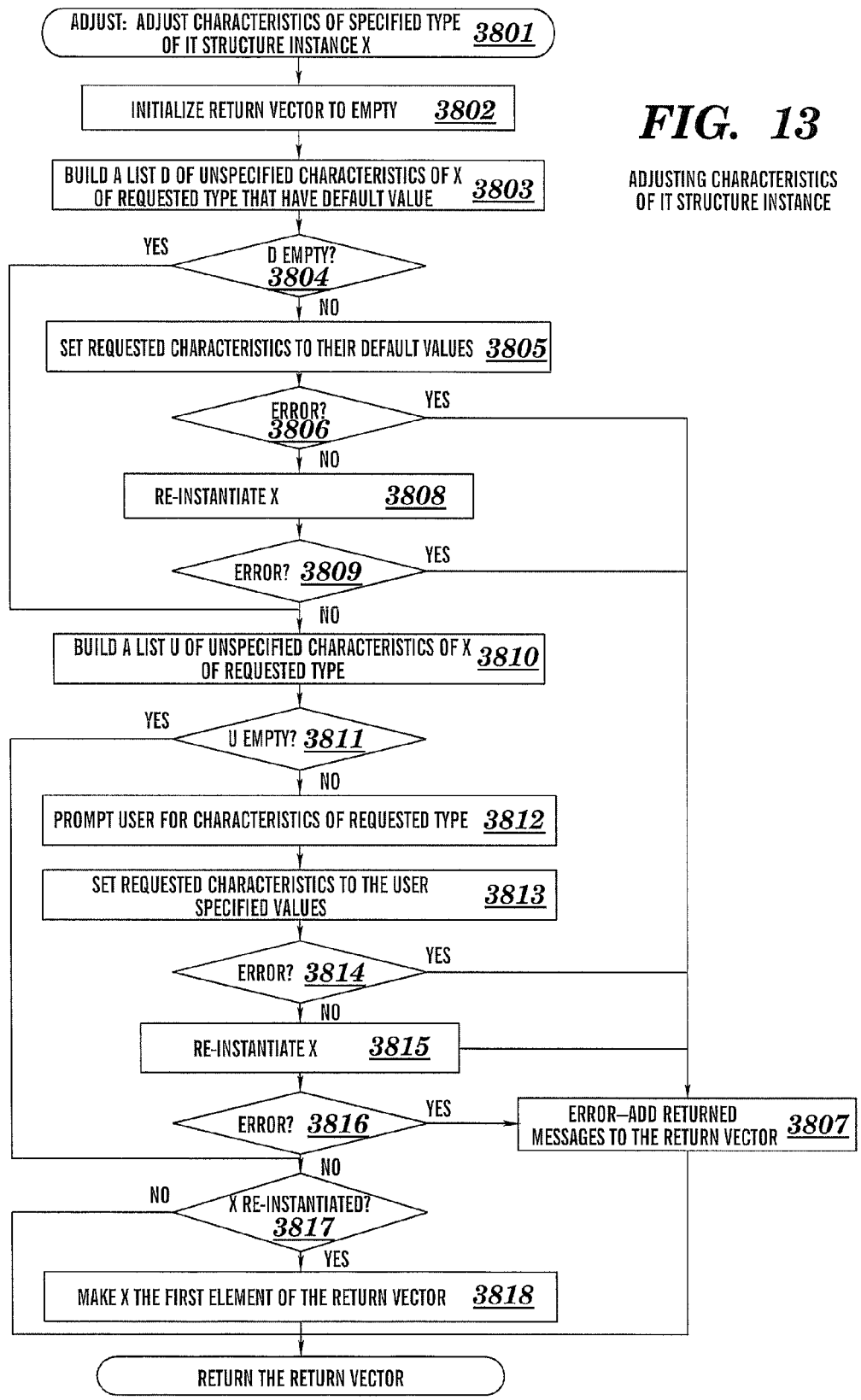
FIG. 13 is a flow chart depicting the process of adjusting a particular set of characteristics of an IT structure instance, in accordance with embodiments of the present invention.

FIG. 13 is a flow chart depicting the process of adjusting a particular set of characteristics of IT structure instance X 3801, in accordance with embodiments of the present invention. The process starts by initializing the return Vector to an empty Vector 3802. The process then builds a list D of unspecified characteristics of the requested type that have default values 3803. If D is not empty 3804 (i.e., at least one unspecified characteristic of the requested type has a default value), the unspecified characteristics are set to their default value 3805 using the appropriate method (i.e., setFunctions( ) for functional characteristics, setOperationalCharacteristics( ) for operational characteristics, and resolve( ) for resolution values). If an error occurs during the appropriate method invocations 3806 (i.e., if the requested characteristics could not be set to their corresponding default values), any error messages are added to the return Vector 3807 and processing terminates.

If default setting for the unspecified characteristics of the requested type was successful 3806, X is re-instantiated 3808. If an error occurs during the attempt to re-instantiate X 3809 (i.e., there is an internal logic error in X-X has accepted the default settings for the unspecified characteristics of the requested type, but now cannot be instantiated using these settings), any error messages are added to the return Vector 3807 and processing terminates.

The process then builds a list U of unspecified characteristics of the requested type 3810 (i.e., those that remain unspecified after any defaults were set). If U is not empty 3811 (i.e., at least one characteristic of the requested type remains unspecified), the process prompts the user for specification of the unspecified characteristics of the requested type 3812 and sets the now specified characteristic values using the appropriate method 3813. If an error occurs during the appropriate method invocations 3814 (i.e., if the requested characteristics could not be set to the values specified for them by the user), any error messages are added to the return Vector 3807 and processing terminates.

A number of possibilities exist as alternatives to addressing the user, comprising:

consulting an internal policy, possibly, associated with the target IT delivery environment(s), generating a value for each unspecified characteristic of the requested type that would not violate internal logic of the class of IT structure X, ignoring the fact that a particular characteristic is unspecified, requiring the users to always provide a default value for all characteristics of IT structures.

If setting of the user-specified values for the unspecified characteristics of the requested type was successful 3814, X is re-instantiated 3815. If an error occurs during the attempt to re-instantiate X 3816 (i.e., there is an internal logic error in X-X has accepted the user settings for the unspecified characteristics of the requested type, but now cannot be instantiated using these settings), any error messages are added to the return Vector 3807 and processing terminates.

The process then checks whether X was re-instantiated during preceding steps 3817, and if so, makes the new instance of X the first element of the return Vector 3818, otherwise (no error has occurred, but X was not re-instantiated—this is a NOOP processing case), an empty (as originally created) return Vector is returned upon completion of the process.

FIG. 14 shows the process of selection a subclass of IT structure X, in accordance with embodiments of the present invention. The instances of IT structure X would support characteristics of the instance (abstract) of IT structure X, relationships imposed on the instance of IT structure X, dependencies of IT structure X, and be valid for the IT delivery environments to which the instance of IT structure X is targeted 3901. The process starts by initializing the return Vector to an empty Vector 3902. The process then finds all subclasses of the class C of X 3903 (i.e., those classes in the class library that inherit from C directly or indirectly (by inheriting from a class that inherits from C directly or indirectly)). If no subclasses of C are found 3904, an error is indicated 3905 and processing terminates. The reason for indicating an error is that X is abstract, and therefore must have a way to be translated to a virtual IT structure instance. The translation process ensures that X is fully specified, and therefore, no other means of reducing abstraction than finding a less abstract class for X remain—and that just proved to be impossible.

If at least one subclass of C was found 3904, the process iterates through the list of subclasses CL of C 3906. An instance Y of subclass CL is created 3907. If an error occurs when creating an instance of CL 3908, CL is ignored (although an error message may be stored in the return Vector, as inability to create an instance of CL indicates an error in CL definition) and the next value of CL is taken.

If instance Y of class CL was created successfully 3908, Y's IT dependencies are verified 3909. If an error is detected by verification of Y's IT dependencies 3910, CL is discarded and the next value of CL is taken.

The process then attempts to impose all characteristics of IT structure instance X on Y 3911. If any characteristics of X could not be imposed on Y and an error occurred 3912, CL is discarded and the next value of CL is taken.

If transfer of characteristics from X to Y was successful 3912, any IT relationships of X are imposed on Y 3913. If Y cannot support all of X's IT relationships 3914, CL is discarded and the next value of CL is taken.

If transfer of IT relationships from X to Y was successful 3914, Y is now verified against all IT delivery environments to which X is targeted 3915. If an error is indicated 3916, CL is discarded and the next value of CL is taken.

Now that Y supports the context of X, a check is performed to determine whether Y is abstract 3917. It is conceivable that Y was virtual from the beginning, or that one or a combination of the actions performed for the transfer of X's context to Y caused Y to become virtual. The reason this check was not performed before this point is that until it is known that Y can support the context of X, Y's type is irrelevant.

If Y is virtual 3917, it is added to the list of translation candidates D 3921, and the next value of CL is taken.

If Y is abstract 3917, a translation of Y is attempted 3918 (recursive invocation of the translation process). If an error occurs during translation of Y or if no error occurs but Y is not translated anyway (NOOP) 3919, CL is discarded and the next value of CL is taken.

If Y was successfully translated 3919, but the result of the translation is still an abstract IT structure 3920, CL is discarded and the next value of CL is taken.

Discarding a subclass of C that does not translate into a virtual IT structure is not a necessity but a design choice. It would be equally valid to include the abstract IT structure Y in the list of candidates D in hopes of subsequent user intervention and manual modification of class source of the class CL of Y such that translation of Y to a virtual IT structure becomes possible. The design choice may be made for conciseness and minimization of complicated actions by the user.

If Y is now virtual 3920, Y is added to the list of translation candidates D 3921 before the next CL value is taken, Upon completion of iteration through the subclasses CL of C, if the list of translation candidates D is empty 3922 (i.e., no translation candidates were found), an error is indicated 3905 and processing terminates.

If the list of translation candidates D contains at least one translation candidate 3922, the process of translation candidate selection is performed 3923, resulting in selection of a single translation result Y from the list of translation candidates D, which is made the first element of the return Vector 3924 prior to completion of the process.

FIG. 15 is a flow chart depicting the process of selecting the best translation candidate Y from a list of translation candidates D (all virtual) 30001, in accordance with embodiments of the present invention. The process starts by optimizing each element of D (using its optimize( ) method), and, if optimization is successful, replacing the element of D with the result of its optimization 30006. If the list of candidates D has a single element 30002, no further action is performed and the one element of D is returned.

If the list of translation candidates D has more than one element to choose from 30002, the prioritized list of optimization classes (getOptimizationFunctions( ) method) is retrieved 30003. The process then iterates through the list G of optimization classes 30004, always taking the next (i.e., the highest priority) optimization class F from the list 30005. The process then assesses each element of D using the assessment function A associated with the optimization class F 30007 and only keeps in D the elements for which A produces the best result 30008, discarding all others.

If more than one element remains in D 30009 (i.e., optimization resulted in equally good result for multiple elements of D), the process iterates to the next assessment function.

If after the application of a sequence of assessment functions, D only has a single element 30009, that element is returned as the one selected for translation from the list of candidates D.

If all assessment functions are exhausted before D is reduced to a single element 30004, the list of elements in D is presented to the user and the user's choice acts as the tie-breaker 30010—the user can select a single element from the list and the others will be discarded prior to the process completion.

Prompting the user for a tie-breaker decision is a design choice. Other designs are possible, including those in which other means of breaking the tie are employed (e.g., random choice), and those in which multiple elements of D are returned and, as a result, the user is presented with multiple equally valid translations. The reason for the choice of human intervention as the tie-breaker is the extremely low probability of having multiple applications of assessment functions to multiple different optimized IT structure instances produce identical results.

2.11 Binding

An IT structure instance X can be added to another IT structure Y by inclusion of X into the composition of Y by means of the addElement( ) method of Y. The process of addition of IT structure instance X to Y is called binding.

2.11.1 Deliver Binding

A virtual IT structure targeted to a particular IT delivery environment may be delivery-bound (i.e., translated into a delivery-bound virtual IT structure) by means of invoking the addElement( ) method of the target ITDeliveryEnvironment class instance.

2.12 Initiating Deployment of a Delivery-Bound IT Structure

Deployment of a delivery-bound IT structure is initiated by invoking the method deploy( ) of the particular ITDeliveryEnvironment class instance.

2.13 Fall-Back Policy

In several places above it has been noted that it is not always possible to transition from an abstract IT structure to, eventually, a real IT structure. A trivial cause of this may be unavailability of the appropriate materials in a provisioning system. More complex cases are possibly, in which, although materials are available, the right combination of them cannot be derived, or, worse, a wrong choice was made in a decision tree of one of the steps of translation to make delivery binding impossible. In many of these cases, returning to a previous step in the IT development process may resolve the problem. Therefore, a fall-back policy is implemented throughout the IT development process, such that, should a condition be reached preventing the production of a real IT structure as a result of a step of the IT development process, a return to the appropriate previous step of the IT development process is performed and a different decision is made, resulting hopefully in a positive outcome of the IT development process.

2.14 IT Agents

An IT agent is a program, installed on or embedded within OS of a computer, or embedded within microcode or hardware of a device, which gathers information about hardware configuration of a computer or a device, software installed on a computer, and network connectivity of a computer or a device, and transmits this information to a requester.

IT agents may transmit gathered information to a requester unsolicited or in response to a request. IT agents possess proper OS authorization and proper network connectivity to be able to transmit gathered information.

IT agents are a particular case of software agents in general, and therefore their implementation is OS— and possibly hardware-dependent.

External discovery functions other than agents may be used to obtain some or all of the required information.

Depending on the degree of sophistication of an IT agent, an IT agent may or may not be able to provide certain types of information—e.g., an IT agent may or may not contain logic permitting it to examine customization and configuration parameters of a particular program. For the purposes of this embodiment, it is assumed that an IT agent always possesses the degree of sophistication required to accomplish its task and furnish the information necessary to fulfill a particular function. If this is not the case, and some of the required information may not be provided by an IT agent, a manual completion step may be required in some of the methods described below, enabling the user to provide the missing information.

Depending on a security policy and network connectivity of a particular IT delivery environment, some IT agents may be unable to gain access to some of the information they intend to gather, or to transmit some of the gathered information. For the purposes of this embodiment, it is assumed that an IT agent always possesses the necessary authority to gather the information it needs and is capable of transmitting this information whenever such transmission is required. If this is not the case, and some of the required information may not be provided by an IT agent, a manual completion step may be required in some of the methods described below, enabling the user to provide the missing information.

IT agents are assumed to be present on all computers and smart devices comprising a real IT structure.

2.15 Reverse-Specifying an IT Structure

In order to accomplish some of the functions described below, it may be necessary to perform a process of delivery-binding "in reverse", having an operational configuration as input, and deriving from it a real and a virtual IT structure. The process relies on the information gathered by IT agents and builds a real IT structure first, including all IT entities within an IT structure being examined. Once a real IT structure is built, a corresponding virtual IT structure is produced by discarding the information imposed on an IT structure by the delivery binding process associated with a particular IT delivery environment, and replacing real primitive IT structures in an IT structure composition with their respective virtual primitive counterparts.

While the reverse-specification process will recreate composition and IT relationships of an IT structure, it will not produce IT dependencies or any methods beyond those present in the real or virtual primitive IT structures and IT relationships used to comprise the reverse-specification.

Figure 16:
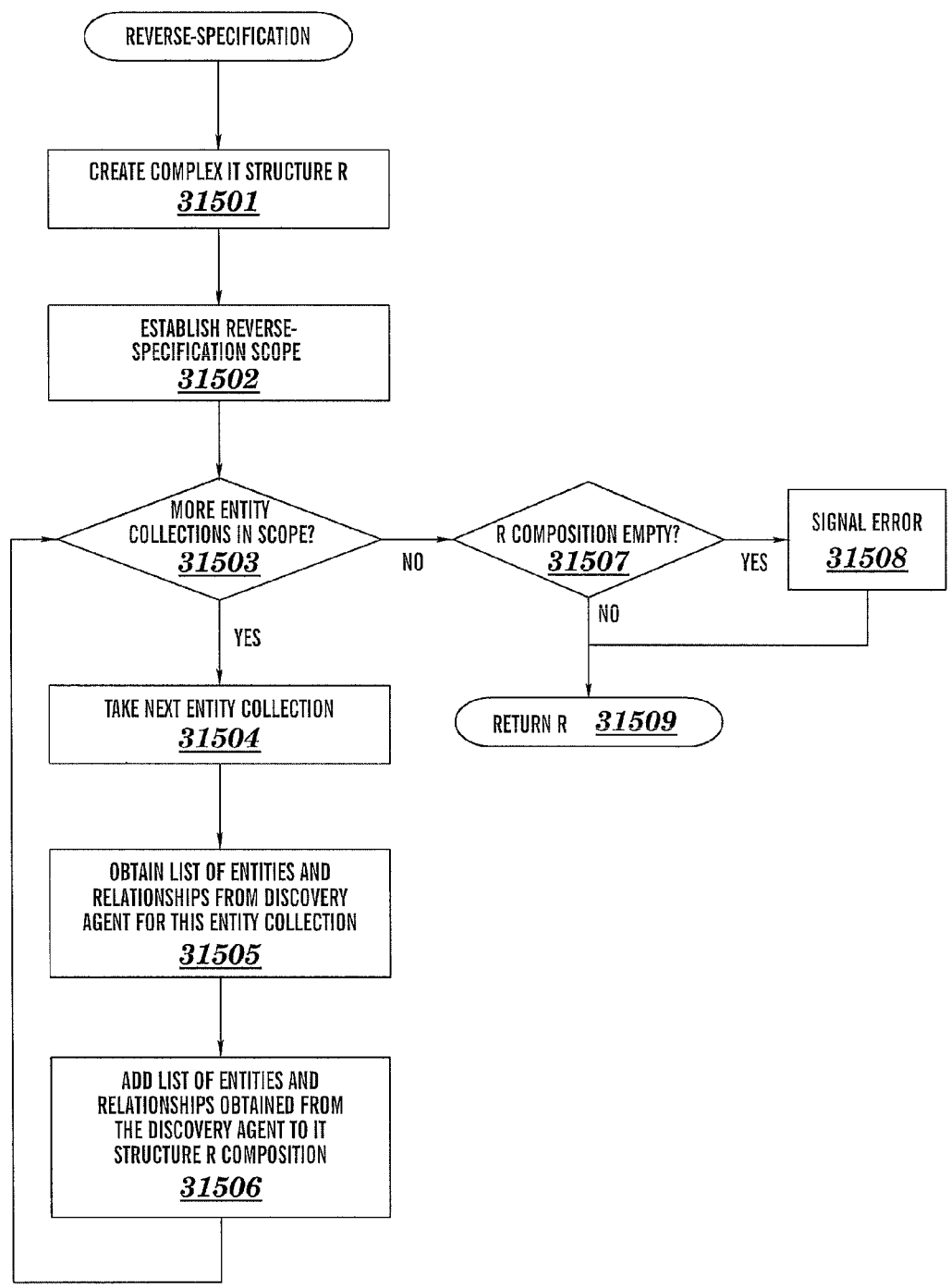
FIG. 16 is a flow chart depicting a reverse specification process, in accordance with embodiments of the present invention.

The process of reverse-specification is illustrated in FIG. 16, in accordance with embodiments of the present invention. The process starts by creating a complex IT structure R, with empty composition 31501. The process proceeds to establishing reverse-specification scope 31502. This is necessary to bound the reverse-specification process to the necessary subset of the IT delivery environment. The scope of reverse specification is a list of IT entities (most likely, computers) indicated by a user. If the scope is not provided, all IT entities supplied with agents are considered within the scope—e.g., the whole IT delivery environment. While there are unprocessed entity collections in scope (an entity collection is a group of IT entities reachable by a single discovery agent—e.g., a computer with its full software stack) 31503, consider the next unprocessed entity collection 31504. Obtain the list of entities and relationships from the associated discovery agent 31505, and add this list to the composition of IT structure R 31506. When all the entity collections are processed 31503, if composition of R is empty 31507, en error is indicated 31508. The resulting IT structure R is returned to the invoker 31509. The resulting IT structure R may result from either reverse specifying an IT delivery environment or from reverse specifying an IT system instance.

2.16 Comparing IT Structures

In some cases, it may be advantageous to compare two IT structures. IT structure classes can be compared by comparing their source code using conventional means of program comparison (e.g., delta-compare utility). The process of comparing two IT structure instances is described infra.

The process of comparing IT structures assumes one of the two cases, based on the usage of results of a comparison (these are the practical cases when a comparison would be useful—the method of comparison is not restricted to these situations):

1) The IT structure instances being compared are an original and its reverse-specification—for deployment verification and detection of unauthorized modifications.

2) The II structure instances being compared are instances of the same IT structure subclass—for testing of IT structure methods by the user.

Figure 17:
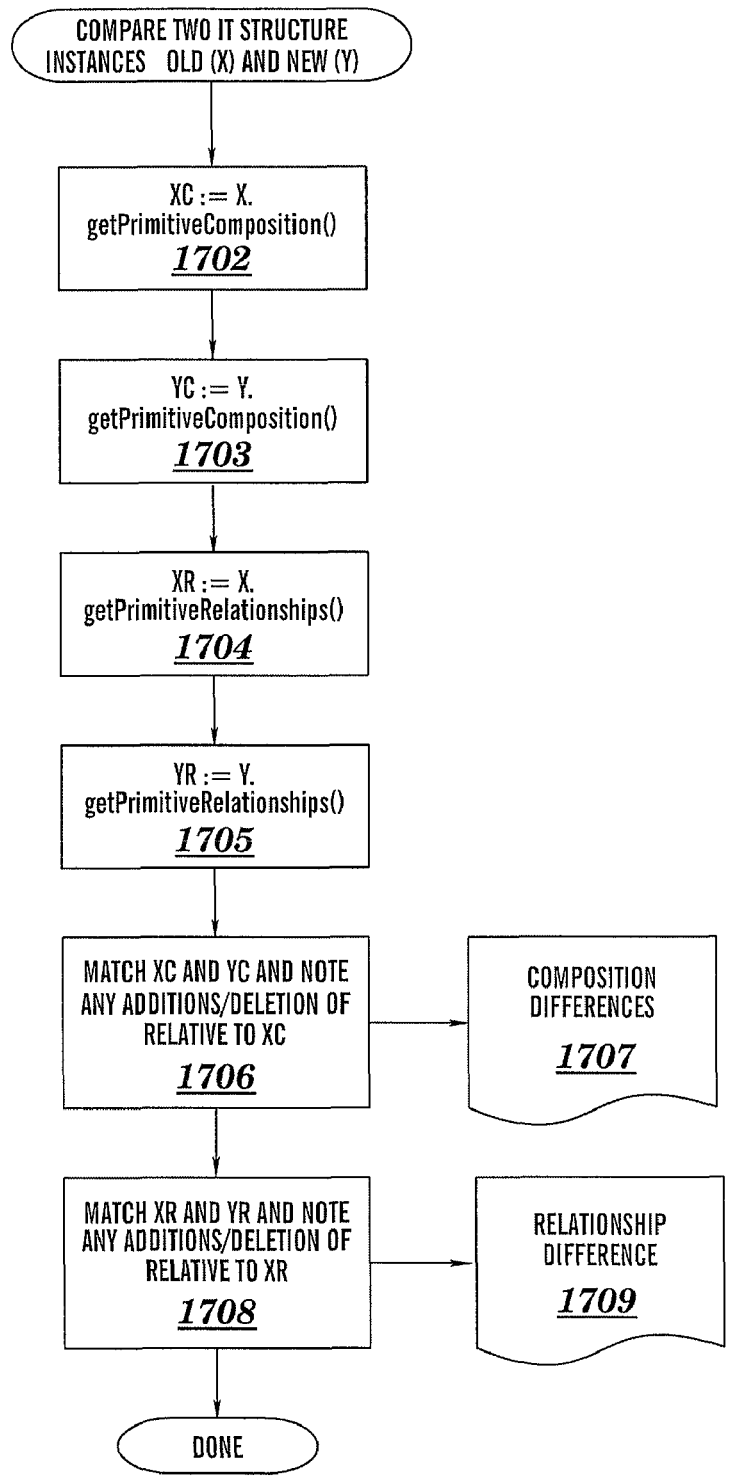
FIG. 17 is a flow chart depicting a process for comparing two IT structure instances, in accordance with embodiments of the present invention.

FIG. 17 describes the process of comparing two IT structure instances. The process obtains as input two IT structure instances, termed "old" (X) and "new" (Y) A1. The process obtains primitive compositions (getPrimitiveComposition( )) of the old 1702 and the new 1703 IT structure instances. The process then obtains primitive relationships list (getPrimitiveRelationships( )) of the old 1704 and the new IT 1705 structures.

The process then matches elements of the old and the new IT structure instances primitive compositions and determines any additions or deletions in (assumed) derivation of the new IT structure from the old 1706, and reports any additions or deletions in the new IT structure relative to the old one 1707.

The process then performs a similar matching for IT relationships of the old and the new IT structure instances 1708 and reports any differences 1709.

The process then produces a report (textual and/or graphical), showing any differences, and marking them as additions or deletions.

3. Optimization of Aspects of IT Structures

This section relates to optimization of aspects of an IT structure. The "target IT structure" is the IT structure having one or more aspects to be optimized by the methodology described in this section. The target IT structure may be a real IT structure or a virtual IT structure. An IT structure element, or an element of an IT structure, is defined herein as an element of an IT structure primitive composition. The target IT structure may comprise a plurality of IT structure elements. For embodiments in which aspects of an IT structure are optimized, each IT structure element may independently be a hardware element, a software element, or a combination of a hardware element and a software element. An aspect of the target IT structure may be optimized with respect to at least one control parameter, each control parameter having a value that is specific to each element of the target IT structure.

If the elements of the target IT structure are software elements (i.e., software programs), the response time of the target IT structure is the weighted sum of the response times of the software programs included in the IT structure along a selected transaction path. The response time of a software program is the average time of a request for processing by the program (e.g., the average time elapsed between the request and the corresponding response, as measured by the request's originator). Any protocol-specific communications taking place at the protocol level below the application-level protocol, are not included into the response time (e.g. response to a handshake is not a "response" for the purposes of response time calculation).

A transaction path is a sequential series of requests and responses from one IT structure element to another, with alternate parallel paths allowable. The sequential series of requests and responses transaction defining the transaction path may be triggered by a user request. For example, for a simple IT structure comprising a front end firewall, a web server, a business tier firewall, an application server, a data tier firewall, and a database server. The transaction path traverses all of the preceding IT structure elements in the above listed order. More specifically, the transaction path for this example encompasses the following six steps:

Step 1: an http request R1 is coming in over the network from the end user's browser, through the front end firewall to the web server;

Step 2: the web server parses the request R1 and forwards the parsed request R1 over the network, through the business tier firewall to the application server;

Step 3: the application server processes the parsed request R1 and generates another request R2 which it sends over the network through the data tier firewall to the database server;

Step 4: the database server processes the request R2, generates a response Rsp2 and sends the response Rsp2 over the network through the data tier firewall to the application server;

Step 5: the application server receives the response Rsp2, generates a response Rsp1 and sends the response Rsp1 over the network through the business tier firewall to the web server; and Step 6: the web server forwards the response Rsp1 over the network through the front end firewall to the end user's browser.

The response time of the preceding IT structure with respect to the indicated transaction path includes the following five response times. The first response time is from the beginning of step 1 to the forwarding of the parsed request R1 in step 2. The second response time is from the forwarding of the parsed request R1 in step 2 to the sending of the request R2 in step 3. The third response time is from the sending of the request R2 in step 3 to the sending of the response Rsp2 in step 4. The fourth response time is from the sending of the response Rsp2 in step 4 to the sending of the response Rsp1 in step 5. The fifth response time is from the sending of the response Rsp1 in step 5 to the receiving of the response Rsp1 in the end user's browser.

Since more than one type of transaction is possible for any given IT structure, the IT developer must select the transaction path among the possible transaction paths, for the purpose of optimizing the target IT structure. The selected transaction path for the target IT structure may be, inter alia, a typical or frequently used transaction path.

Response time is not defined for some classes of IT structure elements (e.g. uninterruptible power supply device). Elements of such classes are not normally to be included into the transaction path selected for the target IT structure, but if elements of such classes are included, the elements are assumed to have zero response time.

Availability of an IT structure is the product of the availabilities of the operants (i.e., elements, fragments, or a group of functionally equivalent fragments as defined infra) of the IT structure along the transaction path that has been selected. Availability of an IT element is the percentage of time that the element is up and operational, capable of performing its intended function. Any dependencies upon other IT elements should be ignored in calculating a single IT structure element's availability, since those dependencies will be accounted for in calculating availability of the IT structure comprising all the elements of the IT structure.

The weight coefficients applied to the response time of the software IT structure elements may be introduced to reflect the presence of load balanced group of servers (as explained infra) and other IT structure fragments (i.e., other sets of IT structure elements) where the selected transaction path for the IT structure can be varied at run time, since the transaction path can traverse any one of the equivalent IT structure fragments, e.g. a user request can be routed by a load balancer to one of the several load balanced servers, based upon the actual load on the servers. Alternatively, the weight coefficients for the response time may be chosen to selectively reflect differences in the IT structure elements (e.g., the frequency of use of the IT structure elements, the dependencies upon the IT structure elements, the TCOs of the IT structure elements, etc.).

Optimization of the target IT structures may be with respect to Total Cost of Ownership (TCO), response time, or availability, or with respect to any other aspect of the target IT structure. The TCO of an IT structure instance may be expressed as the sum of TCOs of all the elements comprising the IT structure instance, including hardware, software, and labor (operations and support). The TCO, response time, and availability may independently be optimized, be included in a constraint affecting the optimization, or have no effect on the optimization.

Class ITOptimizer embodies an optimizes function that optimizes an aspect of the target IT structure and could be applied to a virtual or real IT structure, and further embodies properties and methods described herein. Class ITOptimizer includes the following methods and properties with respect to the target IT structure (i.e., the IT structure being optimized):

ITStructure s—returns the IT structure being optimized

ITStructure getITStructure( )—returns the IT structure being optimized unsigned int getTCO( )—returns TCO of IT structure being optimized as an unsigned integer unsigned int getResponseTime( )—returns response time of IT structure being optimized as an unsigned integer (response time is defined in the context of the IT structure being optimized)

double getAvailability( )—returns availability of IT structure being optimized (availability is defined in the context of the IT structure being optimized)

setTargetTCO(unsigned int t)—sets the target TCO value for IT structure being optimized setTargetResponseTime(unsigned int seconds)—sets the target response time value for IT structure being optimized setTargetAvailabilitu(double availability)—sets the target availability value for IT structure being optimized virtual double getOptimizationF(Vector p)—returns the value of the optimization goal function protected Boolean IsSuccessful(void)—returns true if the optimization is successful and the optimization procedure should terminate optimize( )—perform optimization of the target IT structure 3.1 Goal Function public virtual double getOptimizationF(Vector p) calculates the value of the functional expression to be optimized ('goal function'), which is defined on the instance of the target IT structure that has been previously specified (e.g., as the argument of the class constructor). The returned value of the goal function by getOptimizationF( ) is meaningful in the context of the goal function defined; i.e. cost in monetary units, application response time in seconds, dimensionless reliability, dimensionless availability, dimensionless synthetic value, etc.

Selection of the transaction path affects the response time of the IT structure, and hence may affect either the goal function (if the response time is part of the goal function; e.g., when the IT structure response time is being minimized), or optimization constraints (e.g., when the IT structure total cost of ownership is being minimized, provided that the response time remains better than a given value).

The goal function may be defined by the IT developer. Since, customarily, an optimization problem is formulated so that the goal function is to be minimized, the optimize( ) method will seek to minimize the goal function. Hence, if a particular characteristic which is additively included into the goal function needs to be maximized rather than minimized in order to improve some aspects of the IT structure, then the corresponding addend should be multiplied by −1. For example, if the IT structure availability needs to be optimized, then the availability of the IT structure elements will be included into the goal function expression as their availability multiplied by −1 and the availability of the IT structure elements may each be optionally multiplied by a weight coefficient.

If the goal function is not defined on a particular instance of the target IT structure, then either NaN ("not a number" as defined in http://java.sun.com/j2se/1.4.2/docs/api/java/lang/Double.html) value must be returned by the method or ITExceptionParametersOutsideDomain exception must be thrown (e.g., in a situation when a particular application cannot run on a computer platform specified, or local security policy gets violated by change in the connectivity diagram).

getOptimizationF( ) method is a callback method that will be invoked in the optimization procedure (e.g., in the optimization procedure of optimize( ) described infra in section 3.4) to calculate the value of the goal function.

To assist the IT developer in defining the expression to be minimized, the following helper methods are implemented within ITOptimizer class:
public unsigned int TCO getTCO(ITStructure s);
public unsigned int getResponseTime(ITStructure s);
public double getAvailability(ITStructure s);

In one embodiment, TCO of the IT structure will be optimized, e.g.:

```
public double getOptimizationF(Vector p) {
    ...
    return(getTCO(s));
}
```

The IT developer can use any combination of the values returned by the helper methods together with any other functional expressions defined for the target ITStructure, to build the goal function in order to define the implementation of getOptimizationF( ) method.

Figure 31:
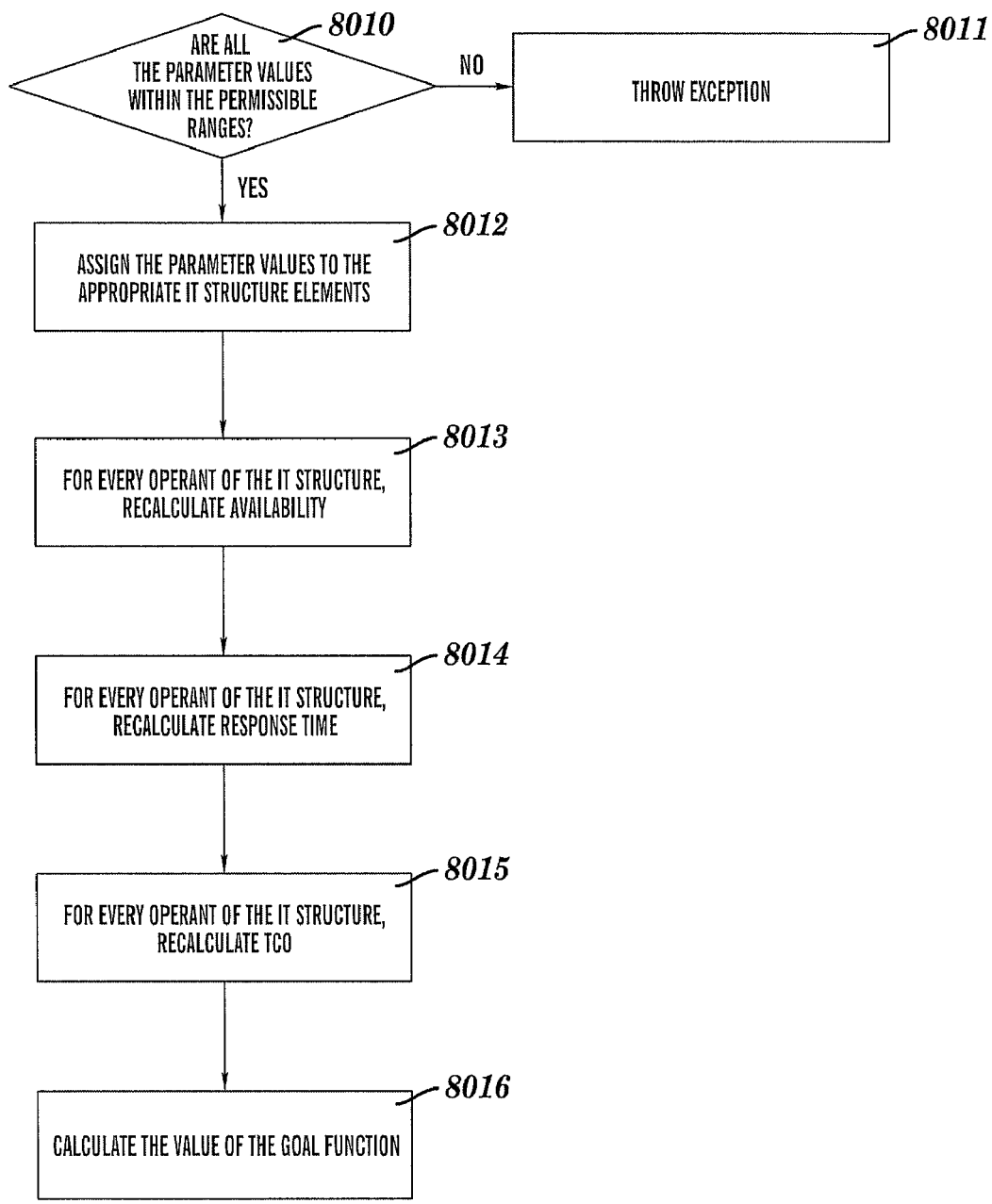
FIG. 31 is a flow chart depicting determination of the value of the goal function, defined on the instance of ITStructure specified as the argument of the ITOptimizer class constructor, in accordance with embodiments of the present invention.

FIG. 31 is a flow chart comprising steps 8010-8016 to implement getOptimizationF( ) for determining the value of the goal function, which is defined on the instance of the target IT Structure (e.g., the target IT Structure that has been previously specified as the argument of the class constructor), with the values of the parameters of the goal function specified by the invoker.

Step 8010 of FIG. 31 ascertains that all the parameter values are within their permissible values. If that is not true, then an appropriate exception is thrown in step 8011.

Step 8012 assigns the parameter value to the appropriate elements of the IT Structure being minimized.

Steps 8013-8015 recalculate availability, response time, and TCO for every operant of the IT Structure being optimized, since the availability, response time and TCO of every operant of the IT Structure could have changed as the result of performing step 8012. For some embodiments, response time, and TCO may not all be utilized for determining the value of the goal function in which case not all of steps 8013-8015 will be required to be executed.

Step 8016 calculates and returns to the invoker the value of the goal function.

3.2. Optimization Parameters

At least one optimization control parameter must be specified (e.g., by the IT developer). Each control parameter has a value that is specific to each element of the target IT structure. One or more optimization control parameters are selected from the set of externally modifiable properties of the elements comprised by the IT Structure being optimized.

For every parameter, its permissible values are specified. Example:

```
public double getOptimizationF(Vector p) {
    if(
       (ITOptimizationParameter)p[0].min >            // line 3
       ITOptimizationParameter)p[0].value) ||
       (ITOptimizationParameter)p[0].max <            // line 4
       ITOptimizationParameter)p[0].value) )
       throw ITExceptionParametersOutsideDomain("Invalid p[0]  // line 5
       value");
    s.Server[5].OS = (ITOptimizationParameter)p[0].value;
    return(getTCO(s));
}
```

In this example, a single parameter is passed to the getOptimnizationF method as the first and only element of the parameters' vector p. The parameter has the meaning of the operating system of Server5 within the IT structure being minimized. The getOptimizationF method substitutes the value supplied as the first element of the parameters' vector p, for the operating system of Server5, and then calculates the IT structure's TCO using getTCO helper( ) method. Before performing any calculations, the parameters are ascertained to be within their allowed values (see lines 3-4 of getOptimizationF) and the appropriate exception is thrown if the verification was not successful (see line 5 in getOptimizationF).

In one embodiment, all the optimization control parameters are discrete. In one embodiment, all the optimization control parameters are continuous. In one embodiment, some of the optimization control parameters are discrete and some of the optimization control parameters are continuous.

3.3. Optimization Constraints

The optimization constraints are to be specified as "hard" or "soft" optimization constraints as follows.

Hard optimization constraints may be set by using one or more of the following setter functions (only those properties which are not used in the goal function definition can be assigned target values):
public void setTargetTCO(TCO maxTCO);
public void setTargetResponseTime(unsigned int maxSeconds);
public void setTargetAvailability(double minAvailability);
Example: setTargetAvailability(0.995);

Hard optimization constraints are those constraints which must be met under any circumstances even if the resulting value of the goal function would suffer significantly as a result of satisfying one or more hard constraints.

Soft optimization constraints may be implemented by incorporating the soft constraints into the goal function by adding to the goal function the difference between an expression and its desirable value, optionally multiplied by a weight factor; for example:

```
public double getOptimizationF( ) {
    return(getTCO(this->s)+(getAvailability(this->s)−0.95)*10.^6);
}
```

The getOptimizationF method provides the means for specifying "soft" optimization constraints. In other words, where the optimization goal function would suffer significantly if a constraint were to be satisfied, a soft optimization constraint would instead produce a compromise with a better value of the optimization goal function, resulting in the goal function would not suffer significantly), but where the constraint value (i.e., the value of the expression embodying the constraint) is further from the specified target value (i.e., the desired value of the expression embodying the constraint).

In one embodiment, the choice of "soft" vs "hard" constraints is performed by the IT developer. Both approaches would work in most of the situations. A "hard" constraint will not work, in a situation when the specified target value cannot be reached (e.g. IT structure availability of 99.5% cannot be reached since the IT structure must include a hardware IT structure element with 99% availability which is unattainable). However, a "soft" constraint approach will still work in such a situation. Another example of a situation where a "soft" constraint approach is preferable is where the target value can be reached, but the corresponding value of the goal function is far from being optimal and can be significantly improved by a slight compromise in the target value of the constraint. For example, the TCO of an IT structure is being minimized with the constraint on availability required to be better than 99.5%. With 99.5% availability, however, the TCO of the IT structure would be $100,000. In contrast with 99.2% availability, a less expensive firewall device can be deployed thus reducing the TCO by $10,000 or 10%, thus making the "soft" constraint approach being preferable in this situation, unless the 99.5% or better availability is a requirement which must be satisfied literally at all costs.

The "softness" of the constraint can be adjusted by the weight factor. In the preceding example of public double getOptimizationF( ) {(getTCO(this->s)+(getAvailability (this->s)–0.95)*10.^6);}, the 10^6 weigh coefficient effectively prices each availability percent above 95% at $1, assuming that the IT structure TCO is in the million dollar range; i.e., $1 of TCO is traded for 1% of availability above 95% and vice versa.

Figure 30:
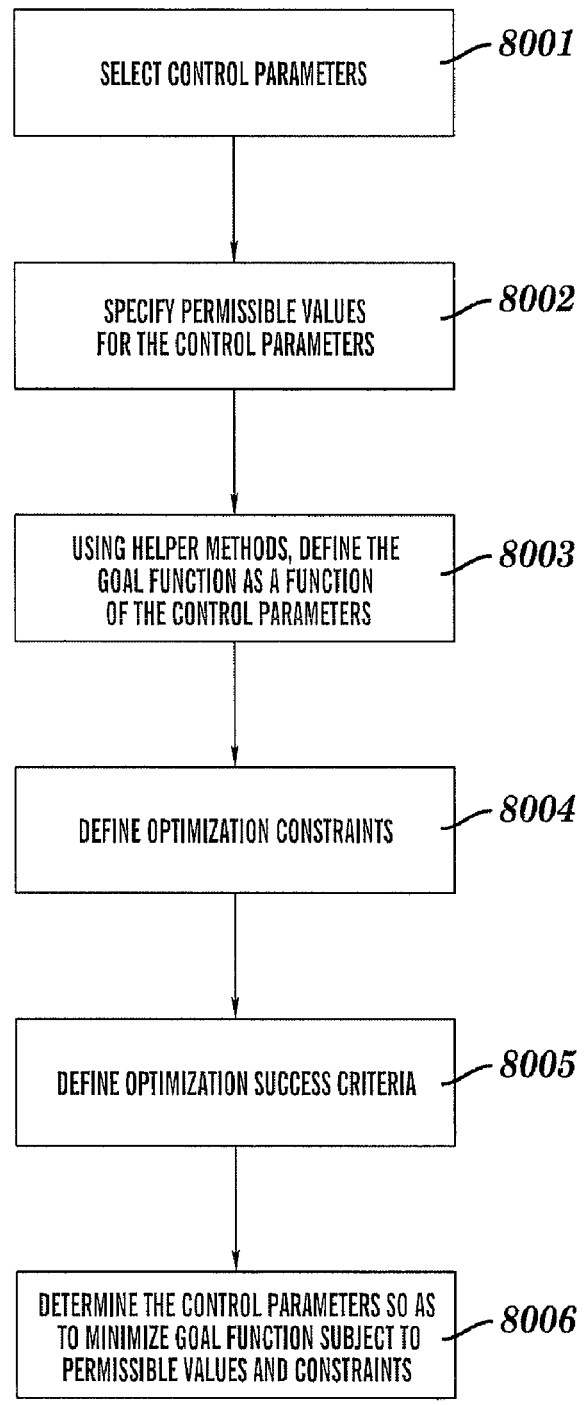
FIG. 30 is a flow chart depicting determination of values of control parameters to minimize the value of the goal function, in accordance with embodiments of the present invention.

3.4 Method optimize( )

public void optimize( ), which is described in steps 8001-8006 of the flow chart of FIG. 30 described infra, performs the optimization against the targetIT structure instance that has been previously specified (e.g., as the parameter of the class constructor). Method protected boolean is Successful(void) which can optionally be re-defined by the IT developer, returns true when the optimization procedure should be stopped (e.g., an acceptable value of the goal function has been reached) in step 8006. If the is Successful method has not been overridden in the child class, the optimization procedure will rely upon its intrinsic (e.g., default) success criteria as defined in step 8005.

FIG. 30 is a flow chart comprising steps 8001-8006 for determining values of control parameters to optimize the value of the goal function, in accordance with embodiments of the present invention.

Step 8001 of FIG. 30 selects at least one control parameter from the set of the externally modifiable properties of the elements comprised by the IT Structure being optimized.

Step 8002 specifies permissible values for each control parameter of the at least one control parameter. The permissible values for each control parameter may independently be: a discrete set of values, at least one continuous range of values, or a combination thereof.

Step 8003 defines the optimization goal function as a function of the control parameters, optionally using one or more of the helper methods described infra.

Step 8004 defines zero or more optimization constraints, optionally using one or more of the helper methods described infra.

Step 8005 defines the optimization success criteria as a Boolean function which returns true if the optimization is successful and the optimization procedure should terminate.

Step 8006 determines the control parameters set which optimizes the goal function and may invoke the getOptimizationF( ) method. Alternative methods may be employed to implement step 8006 for determining the control parameters set which optimizes the goal function; e.g. the method described in Chou, C. I. et al., "Guided Simulated Annealing Method For Optimization Problems", Physical Review E, 67, 066704-1 to 066704-6 (2003). In one embodiment wherein the permissible values of control parameters are discrete sets of values, a brute force method may be used in which the variable to be optimized (e.g., TCO) is computed for all combinations of control parameters with respect to said discrete sets of values, to determine which combination of such combinations triggers the optimum value of the variable to be optimized. See the example of Section 3.6 in which this brute force method is used. People skilled in the art will appreciate the fact that other known or new discrete optimization methods can be used to minimize the above function.

3.5 Helper Methods 3.5.1 getTCO public unsigned int TCO getTCO(ITStructure s) returns the total cost of ownership (TCO) of a delivery-bound IT Structure s.

TCO of a delivery-bound IT Structure instance is calculated as a sum of TCOs of all the elements comprised by the IT Structure instance, including hardware, software, and labor (operations and support).

In the preferred embodiment, TCO of an IT structure element is expressed as sum of one-time charge ('OTC'), and monthly recurring charge ('MRC') multiplied by some constant reflecting the application lifetime (e.g. 36 months):

$$TCO=OTC+C*MRC$$

3.5.2 getResponseTime

Class Program, included in the IT class hierarchy, in addition to all the other properties and methods inherited or specific to class Program, possesses the property reponseTime which contains the average responseTime of the software program described by a particular instance of the class Program in the context of a particular IT structure instance. Please note that the abstraction level of the IT structure instance must be such that would allow for estimating the software program response time.

The IT structure response time (T) is calculated as a sum of the response times of IT structure operants (i.e., elements, fragments, groups of functionally equivalent fragments) of the target IT structure along the selected transaction path:

$$T=\Sigma_i t_i$$

wherein $t_i$ is i-th operant response time such that the i-th operant is an element, a fragment, or a group of functionally equivalent fragments of the target IT structure. The summation over i is from 1 to n, wherein n is the number of IT structure operants on the selected transaction path, and wherein the response time T is in units of time (e.g., in seconds). If the index "i" refers to a group of functionally equivalent fragments, then the associated response time $t_{Gi}$ of the group i (i.e., $t_i = t_{Gi}$) is a weighted average of the response times of the fragments of the group:

$$t_{Gi}=\Sigma_j k_j t_{ij}$$

wherein $t_{ij}$ is the response time of the j-th fragment of the group representing operant i on the selected transaction path. The summation over j is from 1 to J, wherein J is the number of fragments in the group, and wherein $k_j$ is a weight coefficient for fragment j. The weight coefficients $k_j$ are normalized such that the summation over the weight coefficients is 1.

The following example of a particular software program executed on a hardware server of a load balanced group of hardware servers illustrates calculation of the response time a group of functionally equivalent fragments, wherein each fragment is a server of the load balanced group of hardware servers. The weight coefficient for each server may be assigned a value proportional to the load balanced hardware server's processor speed (measured in such units as MHz). The weight coefficients are normalized such that the sum of all the weight coefficients for a single load balanced group is 1. For example, if a load balanced group comprises four servers of equal processor speed, then the weight coefficients are 0.25. In another example, if a load balanced group comprises a hardware server with 4×2048 MHz CPUs, and a server with 2×2048 MHz CPUs, and a server with a single 1024 MHz CPU, then the weight coefficients are 0.62, 0.31 and 0.07, respectively.

Generally, the weight coefficients for the fragments of a group of functionally equivalent fragments are configured on a case-dependent basis in light of the specific functionality of the fragments. For example, the weight coefficients are proportional to hardware server processor speed in the preceding illustrative example.

3.5.3 getAvailability

Class Program, included in the IT class hierarchy, in addition to all the other properties and methods inherited or specific to class Program, possesses the property availability which contains the average availability of the software program described by a particular instance of the class Program in the context of a particular IT structure instance. Please note that the abstraction level of the IT structure instance must be such that would allow for estimating the software program availability.

The IT structure average availability (A) is calculated as the product of the availabilities of the sequentially ordered elements and fragments and group of functionally equivalent fragments of the IT structure along the selected transaction path.

$$A = \Pi_i a_i$$

wherein the multiplication over i is from 1 to n, wherein $a_i$ is the availability of the i-th operant, and wherein n is the sum of the number of said sequentially ordered IT structure elements and fragments and groups of functionally equivalent fragments on the selected transaction path.

A fragment of an IT structure is a set of IT structure elements. Two or more fragments of an IT structure are functionally equivalent if each fragment of the two or more fragments would yield the same output responding to an input request, so that a transaction path can include a request/response functionality of any one of the equivalent fragments. Load balanced servers or redundant firewalls are examples of functionally equivalent fragments of an IT structure.

The availability ($A_G$) of a group of functionally equivalent fragments (e.g. load balanced servers) of an IT structure along the selected transaction path is calculated as $$A_G = 1 - \Pi_i (1 - a_i)$$

wherein the multiplication over i is from 1 to m, wherein $a_{1i}$ is availability of fragment i, and wherein m is the number of functionally equivalent fragments within the group G. For example, the availability of a group of two functionally equivalent fragments consisting of two functionally equivalent load-balanced servers, wherein the two functionally equivalent load-balanced servers have 0.9 and 0.8 availability, is $1-((1-0.9)(1-0.8))=0.98$. Thus, the capability of alternatively using any one of the functionally equivalent fragments in the selected transaction path serves as a mechanism for increasing or optimizing the availability of the IT structure along the selected transaction path.

3.5.4 Server Consolidation

Server consolidation is a special type of IT structure optimization which can be applied only to IT structures including software programs. The number of servers in an IT structure can be determined by examining the results of the IT structure's getPrimitiveComposition( ) method.

Class Program, included in the IT class hierarchy, in addition to all the other properties and methods inherited or specific to class Program, possesses the property serverNum which contains the number of the hardware server within the IT structure where the software program described by a particular instance of the class Program, is running. To perform the server consolidation, serverNum property must be declared an optimization control parameter. More generally, an identifier of a hardware server may be an optimization control parameter, wherein serverNum is a special case of said identifier. Thus the optimization procedure by changing the parameter serverNum (or the identifier of the hardware server) will change the allocation of the software programs to the hardware servers, and will finally produce the optimal allocation. To preserve the consistency of the IT structure, getOptimizationF( ) method must verify that an attempted allocation is allowed in terms of platform compatibility and co-existence with other software programs running on a particular hardware server. If the attempted allocation is not allowed, the method throws an appropriate exception: ITExceptionIncompatiblePlatform, ITExceptionIncompatiblePrograms, or ITExceptionInvalidProgramAllocation.

The getOptimizationF( ) method, as applied to server reallocation, recalculates parameters that may have changes as a result of the server reallocation, such as:

the CPU and RAM capacity on the hardware servers affected by the move of a software program from one hardware server to another; and the response time, availability and TCO of all the elements. The servers with no software programs installed are removed from the configuration.

3.5.5 Load Balanced Groups and Redundant Hardware

Another special type of IT structure optimization deals with load balanced groups and multiple hardware devices of the same type connected to the same subnet(s), e.g. firewalls, load balancers. Since the redundancy is not needed in order to provide the functionality of redundant hardware devices (e.g. IP packet filtering for firewalls, or IP packet routing for load balancers), it is assumed that the devices can only be made redundant to satisfy either availability or response time requirements. The same applies to the load balanced groups of hardware servers.

To allow for the optimization of load balanced groups and redundant hardware, the absence or presence of each redundant hardware device or load balanced hardware server being described by a binary variable such as an is Present property of 0 or 1 if not present or present, respectively. Thus, the binary variable (e.g., the is Present property) is an optimization control parameter. The binary variable may be initialized to being not present or present (e.g., the is Present property may be initialized with the value of 1) for all the servers and devices in the initial configuration. The optimization procedure determines the optimal value of the binary variable (e.g., whether 0 or 1 is optimal for is Present) in conjunction with the optimal values of the other control parameters.

getOptimizationF( ) method removes from the IT structure those hardware devices and servers for which the is Present property is equal to 0 (i.e., the binary variable indicates that such hardware device(s) are not present).

In one embodiment, the binary variable (e.g., the is Present property) may be assigned to any element of the target IT structure and serve as an optimization control parameter to permit the optimization procedure to delete said any element if the optimal value of the binary variable denotes that said any element is not present (e.g., the is Present property of said any element is 0).

In one embodiment, the binary variable (e.g., the is Present property) may be assigned to any hardware (e.g., a CPU of a hardware server) that is utilized by the elements of the target IT structure and serve as an optimization control parameter to permit the optimization procedure to delete said any hardware if the optimal value of the binary variable denotes that said any hardware is not present (e.g., the is Present property of said any element is 0).

3.6 Example

Figure 32:
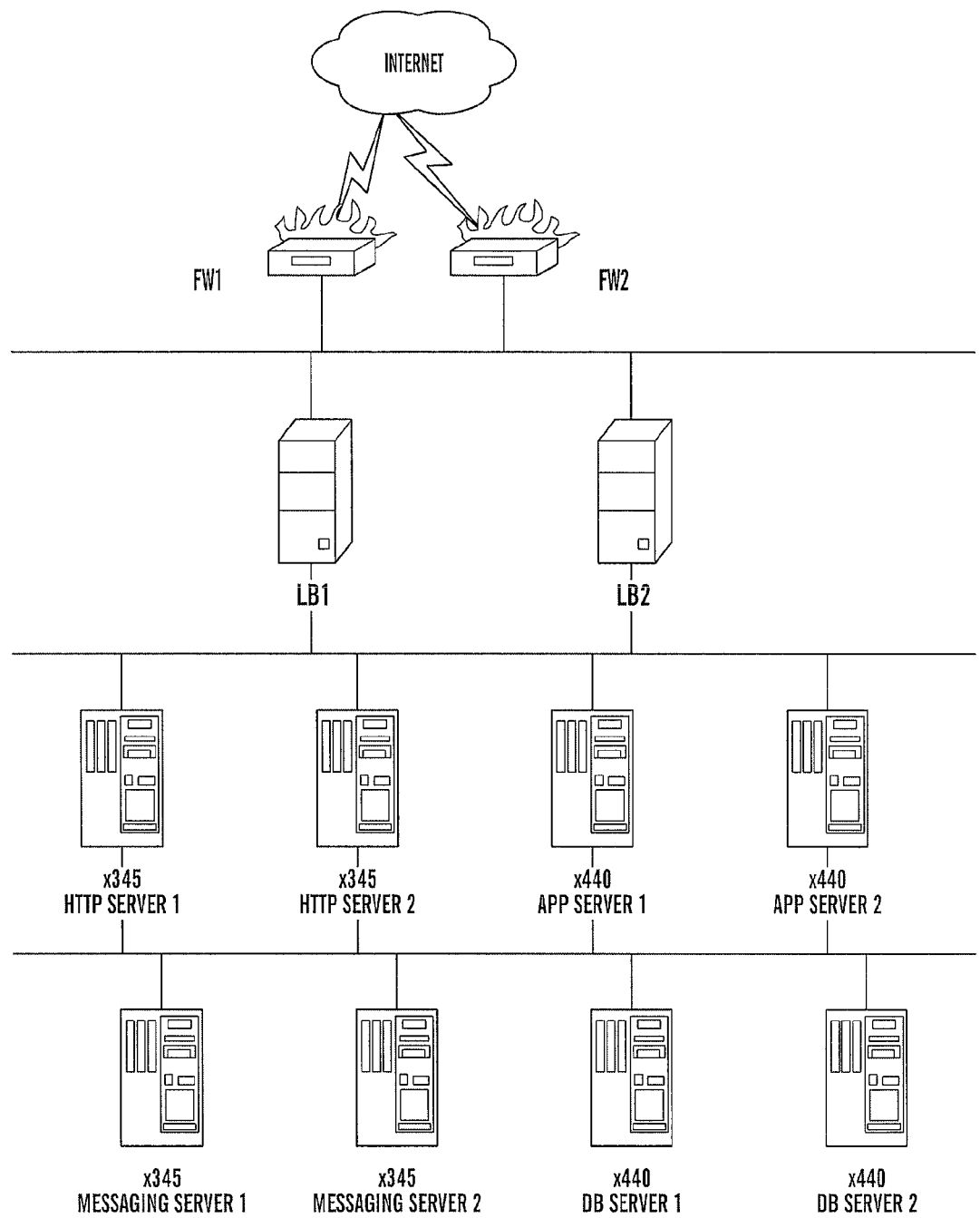
FIG. 32 is a network diagram depicting the IT Structure used as an example for illustrating an optimization algorithm, in accordance with embodiments of the present invention.

FIG. 32 is a network diagram depicting the IT structure used as an example for illustrating the optimization algorithm. The sample IT structure comprises the elements in FIG. 33, in accordance with embodiments of the present invention.

The task is to optimize TCO of the IT Structure while subject to the constraints of having response time better than 4 sec and availability better than 99%.

The goal function is calculated as the sum of TCOs of all the elements comprising the IT structure instance.

Control parameters and their corresponding domains are listed in FIG. 34, in accordance with embodiments of the present invention. In this example, all the characteristics of hardware servers listed for the initial IT structure, are selected as the control parameters, namely model, CPU, RAM. The allowed values for those control parameters are defined from either inventory of available hardware servers and/or from manufacturers documentation describing possible hardware configurations for a given hardware model.

Please note that derivative characteristics (e.g. response time) or characteristics which can not be directly changed by reconfiguring the hardware (e.g. availability) can not be used as control parameters. Nonetheless, the constraints in this example comprise the response time and availability.

In addition, software program placement on hardware server is also chosen as a control parameter in this example, by assigning to every software program a property containing an ID of the hardware server where this software program is installed. The allowed domain for this property includes all the hardware servers within the same subnet of the IT structure as the hardware server where the software program resides initially in the target IT structure.

Alternative methods may be employed to implement step 8006 of FIG. 30 for determining the control parameters set which minimizes the goal function; e.g. the specific combination of the control parameter values that minimizes may be determined by brute force; i.e., by calculating TCO for each possible combination of the parameter values listed in FIG. 34.

The resulting optimized IT structure is shown in FIG. 35, in accordance with embodiments of the present invention. The optimization was performed by listing all the possible combinations of control parameter values and selecting the IT structure with the minimal TCO resulted in:

1) removing extra firewall and load balancer, since all the constraints (in particular—availability) are still satisfied without redundant firewalls and load balancers, while TCO is reduced;

2) collocating HTTP server and Application server, since all the constraints (in particular—response time) are still satisfied without extra hardware servers dedicated to HTTP server program, while TCO is further reduced; and 3) removing 2 CPUs from Application Servers, since all the constraints (in particular—response time) are still satisfied with 2 CPUs, while TCO is yet further reduced.

4. Congruent and Similar IT Structures

IT structures A and B are composition-congruent if their primitive compositions are identical. Thus the relationship of being composition-congruent is defined for abstract IT structures and virtual IT structures but not for real IT structures, since real IT structures are resolved to the equipment serial numbers level and hence their primitive compositions can never be identical. The composition-congruent relationship is commutative; i.e., if IT structure A is composition-congruent to IT structure B, then IT structure B is composition-congruent to IT structure A.

Figure 28A:
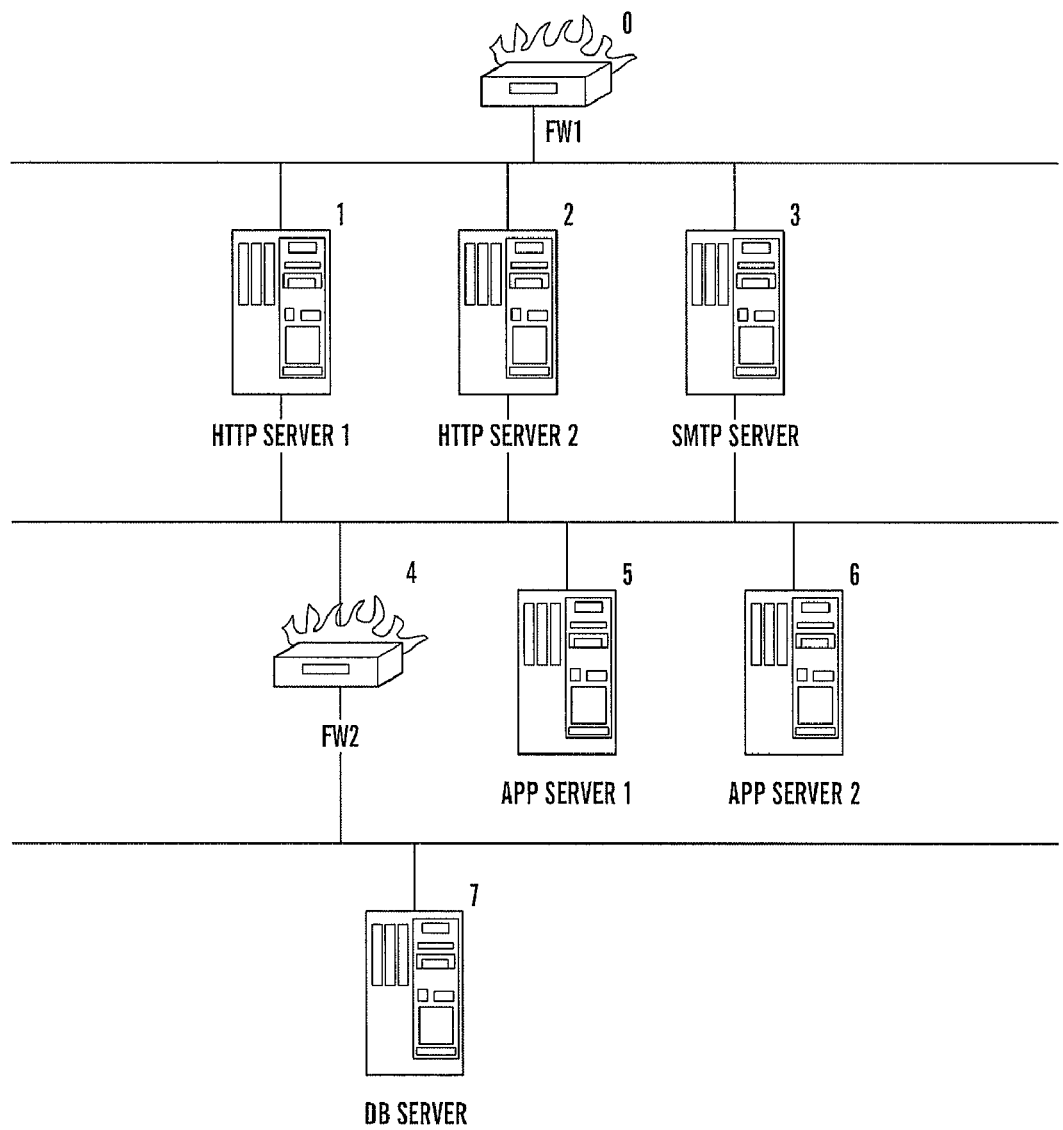
FIGS. 28A and 28B illustrate congruent IT Structures, in accordance with embodiments of the present invention.

IT structures A and B are interface-congruent if their sets of external IT interfaces are identical. Example: the IT structure consisting of the elements numbered 0, 1, 3, 4, and 7 in FIG. 28A is interface-congruent to the IT structure consisting of the elements numbered 0, 1, 2, 3 and 4 in FIG. 28B; the external IT interfaces of both IT structures are (not shown in FIGS. 28A and 28B): HTTP Server listening at TCP port 80 (HTTP protocol), and SMTP server listening at TCP port 25 (SMTP protocol). The interface-congruent relationship is defined for abstract, virtual, and real IT structures. The interface-congruent relationship is commutative; i.e., if IT structure A is interface-congruent to IT structure B, then IT structure B is interface-congruent to IT structure A.

IT structures A and B are functionally congruent if their sets of functions are identical. Example: the IT structure consisting of the elements numbered 0, 1, 3, 4, 5, and 7 in FIG. 28A is functionally-congruent to the IT structure consisting of the elements numbered 0, 1, 2, 3, 5, and 4 in FIG. 28B, assuming that the same software is running on the App Server 1, #5 (FIG. 28A), and App Server, #5 (FIG. 28B), and further assuming that the software running on other servers performs the standard auxiliary functions which are apparent from the label of the corresponding servers (e.g. "SMTP server", "HTTP server", etc.). For example, an SMTP server (software) would be able to send and receive e-mail using the standard SMTP protocol, irrespectively of the software (SMTP server) manufacturer; and an HTTP server would be able to forward HTTP requests and responses to and from an application server(s) irrespective of the software (HTTP server) manufacturer, etc. The functionally congruent relationship is defined for abstract, virtual, and real IT structures. The functionally congruent relationship is commutative; i.e., if IT structure A is functionally congruent to IT structure B, then IT structure B is functionally congruent to IT structure A.

IT structures A and B are topologically congruent with respect to IT relationship class R if their sets of IT relationships of class R and its subclasses are identical. Example: the IT structure consisting of the elements numbered 0, 1, 3, 4, and 7 in FIG. 28A is topologically-congruent with respect to IT relationship "connected via LAN" to the IT structure consisting of the elements numbered 0, 1, 2, 3 and 4 in FIG. 28B.

IT structures A and B are topologically congruent if their sets of IT relationships of any class are topologically congruent with respect to said any class (i.e., respect to any and all IT relationships defined on the structures A and B).

IT structures A and B are fully congruent if they are functionally congruent, composition-congruent, interface-congruent, and topologically congruent. Only abstract IT structures A and B can be fully congruent, since only abstract IT structures A and B can be composition-congruent. The fully congruent relationship is commutative; i.e., if IT structure A is fully congruent to IT structure B, then IT structure B is fully congruent to IT structure A.

Figure 28B:
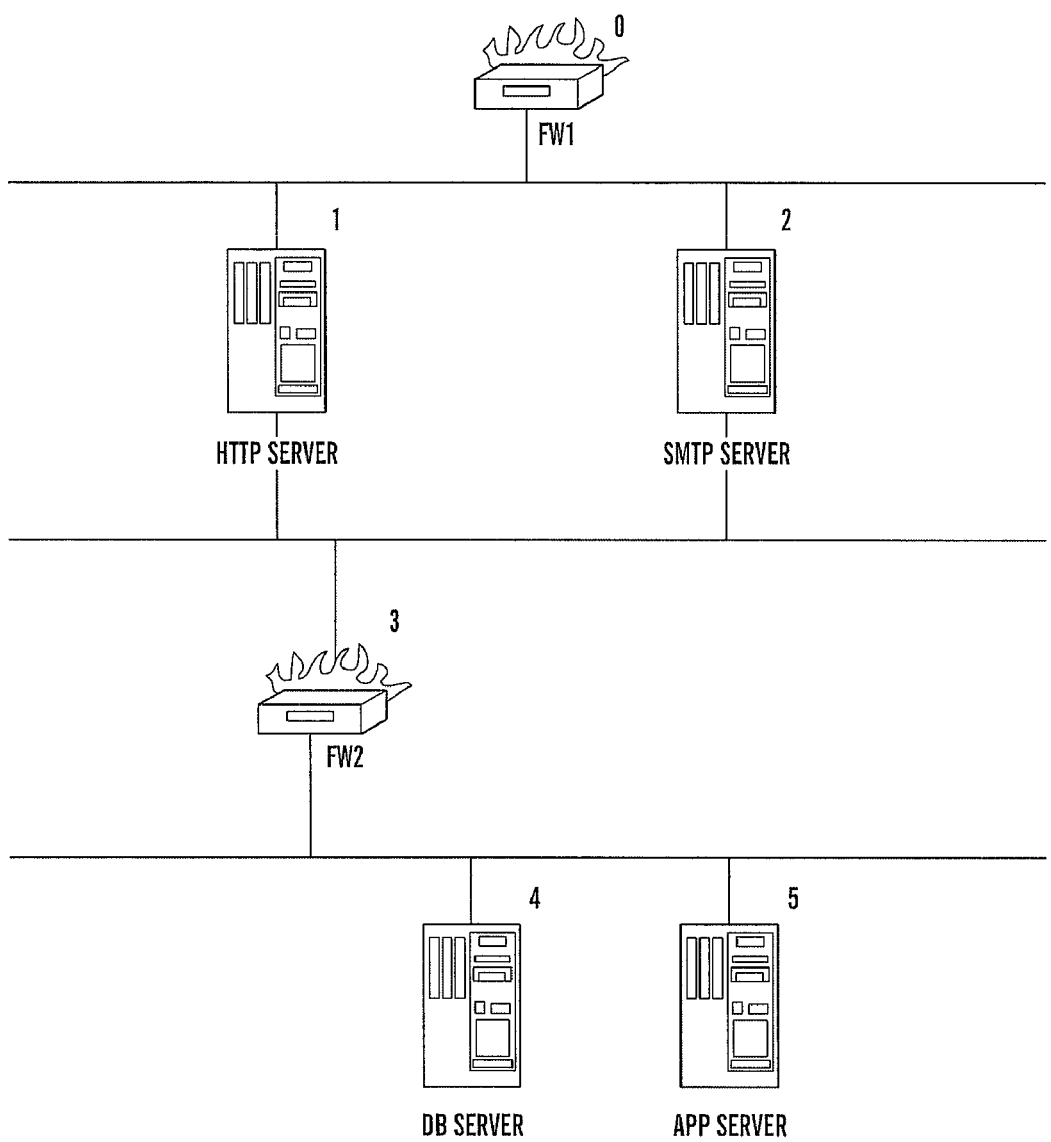

As an example, IT structure comprising the elements 0, 1, 3, 4 and 7 in FIG. 28A, and IT structure comprising the elements 0, 1, 2, 3 and 4 in FIG. 28B, are functionally congruent, composition-congruent, interface-congruent, topologically congruent, and hence, fully congruent.

A generalization of an IT structure is an abstract IT structure in which at least one real and/or virtual element of its primitive composition is replaced with the superclass (i.e., immediate parent, hierarchically) of the at least one real and/or virtual element (e.g.; a computer model F-50 is replaced with a p-series computer, wherein a p-series computer is a superclass of a model F-50 computer).

IT structures A and B are topologically similar with respect to IT relationship class R if A and B generalizations are congruent with respect to R, wherein A and B generalizations are produced by the replacement operation as described supra in the definition of a generalization of an IT structure. Example: Assuming that servers #1, 3, and 7 in FIG. 28A are p-Series computers, and that servers #1, 2, and 4 in FIG. 28B are x-Series computers, and further assuming that the firewall 4 in FIG. 28A is identical to the firewall 3 in FIG. 28B, then the IT structure consisting of the elements numbered 0, 1, 3, 4, and 7 in FIG. 28A is topologically-congruent with respect to IT relationship "connected via LAN" to the IT structure consisting of the elements numbered 0, 1, 2, 3 and 4 in FIG. 28B, since generalization for both x-Series computer and p-Series computer is a "computer", and therefore IT structures A and B are topologically similar.

IT structures A and B are composition-similar if A and B generalizations are composition-congruent.

IT structures A and B are similar if they are composition-similar and topologically similar.

IT structure A is partially congruent or partially similar to IT structure B if a subset of A is congruent or similar to IT structure B.

Note that any complex IT structure is partially congruent with any element of its composition.

4.1 IT Structure Consolidation 4.1.1 Definition of IT Structure Consolidation

IT structure consolidation is an approach to an efficient usage of computing resources in order to reduce the total number of IT structure elements (e.g. servers, firewalls, switches, etc.) that an enterprise (i.e., organization) requires, in response to a situation in which multiple, under-utilized IT structure elements (e.g. servers, firewalls, switches, etc.) consume considerably more resources (e.g. space, electric power, etc.) than their workload requires.

IT structure consolidation leads to higher IT elements utilization, and lower the total cost of ownership (TCO) of an enterprise IT infrastructure.

4.1.2. Total Cost of Ownership

The TCO of an IT structure instance may be expressed as the sum of TCOs of all the elements comprised by the IT structure instance, including hardware, software, and labor (operations and support).

In one embodiment, the cost of ownership (TCO) of an element of an IT structure may be calculated according to TCO=OTC+C*MRC, wherein OTC is a one-time charge, MRC is a monthly recurring charge, and C is a constant reflecting the element expected lifetime expressed in months (e.g. C=60 months).

In optimizing the TCO, the goal function G may also take into account the cost of performing the consolidation operations described in Section 4.1.3 infra, the cost of the hardware replacement, and the cost of integration in situations where the new IT structure interfaces change as the result of the consolidation. The goal function G is:

$$G = k_1 * TCO + k_2 * CC + k_3 * CH$$

G is the optimization goal function (see supra in Section 3.1 for a discussion of goal function).

TCO is the total cost of ownership of an enterprise IT structure (i.e., an IT structure of an enterprise) after the consolidation has been performed. An enterprise is an organization such, inter alia, a business organization, a government organization, a social organization, a non-profit organization, etc.

CC is the cost of performing consolidation operations.

CH is the cost of the new hardware required for the consolidation.

The coefficients $k_1$, $k_2$, $k_3$ are predetermined weights subject to $k_1$ being a real positive number and $k_2$, $k_3$ each independently being zero or a real positive number.

In one embodiment, G=TCO (i.e., $k_1=1$ and $k_2=0$, $k_3=0$).
In one embodiment, $G=k_1*TCO+k_2*CC$ (i.e., $k_2>0$, $k_3=0$).
In one embodiment, $G=k_1*TCO+k_3*CH$ ($k_2=0$, $k_3>0$).
In one embodiment, $G=k_1*TCO+k_2*CC+k_3*CH$ (i.e., $k_2>0$, $k_3>0$).

The coefficient $k_1$ may be chosen to factor in the discount rate (here, the term "discount rate" is used in the sense it is used in finance and economics). Where the expected lifetime of the IT structures being consolidated is considerable (e.g. more than three years), the discount rate may be taken into account. That can be done by assigning $k_1$ to a value of $C_1$ raised to a power of a number of years, wherein $C_1$ is equal to one minus a current discount rate (e.g. as published by Federal Reserve) rate, and wherein the number of years is equal to an expected lifetime of the IT structure being consolidated. For example, if the discount rate is 6% and the expected lifetime of the IT structure being consolidated is 4 years, then $k_1=0.94^4=0.78$. Alternatively, $k_1$ may be any positive real number.

The coefficient $k_2$ may reflect the risk associated with the performing the consolidation operations, expressed, e.g. as a value of $C_2$ divided by the probability of performing the consolidation project plan within budget and on time (i.e., by a specified date), wherein $C_2$ is a pre-set constant value of a real number in a range of 0 to 1. If $k_2=0$ then CC does not appear in the goal function. Alternatively, $k_2$ may be zero or any positive real number.

The coefficient $k_3$ may reflect the risk associated with the replacing the hardware in the course of consolidation, expressed, e.g. a value of $C_3$ divided by the probability of acquiring the new hardware within budget and on time (i.e., by a specified date), wherein $C_3$ is a pre-set constant value of a real number in a range of 0 to 1. If $k_3=0$ then CH does not appear in the goal function Alternatively, $k_3$ may be zero or any positive real number.

In one embodiment, the weights $k_1$, $k_2$, $k_3$ are chosen relative to one another to reflect the relative importance of TCO, CC, and CH in accordance with any importance criteria.

In one embodiment, weights $k_1$, $k_2$, $k_3$ may be normalized such that their sum is 1. For example, weights $k_1$, $k_2$, and $k_3$ may be chosen or selected as assigned values or according to a criteria, and then the weights $k_1$, $k_2$, $k_3$ are normalized such that their sum is 1 (i.e., $k_1$, $k_2$, $k_3$ are each divided by $k_1+k_2+k_3$). In another embodiment, weights $k_2$ and $k_3$ may be chosen or selected as assigned values or according to a criteria, and weight $k_1$ is calculated according to $k_1=1-k_2-k_3$.

4.1.3. Methods of IT Structure Consolidation

IT structure consolidation is performed by:

(a) for servers, by transferring software applications from server A to server B (in additions to the software applications already installed on server B), and then eliminating server A;

(b) for firewalls, by specifying ruleset of firewall A on firewall B (in additions to ruleset already configured on firewall B), and then eliminating firewall A;

(c) for switches, by configuring Virtual Local Area Networks (VLANs) of switch A on switch B (in addition to VLANs already configured on switch B), and then eliminating switch A, (d) for other types of IT elements, by configuring IT element B to perform the functions of IT element A, in additions to its own functions (provided that both IT elements are of the same type), and then eliminating IT element A.

Figure 21:
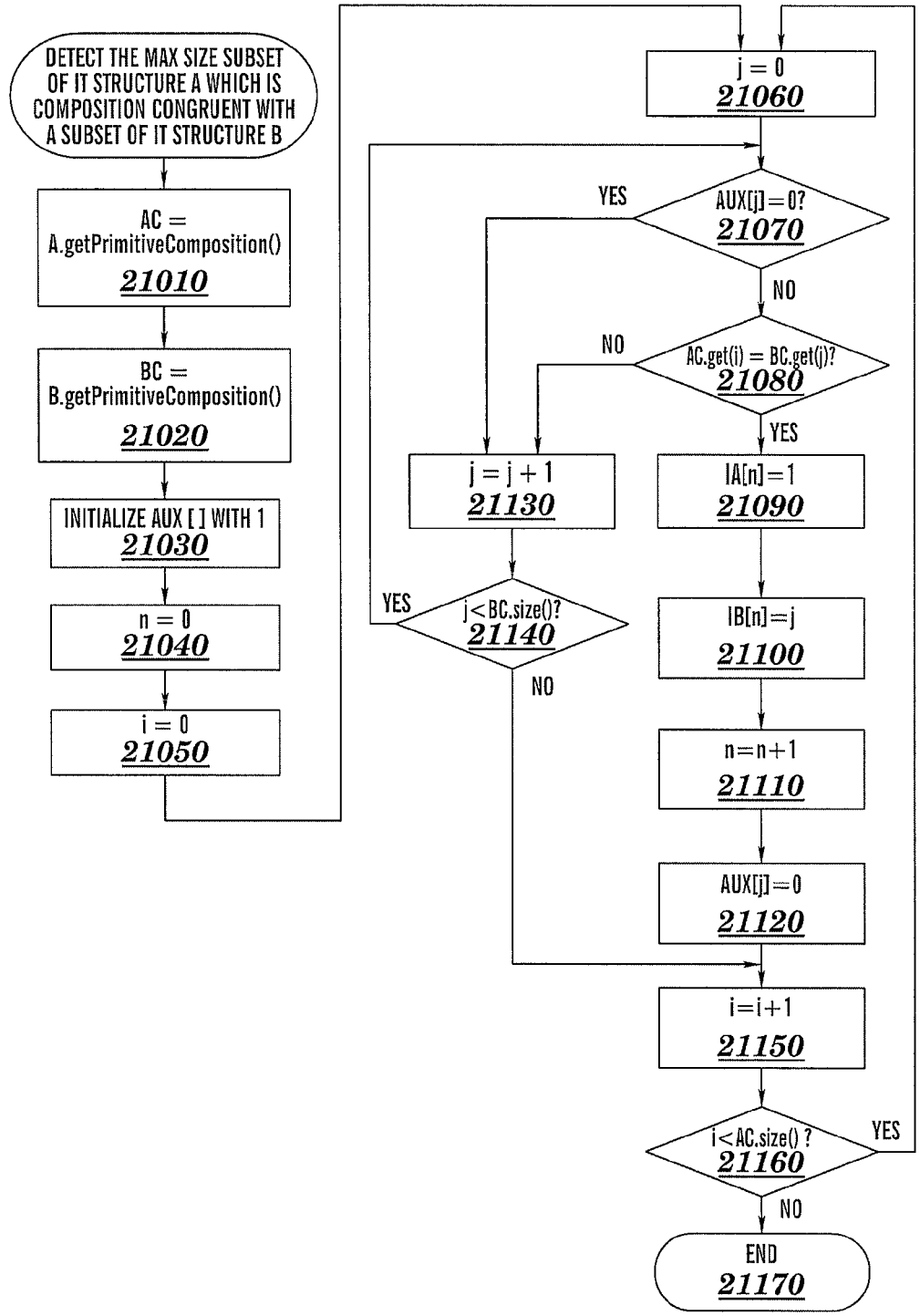
FIG. 21 is a flowchart depicting an algorithm for detecting a maximum size subset of a first IT Structure A which is composition congruent with a subset of a second IT Structure B, in accordance with embodiments of the present invention.

4.2 Identification of Congruent and Similar IT Structures 4.2.1 Detecting the Maximum Size Subset of IT Structure A Which is Composition Congruent With a Subset of IT Structure B FIG. 21 is a flowchart depicting an algorithm for detecting a maximum size subset of a first IT structure A which is composition congruent with a subset of a second IT structure B, in accordance with embodiments of the present invention. The method cycles through all the possible pairs of the elements of the two IT structures primitive compositions, and the matching pairs (if any) compose the composition congruent subset.

In step 21010, vector AC is initialized with the list of primitive composition elements of the first IT structure A.

In step 21020, vector BC is initialized with the list of primitive composition elements of the second IT structure B.

In step 21030, all the elements of an auxiliary array AUX are initialized with the value of 1. The auxiliary array will store the flags indicating whether the corresponding (i.e. with the same index) element of the primitive composition of the second IT structure B has already been matched with an element of the first IT structure A, and thus should not be used for future comparisons with the remaining elements of the first IT structure A.

In step 21040, the counter n is initialized with the value of 0. The counter will contain the number of the elements in the resulting composition congruent subset.

In step 21050, the counter i is initialized with the value of 0. The counter will contain index of the current element of the first IT structure A primitive composition.

In step 21060, the counter j is initialized with the value of 0. The counter will contain index of the current element of the second IT structure B primitive composition.

In step 21070, the method ascertains whether the current element of the primitive composition of the second IT structure B has already been matched with an element of the first IT structure A, by comparing the value of AUX[j] to 0. If the logical expression is evaluated as true, then the method branches to step 21130, otherwise the method proceeds to step 21080.

In step 21080 the method ascertains whether the next two elements of the two IT structures primitive compositions (AC.get(i) and BC.get(j)) are identical. If no, then the method branches to step 21130, otherwise the method proceeds to step 21090.

In step 21130, the counter j of the elements of the second IT structure B primitive composition is incremented, and in step 21140 the method loops back to step 21070 if the list of the primitive composition elements of the second IT structure B is not yet exhausted (i.e., if j is less than the size (IB.size( )) of IB). Otherwise the processing continues at step 21150.

In steps 21090-21100, the indexes i and j of the two matching elements of the two IT structures primitive compositions are assigned to the next elements of arrays IA and IB, respectively.

In step 21110, the counter n of the number of the elements in the resulting composition congruent subset is incremented.

In step 21120, the current element of the auxiliary array AUX[j] is assigned the value of 0, to indicate that the corresponding (i.e. with the same index) element of the primitive composition of the second IT structure B has already been matched with an element of the first IT structure A, and thus should not be used for future comparisons with the remaining elements of the first IT structure A.

In step 21150, the counter i of the elements of the first IT structure primitive composition is incremented, and in step 21160 the method loops back to step 21060 if the list of the primitive composition elements of the first IT structure is not yet exhausted (i.e., if i is less than the size (IA.size( )) of IA). Otherwise the method terminates at step 21170 and the arrays IA[ ] and IB[ ] contain the lists of indexes of the elements of the primitive composition of first and second IT structures A and B, respectively, which compose the composition congruent subset.

Figure 22:
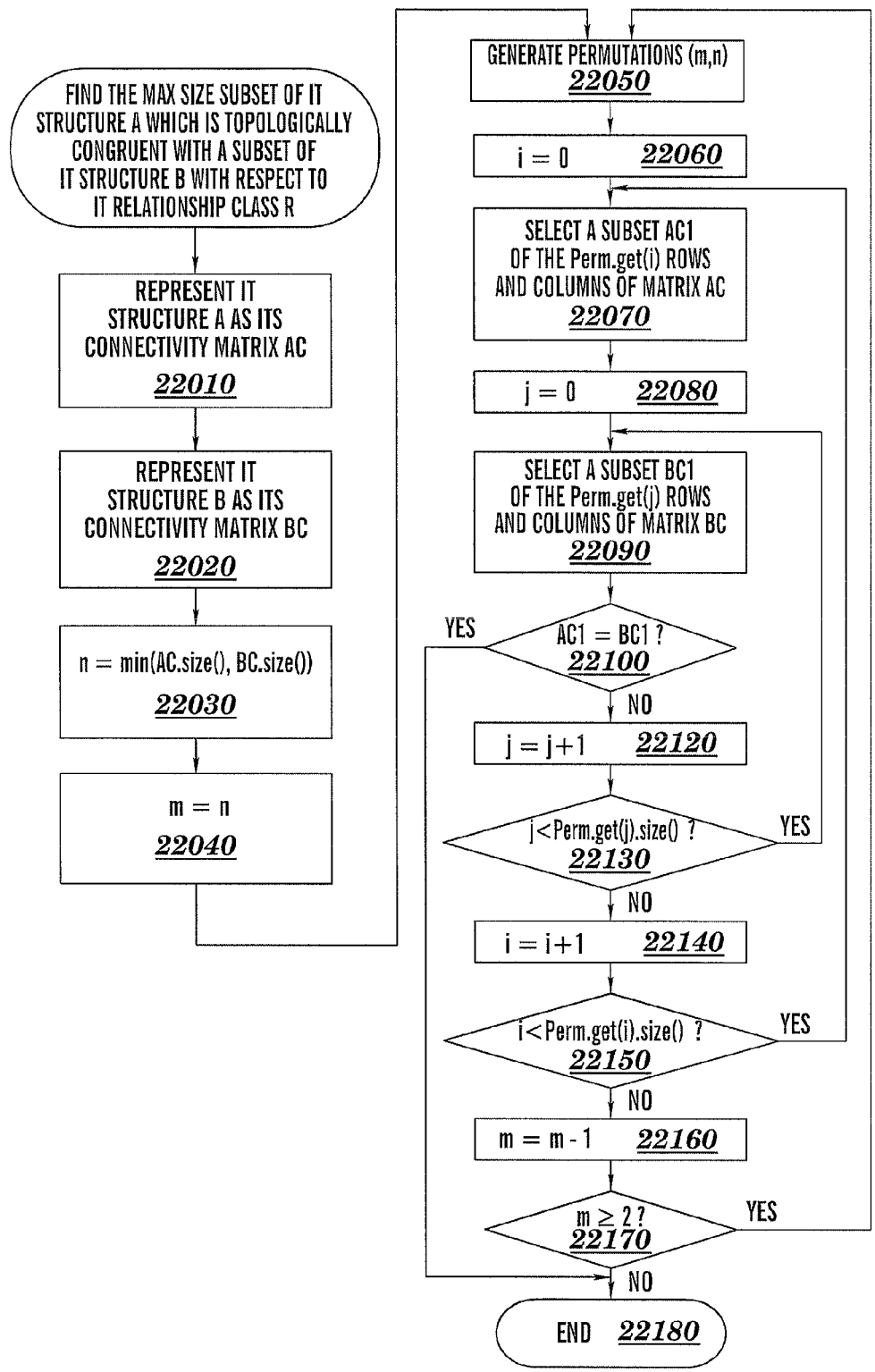
FIG. 22 is a flowchart depicting an algorithm for detecting a maximum size subset of IT Structure A which is topologically congruent with a subset of IT Structure B with respect to IT Relationship class R, in accordance with embodiments of the present invention.

4.2.2. Detecting the Maximum Size Subset of IT Structure A Which is Topologically Congruent With a Subset of IT Structure B With Respect to IT Relationship Class R FIG. 22 is a flowchart depicting an algorithm for detecting a maximum size subset of IT structure A which is topologically congruent with a subset of IT structure B with respect to IT relationship class R, in accordance with embodiments of the present invention.

For the purposes of the topological congruency analysis, graph representation of the two IT structures is used, wherein the graph vertices represent the elements of an IT structure, and the graph edges represent the IT relationships of class R between the IT structure elements. The relations between pairs of vertices of a graph representing an IT structure may be symmetric or asymmetric. In one embodiment, elements of the IT structure are connected to a network such that the relations between such elements are symmetric. In one embodiment, a software system of subprograms is hierarchically configured with parent-child relationships among the subprograms, wherein such with parent-child relationships are asymmetric. In one embodiment, a master-slave relationship between IT structure elements is asymmetric. In one embodiment, vertices of a graph representing an IT structure would not carry any additional properties beyond being the edges connection points. Thus, a graph corresponding to an IT structure can be represented as the graph's connectivity matrix wherein the matrix element (i, j) is equal to 1 if there exists an edge connecting the i-th vertex and the j-th vertex of the graph, and is equal to 0 otherwise. The diagonal matrix elements (i,i) are equal to 0. The matrix is square and symmetric.

From the definition of the topological congruency it follows that two IT structures A and B are topologically congruent if and only if there exist a permutation of the rows and columns of the first IT structure connectivity matrix A and a permutation of the rows and columns of the second IT structure connectivity matrix B such that the two resulting permuted matrices are identical, wherein a permutation is defined as an ordered subset of k<n elements (see description infra of step 22030 for definition of n).

The method cycles through all the possible permutations of the rows and columns of the connectivity matrices representing the two IT structures A and B, starting from the subsets of n elements, and then decrementing the number of elements at each step, unless a match is found, or unless the number of elements in the subset has reached 1.

Figure 23:
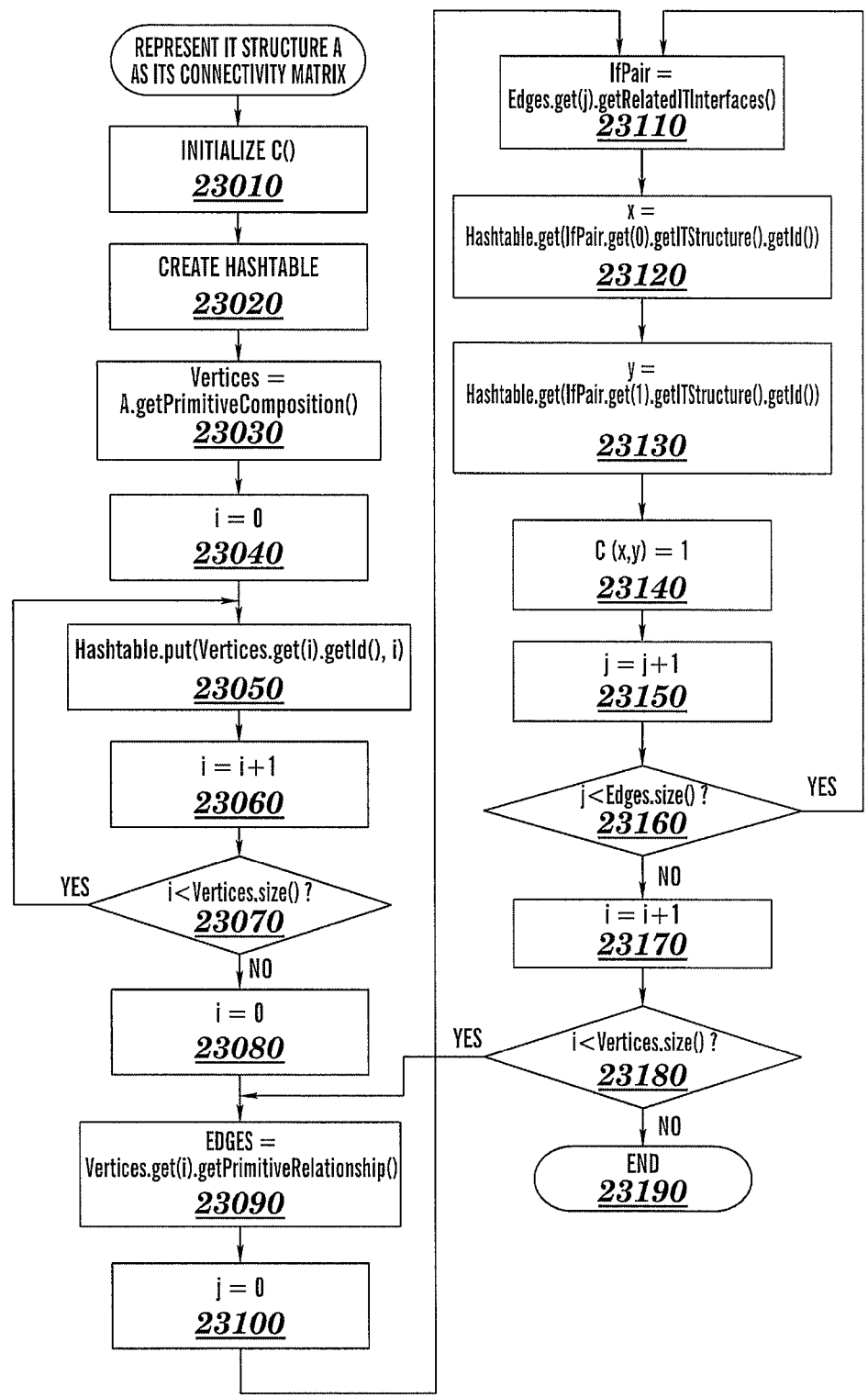
FIG. 23 is a flowchart depicting an algorithm for representing an IT Structure as its connectivity matrix, in accordance with embodiments of the present invention.

In steps 22010-22020, the two IT structures A and B are represented as their respective connectivity matrices AC and BC, respectively, using the method described in Section 4.2.4.1 infra in conjunction with FIG. 23 for representing an IT structure as its graph's connectivity matrix.

In step 22030, integer n is initialized with the value of minimum of the two matrices' sizes (i.e., AC.size( ) and BC.size( ) for first and second IT structure connectivity matrices AC and BC, respectively).

In step 22040, the counter m is initialized with the value of n. At every step of the method, the counter will store the size of the two IT structures subsets being generated and compared.

Figure 24:
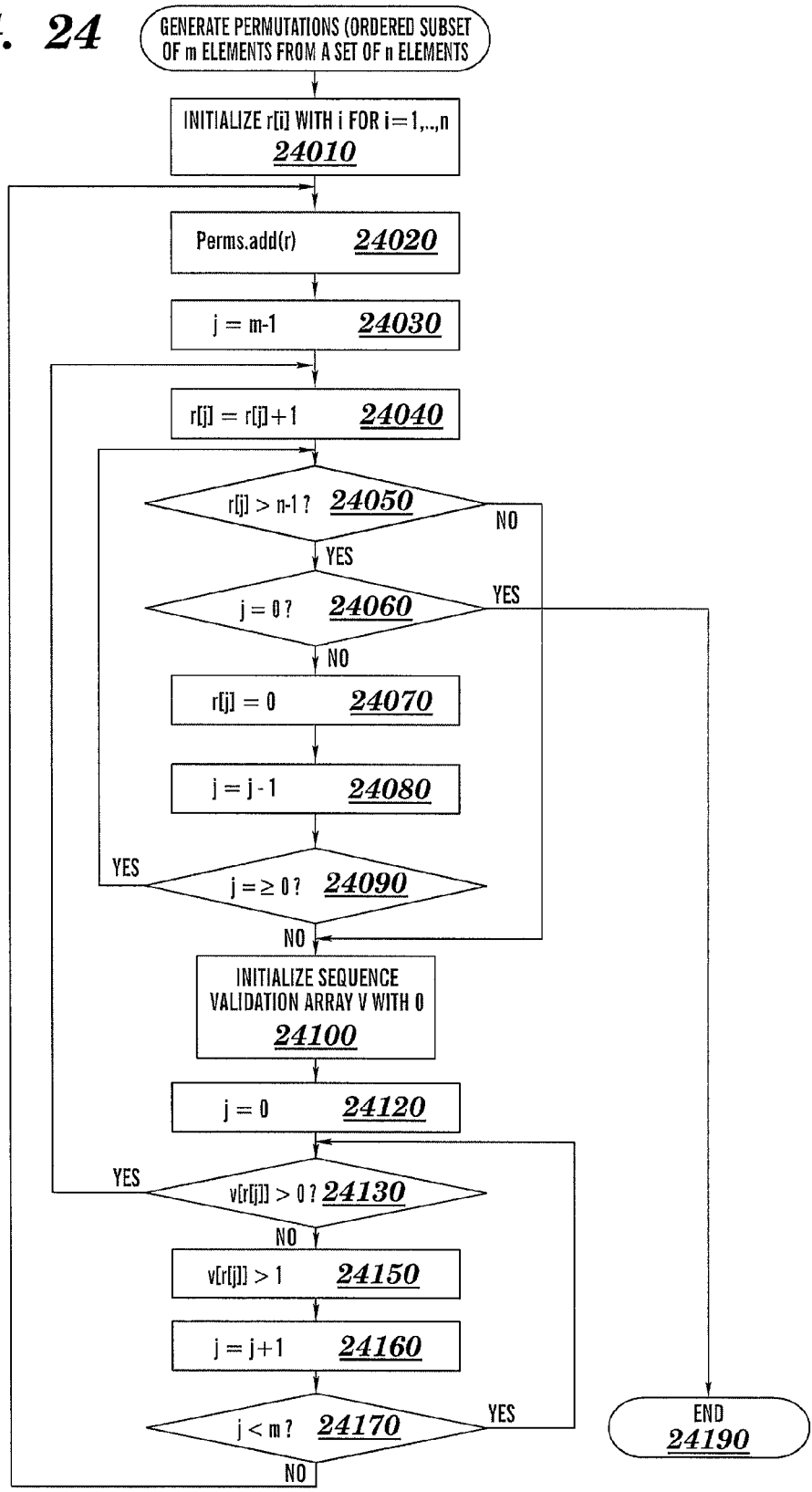
FIG. 24 is a flowchart depicting an algorithm for generating permutations of m elements from a set of n elements, in accordance with embodiments of the present invention.

In step 22050, all the possible permutations (m,n) of m elements from the list of n elements are generated, using the method described in Section 4.2.4.2 infra in conjunction with FIG. 24 for generating permutations of m elements from a set on n elements, and the resulting permutations are stored in the vector Perm, so that i-th element of the vector Perm is a vector containing the indices of the elements composing the i-th permutation.

In step 22060, the counter i is initialized with the value of 0. The counter i indexes the permutation from the list of permutations generated in step 22050, to be used to produce a subset AC1 of the first IT structure connectivity matrix AC.

Figure 25:
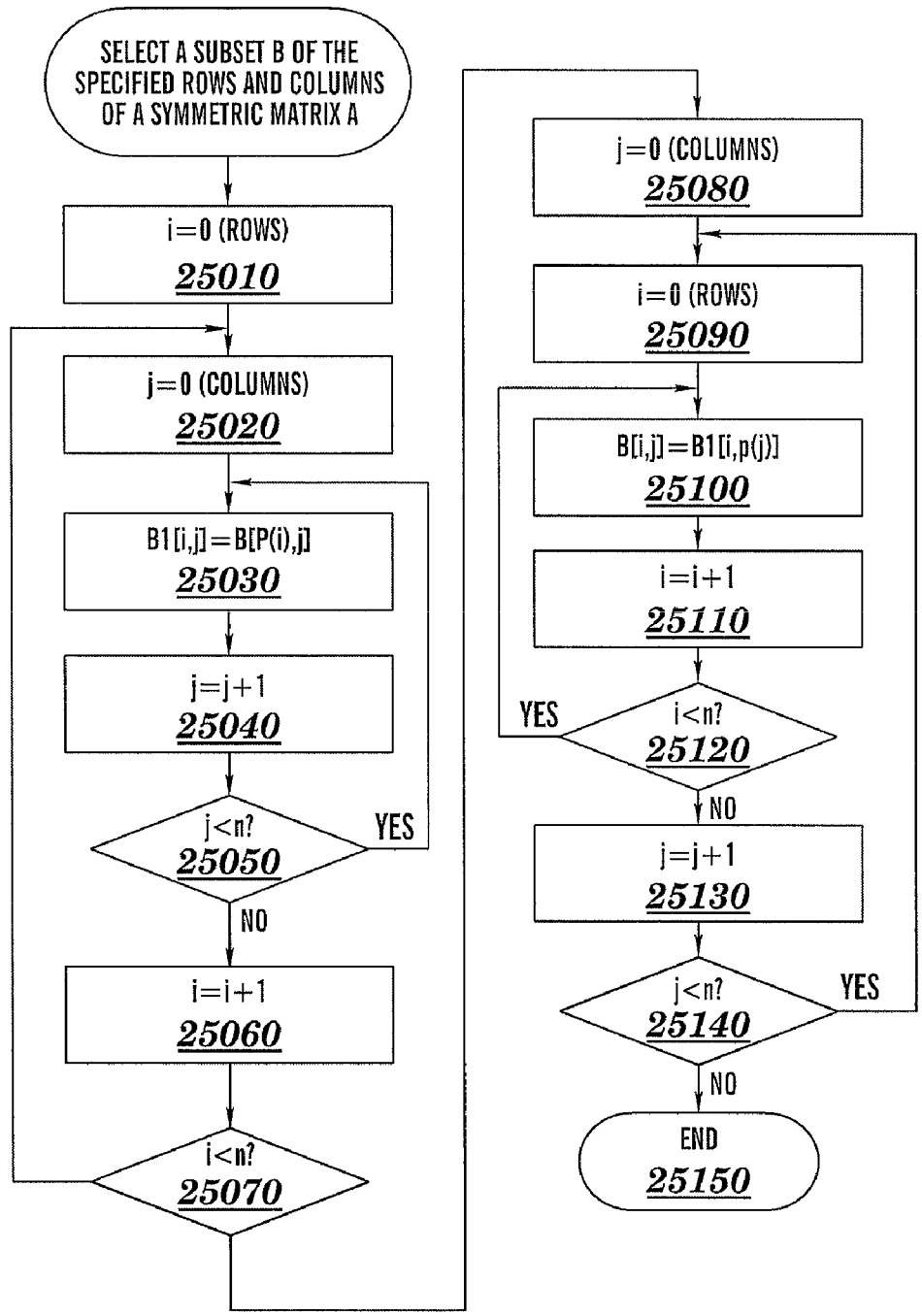
FIG. 25 is a flowchart depicting an algorithm for generating a subset of specified rows and columns of a symmetric connectivity matrix, in accordance with embodiments of the present invention.

In step 22070, the subset AC1 of the first IT structure connectivity matrix AC is generated using the method described in Section 4.2.4.3 infra in conjunction with FIG. 25 for generating a subset of specified rows and columns of a symmetric connectivity matrix, wherein the subset AC1 is defined by the i-th permutation from the list of all possible permutations generated in step 22050.

In step 22080, the counter j is initialized with the value of 0. The counter j indexes the permutation from the list of permutations generated in step 22050, to be used to produce a subset BC1 of the second IT structure connectivity matrix. BC.

In step 22090, a subset BC1 of the second IT structure connectivity matrix BC is generated using the method described in Section 4.2.4.3 infra in conjunction with FIG. 25 for generating a subset of specified rows and columns of a symmetric connectivity matrix, wherein the subset BC1 is defined by the j-th permutation from the list of all possible permutations generated in step 22050.

In step 22100, the method ascertains whether the two subsets, AC1 and BC1 calculated in steps 2070 and 2090, are identical. If yes, the subsets are topologically congruent, and the method terminates. Otherwise, the method proceeds to step 22110.

In step 22120, the counter j of the permutations of the rows and columns of the second IT structure B connectivity matrix is incremented, and in step 22130 the method loops back to step 22090 if the list of the permutations is not yet exhausted (i.e., if j is less than the number of permutations Perm.get(j).size( )).

In step 22140, the counter i of the permutations of the rows and columns of the first IT structure A connectivity matrix is incremented, and in step 22150 the method loops back to step 22070 if the list of the permutations is not yet exhausted (i.e., if i is less than the number of permutations Perm.get(i).size( )).

In step 22160, the counter m of the size of the two IT structures subsets is decremented, and in step 22170 the method loops back to step 22050 if the value of the counter m exceeds 1. Otherwise, the method terminates in step 22180.

4.2.3. Ascertaining Whether IT Structure A is Interface Congruent With IT Structure B The method compares the sets of external interfaces of the two IT structures. By definition, two IT structures are interface congruent if their sets of external interfaces are identical.

Figure 26:
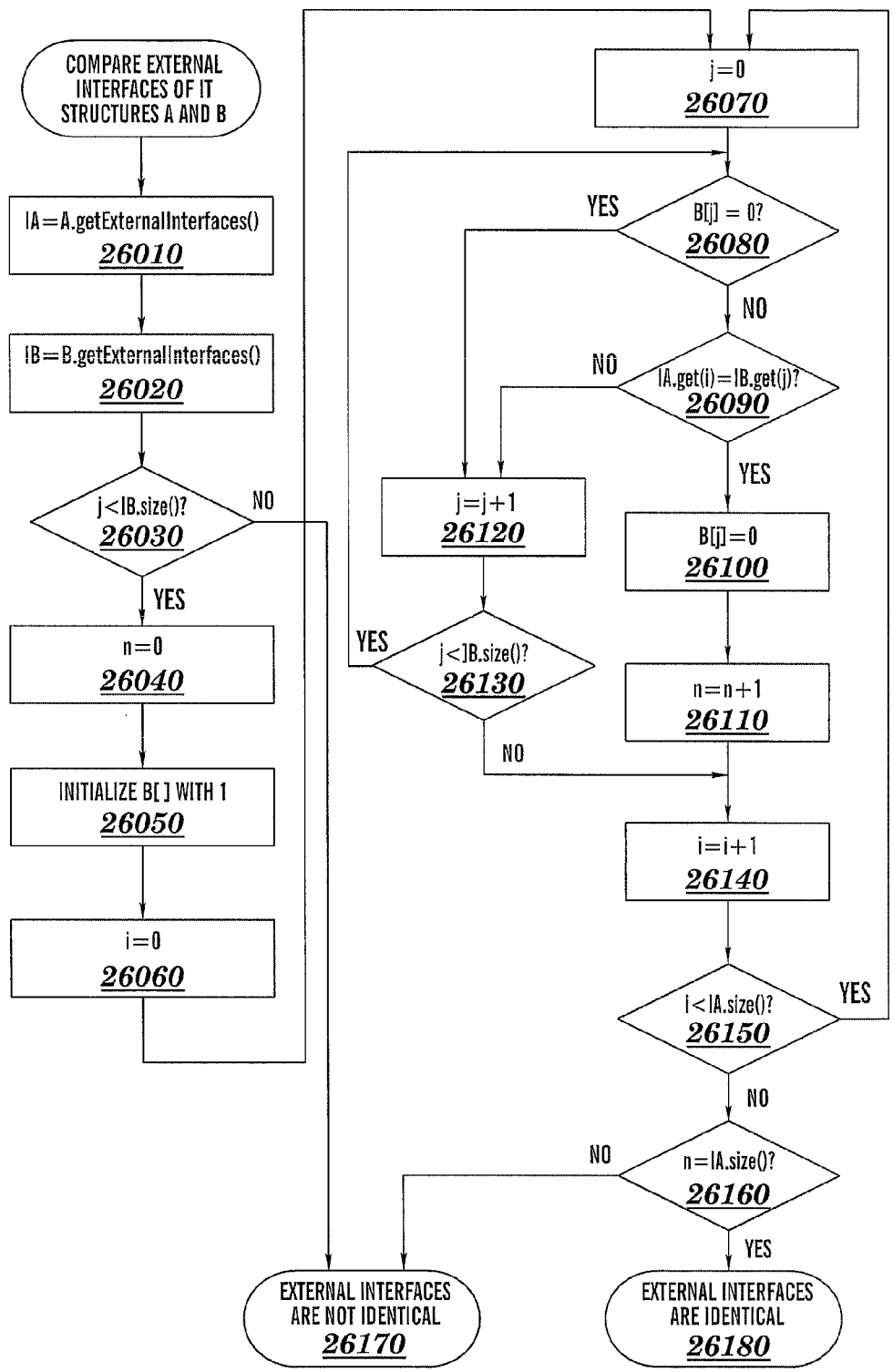
FIG. 26 is a flowchart depicting an algorithm for comparing external interfaces of IT Structures A and B, in accordance with embodiments of the present invention.

FIG. 26 is a flowchart depicting an algorithm for comparing external interfaces of IT structures A and B, in accordance with embodiments of the present invention.

Figure 27:
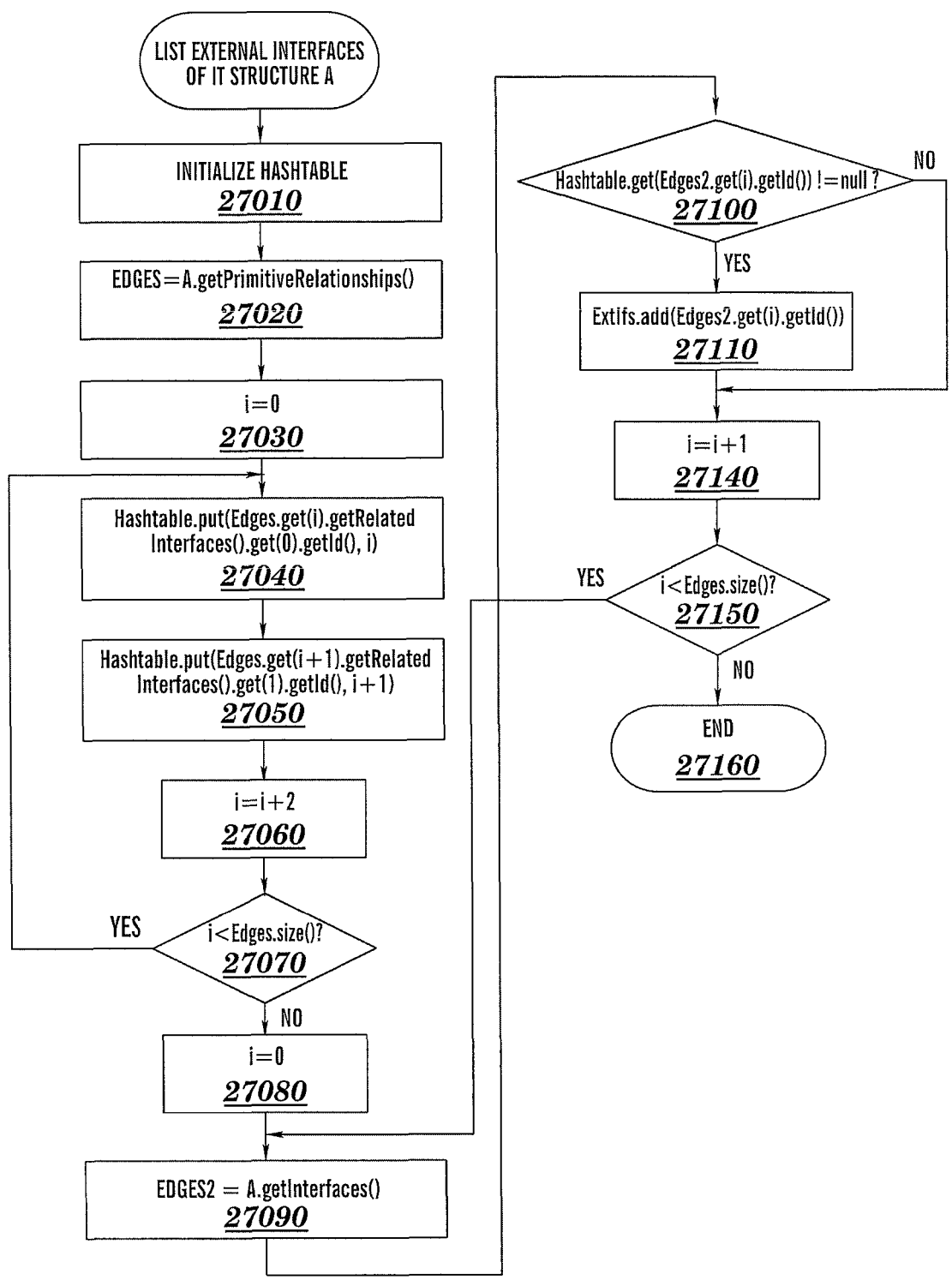
FIG. 27 is a flowchart depicting an algorithm for determining a list of external interfaces of an IT structure, in accordance with embodiments of the present invention.

In step 26010, vector IA is initialized with the list of external interfaces of the first IT structure A, using getExternalInterfaces( ) as defined and discussed supra in Section 2.2.1 and as implemented in the algorithm of FIG. 27, discussed infra, for determining a list of external interfaces of an IT structure.

In step 26020, vector IB is initialized with the list of external interfaces of the second IT structure B.

In step 26030, the method ascertains that the sizes IA.size( ) and IB.size( ) of the two interface lists IA and IB, respectively, are identical. If yes, the method proceeds to step 26040, otherwise the method branches to step 26170 and terminates.

In step 26040, the counter n is initialized with the value of 0. The counter n will contain the number of the matching elements of the two interface lists.

In step 26050, all the elements of an auxiliary array AUX are initialized with the value of 1. The auxiliary array B will store the flags indicating whether the corresponding (i.e. with the same index) element of the interface list (vector IB) of the second IT structure B has already been matched with an element of the interface list (vector IA) of the first IT structure A, and thus should not be used for future comparisons with the remaining interfaces of the first IT structure A.

In step 26060, the counter i is initialized with the value of 0. The counter i will contain index of the current element of the first IT structure interface list IA.

In step 26070, the counter j is initialized with the value of 0. The counter j will contain index of the current element of the second IT structure interface list IB.

In step 26080, the method ascertains whether the current element of the interface list of the second IT structure B has already been matched with an element of the interface list of the first IT structure A, by comparing the value of AUX[j] to 0. If the logical expression is evaluated as true, then the method branches to step 6120, otherwise the method proceeds to step 26090.

In step 26090 the method ascertains whether the current two elements (IA.get(i) and IB.get(j)) of the two IT structures interface lists are identical. If yes, the processing continues at step 26100, otherwise the method branches to step 26120.

In step 26120, the counter j of the elements of the second IT structure B interface list IB is incremented, and in step 26130 the method loops back to step 26080 if the list of the interfaces of the second IT structure IB is not yet exhausted (i.e., if j is less than the size (IB.size( )) of IB). The processing continues at step 26140.

In step 26100, the current element of the auxiliary array AUX[j] is assigned the value of 0, to indicate that the corresponding (i.e. with the same index) element of the interface list of the second IT structure B has already been matched with an element of the interface list of the first IT structure A, and thus should not be used for future comparisons with the remaining interfaces of the first IT structure A.

In step 26110, the counter n of the number of the matching interfaces is incremented. The method proceeds to step 26140.

In step 26140, the counter i of the elements of the first IT structure A interface list is incremented, and in step 26150 the method loops back to step 26070 if the list of the interfaces of the first IT structure is not yet exhausted (i.e., if i is less than the size (IA.size( )) of IA).

In step 26160 the method ascertains whether the value of counter n of matching interfaces is equal to the number of interfaces (IA.size( )) in the interface list of the first IT structure A. If yes, the method terminates in step 26180 with the result of the two interface lists IA and IB being identical; otherwise, the method terminates in step 26170 with the result of the two IT structure interface lists being not identical.

FIG. 27 is a flowchart depicting an algorithm for determining a list of external interfaces of an IT structure A, in accordance with embodiments of the present invention.

The method constructs an auxiliary hash table (i.e. a table which maps keys to values, see http://java.sun.com/j2se/1.3/docs/api/java/util/Hashtable.html) wherein each interface of the vector of primitive relationships of the IT structure primitive composition is put into the auxiliary hash table. Then the method cycles through the elements of the IT structure interfaces returned by getInterfaces( ) method (see Section 2.1.1), and attempt to find each of those interfaces in the auxiliary hash table. The interfaces not found in the auxiliary hash table are external interfaces of the IT structure A.

In step 27010, the auxiliary hash table is created and initialized.

In step 27020, vector Edges is initialized with the elements of the IT structure primitive relationships.

In step 27030, the counter i of the hash table elements is initialized with 0.

In step 27040, i-th element of the hash table is initialized to map counter i to the value of the unique identifier of the 0-th element of the vector of interfaces belonging to the i-th primitive relationship of the IT structure. The unique identifier is returned by getID( ) as described supra in Section 2.2.1.

In step 27050, i-th element of the hash table is initialized to map counter i+1 to the value of the unique identifier of the 1-st element of the vector of interfaces belonging to the (i+1)-th primitive relationship of the IT structure. The unique identifier is returned by getID( ) as described supra in Section 2.2.1.

In step 27060, the counter i of the hash table elements is incremented by 2, and in step 27070 the method loops back to step 27040 if the list of the IT structure primitive relationship elements is not yet exhausted (i.e., if i is less than the size of the Edges vector, as denoted by Edges.size( )).

In step 27080, the counter i of the IT structure interfaces is initialized with 0.

In step 27090, vector Edges2 is assigned the value of the interfaces vector for IT structure A. The vector of interfaces is returned by getInterfaces( ) described supra in Section 2.2.1.

In step 27100, the method ascertains whether i-th element of the vector of the IT structure interfaces (denotes as Edges2) is found in the auxiliary hash table. If the condition is not satisfied, the method branches forward to step 27140, otherwise the processing continues in step 27110.

In step 27110, i-th element of the vector of interfaces of the IT structure is added to the vector of external interfaces of the IT structure, denoted as ExIfs.

In step 27140, the counter i of the IT structure interfaces is incremented, and in step 27150 the method loops back to step 27090 if the list of the IT structure interfaces is not yet exhausted (i.e., if i is less than Edges2.size( )), wherein Edges2.size( ) denotes the number of elements in the Edges2 vector).

Otherwise, the method terminates in step 27160.

4.2.4. Auxiliary Methods 4.2.4.1. Representing an IT Structure as Its Graph's Connectivity Matrix The method constructs an auxiliary hash table (i.e. a table which maps keys to values, see http://java.sun.com/j2se/1.3/docs/api/java/util/Hashtable.html) wherein each element of the IT structure primitive composition is put into the auxiliary hash table with the index equal to its index in the primitive composition vector. Then the method cycles through the elements of the IT structure primitive composition (vertices of the graph), and then through the primitive relationships of every primitive composition elements. The edges of the graph represent the relationships. The vertices connected by an edge are the two related interfaces of the edge. For the two related interfaces of each edge, the corresponding IT structures' indexes in the hash table serves as the connectivity matrix's row and column index respectively, and the corresponding matrix's element is assigned the value of 1.

FIG. 23 is a flowchart in depicting an algorithm for representing an IT structure as its connectivity matrix, in accordance with embodiments of the present invention.

In step 23010, the connectivity matrix C( ) is initialized with zeroes.

In step 23020, the auxiliary hash table is created.

In step 23030, vector Vertices is initialized with the elements of the IT structure primitive composition.

In steps 23040-23070, the auxiliary hash table is initialized. In step 23040, the counter i of the hash table elements is initialized with 0.

In step 23050, i-th element of the hash table is initialized to map counter i to the value of the unique identifier of the i-th element of the IT structure primitive composition. The unique identifier is returned by getID( ) as described supra in Section 2.2.1.

In step 23060, the counter i of the hash table elements is incremented, and in step 23070 the method loops back to step 23050 if the list of the IT structure primitive composition elements is not yet exhausted (i.e., if i is less than the size of the Vertices vector, as denoted by Vertices.size( )).

In step 23080, the counter i of the IT structure primitive composition elements is initialized with 0.

In step 23090, vector Edges is assigned the value of the primitive relationships vector for i-th vertex. The primitive relationships vector is returned by getPrimitiveRelationships as described supra in Section 2.2.1.

In step 23100, the counter j of the graph edges is initialized with the value of 0.

In step 23110, vector IfPair is assigned the value of the related interfaces for the j-th edge (Edges.get[j].getRelatedITInterfaces ( )).

In steps 23120-23130, integers x and y are assigned the values of the hash table indices associated with the IT structures corresponding to the first and second IT interface from the pair of related interfaces for the j-th edge.calculated in step 23110, respectively.

In steps 23120 and 23110 the method get(i) returns i-th element of a vector; the method getITStructure returns the IT structure to which the given IT interface belongs; the method getID returns a real IT structure's unique identifier, as described in Section 2.2.1 supra.

In step 23140, the (x, y) element of the resulting connectivity matrix is assigned the value of 1.

In step 23150, the counter j of the graph edges is incremented, and in step 23160 the method loops back to step 23110 if the list of the graph edges is not yet exhausted (i.e., if j is less than Edges.size( )), wherein Edges.size( ) denotes the number of elements in the Edges vector.

In step 23170, the counter i of the of the IT structure primitive composition elements is incremented, and in step 23180 the method loops back to step 23110 if the list of IT structure primitive composition elements is not yet exhausted (i.e., if i is less than Vertices.size( ), wherein Vertices.size( ) denotes the number of elements in the Vertices vector). Otherwise, the method terminates in step 23190.

4.2.4.2 Generating Permutations (Ordered Subsets of m Elements From a Set of n Elements)

The method generates ordered permutations of m elements from a set of n elements by cycling through m-digit integers represented in a positional numeral system with the radix of n, and at each step incrementing the current integer value by 1 and ascertaining that it does not contain repetitive digits. The method terminates when all m decimal digits reach the value of n−1. The method returns vector Perm, i-th element of which is in turn a vector containing the indices of the elements composing the i-th permutation.

The parameters of the method are: integer n that contains the size of the list of elements from which the permutations are generated, and integer m that contains the size of the subsets to be generated.

FIG. 24 is a flowchart in depicting an algorithm for generating permutations of m elements from a set of n elements, in accordance with embodiments of the present invention.

In step 24010, each element of the auxiliary vector r[ ] containing the permutation being generated is initialized with the values equal to the element's index within the vector.

In step 24020, vector r is added to the resulting vector of permutation vectors Perm.

In step 24030, counter j of the permutation vector elements (i.e., positions within the generated integer) is assigned the value of m−1.

In steps 24040-24090, the generated m-digit integer is incremented.

In step 24040, the j-th element of vector r[ ] is incremented, (i.e., the integer being constructed is incremented by 1) and in step 24050 the method branches to step 24100 if the value of the j-th element of vector r[ ] is not more than n−1 (i.e., there is no overflow of the current position which would have caused the carry over to the next position). Otherwise, the current position has reached the value of radix-1, and in step 24060 the method ascertains whether the current digit position is the last one. If yes, the method terminates in step 24190; otherwise, the method proceeds to step 24070.

In step 24070 the current digit is set to 0.

In step 24080, the counter j of permutation vector elements (i.e., positions within the generated integer) is decremented, and in step 24090 the method loops back to step 24050 if the counter has not reached −1.

In steps 24100-24170, the generated integer is validated by ascertaining that it does not contain repetitive digits.

In step 24100, the auxiliary array V[ ] is initialized with zeroes. An element of the auxiliary array V[ ] will be assigned the value of 1 if the digit corresponding to the index of the array element has already been used in the generated integer.

In step 24120, the counter j of the positions within the integer being validated, is initialized with 0.

In step 24130 the method ascertains whether the j-th digit of the generated integer has already been used by comparing the r[j]-th element of the auxiliary array V[ ] to zero. If the digit has already been used, the method loops back to step 24040.

In step 24150, the j-th digit of the generated integer is marked as used by assigning the value of 1 to the r[j]-th element of the auxiliary array V[ ].

In step 24160 the counter j of the positions within the integer being generated, is incremented by 1, and in step 24170 the method loops back to step 24130 if not all the digits of the generated integer have been validated; otherwise, the method loops back to step 24020.

4.2.4.3 Generate a Subset of the Specified Rows and Columns of a Symmetric Connectivity Matrix The method produces a subset of a symmetric connectivity matrix by selecting from the initial matrix the rows and columns with indices are specified in vector P. The method first produces an auxiliary matrix by selecting the specified rows from the initial matrix, and then generates the final result by selecting the specified columns from the auxiliary matrix.

FIG. 25 is a flowchart in depicting an algorithm for generating a subset of specified rows and columns of a symmetric connectivity matrix, in accordance with embodiments of the present invention.

In steps 25010-25020, counters i and j of rows and columns, respectively, are initialized with 0.

In step 25030, the initial matrix elements of the row specified by the i-th element of the vector P, are copied to the elements of i-th row of the auxiliary matrix B1.

In step 25040, counter j of columns is incremented by 1, and in step 25050 the method loops back to step 5030 if there are columns remaining.

In step 25060, counter i of rows is incremented by 1, and in step 25070 the method loops back to step 25020 if there are rows remaining.

In steps 25080-25090, counters i and j of rows and columns, respectively, is initialized with 0.

In step 25100, the auxiliary matrix elements of the column specified by the j-th element of the vector P get copied to the j-th column of the resulting matrix B.

In step 25110, counter i of rows is incremented by 1, and in step 25120 the method loops back to step 25100 if there are rows remaining.

In step 25130, counter j of columns is incremented by 1, and in step 25140 the method loops back to step 25090 if there are columns remaining. Otherwise, the method terminates in step 25150.

4.3 Uses For Congruent and Similar Structures

Figure 29:
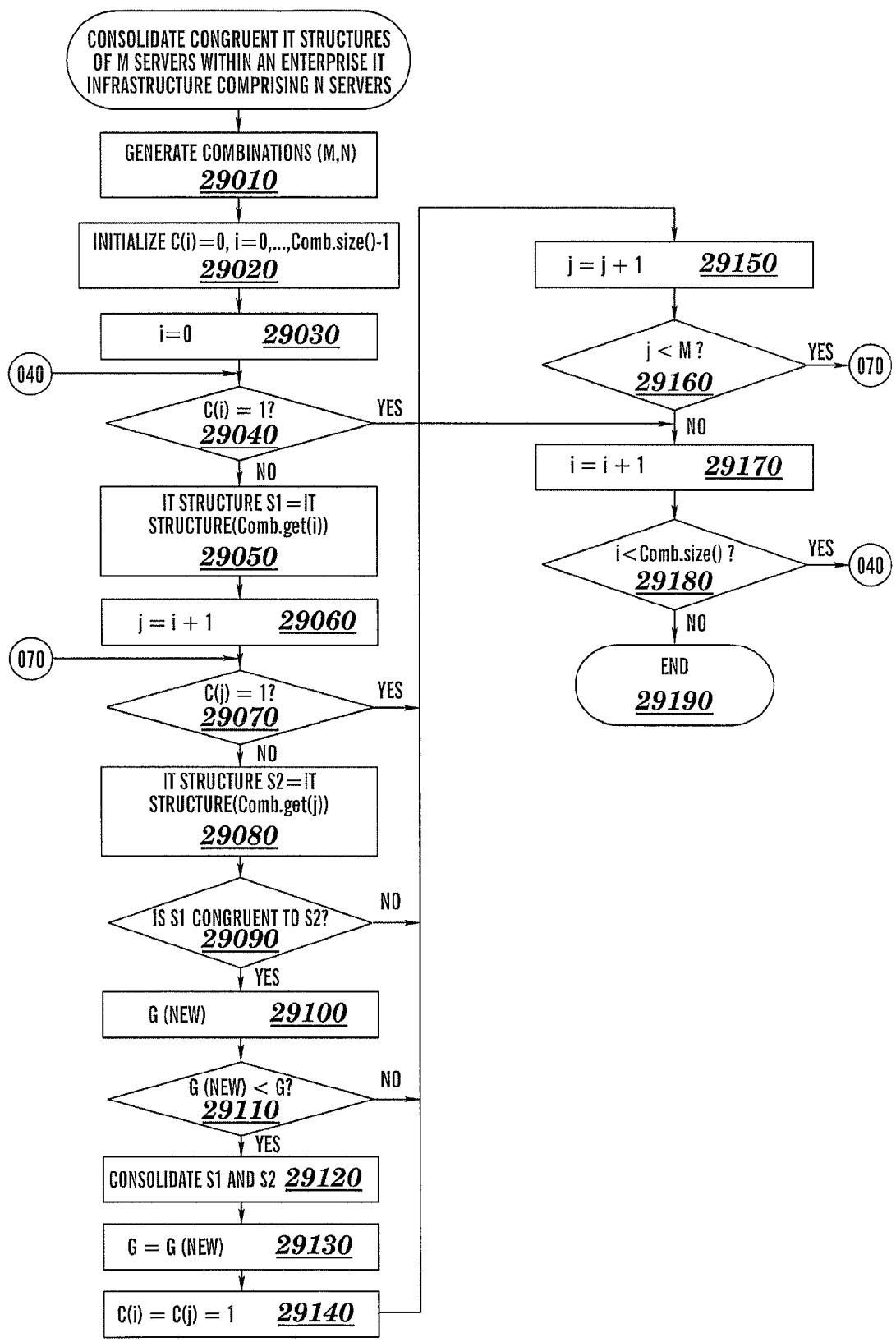
FIG. 29 is a flowchart depicting the method of consolidating servers, in accordance with embodiments of the present invention.

The relationships of being congruent or similar among two or more IT structures can be used for optimizing the total cost of ownership ('TCO') of the instances of those IT structures, or more generally of the goal function G, by performing one or more consolidation and/or substitution operations, as described infra in Section 4.3.2, in conjunction with FIG. 29.

4.3.1 Operations On Congruent and Similar IT Structures 4.3.1.1 Composition Congruent Interface Congruent, Topologically Congruent IT Structures Consolidation of the instances the two IT structures may be performed.

4.3.1.2 Topologically Congruent, or Topologically Similar With Respect to IT Relationship Class R, or Composition-Similar, or Similar IT Structures IT structure C should be defined as the abstraction of either of the two IT structures, and then consolidation of the instances the two IT structures may be performed.

4.3.2. Consolidation of Congruent IT Structures

The method of the present invention identifies congruent IT structures, and performs the consolidation and replacement operations on the identified structures, in accordance with the discussion supra of IT structure consolidation in Section 4.1, in order to reduce the TCO total cost of ownership, or more generally the goal function G, of an enterprise IT structure.

FIG. 29 is a flowchart depicting a method of consolidating servers, or more generally of consolidating an enterprise IT structure into a consolidated enterprise IT structure, in accordance with embodiments of the present invention. In the description of the method of FIG. 29, the phrase "specifically congruent" is selected from the group consisting of composition congruent, topologically congruent, interface congruent, composition congruent and topologically congruent, composition congruent and interface congruent, topologically congruent and interface congruent, and fully congruent. In one embodiment, input to the method of FIG. 29 may specify which of the preceding types of congruence characterizes said "specifically congruent". In one embodiment, which of the preceding types of congruence characterizes said "specifically congruent" is hard coded into program code that implements the method of FIG. 29.

The method takes an enterprise IT structure as its input parameter, and iterates thorough all possible combinations of M servers out of N servers, wherein M is a method input parameter specifying the number of servers comprised by the IT structure to be consolidated, and N is an input parameter that equals a number of servers comprised by the enterprise IT structure.

Generally, N is a positive integer of at least 2, and M is a positive integer of at least 1 subject to M<N. In one embodiment, N=2 and M=1. In one embodiment, N=3 and M=1 or 2. In one embodiment, N=4 and M=1, 2, or 3. In one embodiment, N=5 and M=1, 2, 3, or 4. In one embodiment, N=6 and M=1, 2, 3, 4, or 5. In one embodiment, N=7 and M=1, 2, 3, 4, 5, or 6. In one embodiment, N=8 and M=1, 2, 3, 4, 5, 6, 7, or 7. In one embodiment, N=9 and M=1, 2, 3, 4, 5, 6, 7, 8, or 9. In one embodiment, N=10 and M=1, 2, 3, 4, 5, 6, 7, 8, or 9. In various embodiments, N=20, 50, 100, 200, 500, or 1000. N is not limited to any of the preceding embodiments.

In one embodiment, M=N−1. In one embodiment N>3 and M=N−2. In one embodiment, N is an even integer and M=N/2. In one embodiment, N is an odd integer and M=(N+1)/2.

While the description of FIG. 29 refers to "servers", the IT structures being consolidated may generally include any other IT structure elements of other types, such as, inter alia, firewalls, switches, software, etc. Generally, N represents N elements of any combination of element types such that the enterprise IT structure being processed comprises the N elements. If L denotes the total number of elements that the enterprise IT structure consists of, then in one embodiment N=L and in another embodiment N<L. For the embodiment of N<L, one or more elements of the enterprise IT structure are being excluded from the consolidation process of FIG. 29.

The method of FIG. 29 considers consolidating the specifically congruent IT structures identified, and calculates the new value of goal function G using the formula for G (i.e., $G=k_1*TCO+k_2*CC+k_3*CH+k_4*CI$) discussed supra in Section 4.1.2.

As an example, IT structure A comprising the elements 0, 1, 3, 4 and 7 in FIG. 28A, and IT structure B comprising the elements 0, 1, 2, 3 and 4 in FIG. 28B, are functionally congruent, composition-congruent, interface-congruent, topologically congruent, and hence, fully congruent. Thus, assuming that both IT structures A and B belong to the enterprise, in one embodiment A and B can be consolidated using consolidation methods described in Section 4.1.3 supra, which leads to eliminating IT structure B, provided under (Section 4.1.2), that the TCO of IT structure A and the cost of consolidation operations is less than TCO of IT structures A and B. In various embodiments, other variants of the goal function G may be utilized in criteria for consolidating IT structures A and B.

Figure 36:
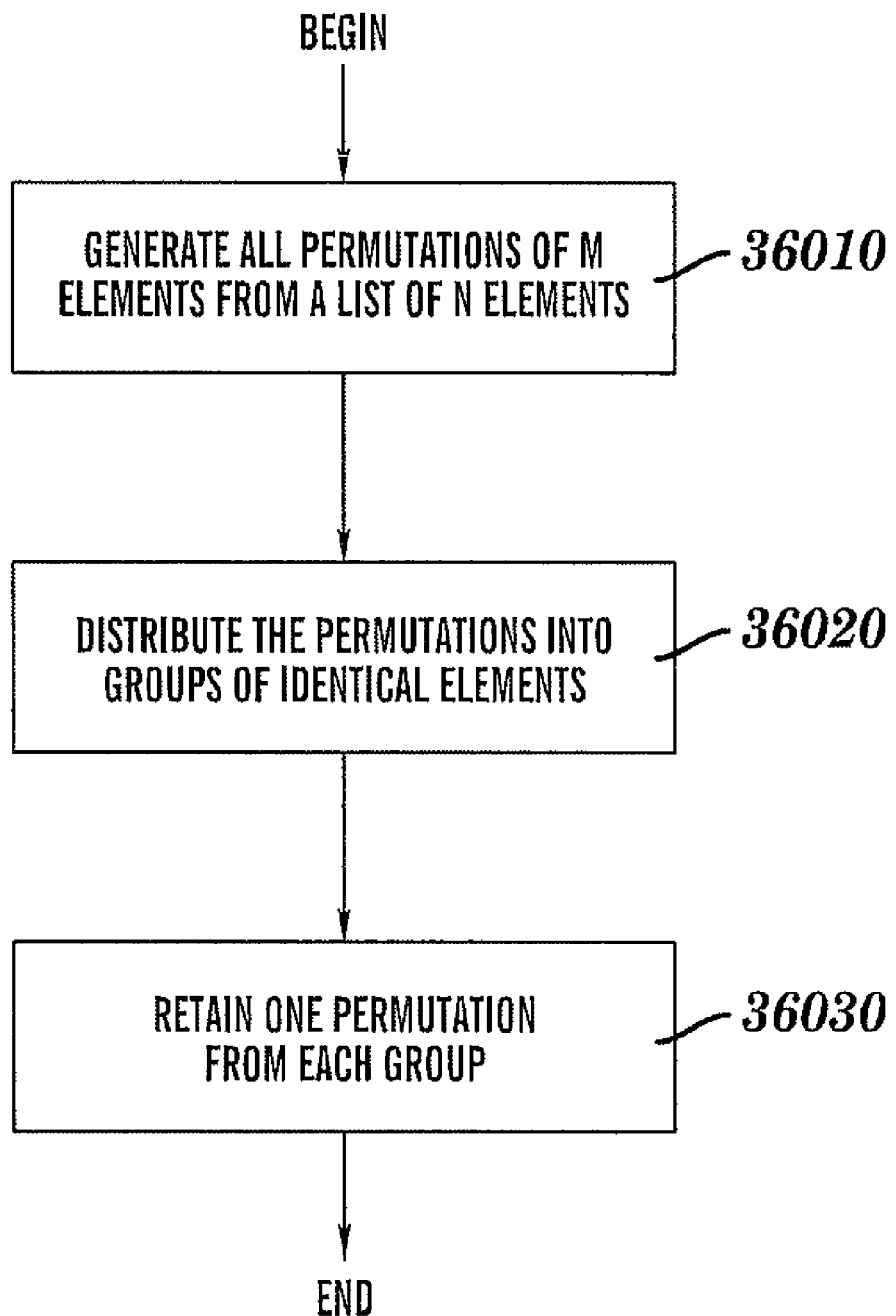
FIG. 36 is a flow chart depicting a method of generating combinations of M elements from a list of N elements (M<N), in accordance with embodiments of the present invention.

In step 29010, all the possible combinations (M, N) of M elements (servers) from the list of N elements (servers) are generated, using any known method of generating all combinations of M elements from N elements wherein M<N, and the resulting combinations are stored in the vector Comb, so that i-th element of the vector Comb is a vector containing the indices of the elements composing the i-th combination. For example, FIG. 36 is a flow chart depicting a method of generating all combinations of M elements from the list of N elements (M<N), in accordance with embodiments of the present invention. FIG. 36 comprises steps 36010, 36020, and 36030. In step 36010, the algorithm of FIG. 24 is used to generate all permutations of M elements from the set of N elements. Step 36020 distributes the permutation resulting from step 36010 into groups such that each group consists of those permutations consisting of the same identical M elements regardless of how these M elements are ordered in each permutation. Step 36030 retains any one permutation in each group and discards all other permutations (if any) in each group. The retained permutations from stepo 36030 collectively constitute all possible combinations of the M elements from the list of N elements, and indices of the elements of each of these combinations could be stored as a vector in a corresponding element of the vector Comb. Any other method could be used to generate all combinations of M elements from the list of N elements as would be accomplished by a person of ordinary skill in the art.

In step 29020 of FIG. 29, all the elements of an auxiliary array C( ) are initialized with the value of 1. The auxiliary array C( ) will store the flags indicating whether the IT structure produced by the corresponding (i.e. with the same index) element of the combinations vector Comb has already been consolidated (i.e., determined in step 29090, discussed infra, to be specifically congruent to the IT structure produced by another element of Comb), and thus must be excluded from the further consolidation attempts.

In step 29030, the counter i is initialized with the value of 0. The counter i indexes the combination from the list of combinations generated in step 29010.

In step 29040, the method ascertains whether the i-th element of the auxiliary array C( ) is equal to 1; i.e. whether the IT structure produced by the i-th element of the combinations vector Comb has already been consolidated (i.e., whether the IT structure produced by the i-th element of Comb was previously determined in step 29090, discussed infra, to be specifically congruent to the IT structure produced by another element of Comb), and thus is excluded from further consolidation attempts. If step 29040 determines that the IT structure produced by the i-th element of the combinations vector Comb has already been consolidated, then the method branches to step 29170; otherwise, the processing continues at step 29050.

In step 29050, the IT structure S1 is initialized with the servers whose indices are stored in the i-th element of the combinations vector Comb.

In step 29060, the counter j is initialized with the value of i+1. The counter j indexes the combination from the list of combinations generated in step 29010.

In step 29070, the method ascertains whether the j-th element of the auxiliary array C( ) is equal to 1; i.e. whether the IT structure produced by the j-th element of the combinations vector Comb has already been consolidated (i.e., whether the IT structure produced by the j-th element of Comb was previously determined in step 29090, discussed infra, to be specifically congruent to the IT structure produced by another element of Comb), and thus must be excluded from further consolidation attempts. If step 29070 ascertains that the j-th element of the auxiliary array C( ) is equal to 1, then the method branches to step 29150; otherwise, the processing continues at step 29080.

In step 29080, the IT structure S2 is initialized with the servers whose indices are stored in the j-th element of the combinations vector Comb.

In step 29090 the method ascertains whether the IT structure S1 is specifically congruent to the IT structure S2 (i.e., whether the IT structures S1 and S2 are specifically congruent with respect to each other) using the methods described in Sections 4.2.1-4.2.3 supra in conjunction with FIG. 21 (Sec. 4.2.1), FIG. 22 (Sec. 4.2.2), and FIG. 26 (Sec. 4.2.3).

If specifically congruent comprises composition-congruent in usage of FIG. 29, then the algorithm of FIG. 21 may be used to determine whether IT structures S1 and S2 are composition congruent, by specifying IT structures S1 and S2 as the input parameters to the algorithm of FIG. 21. If the maximum subset of IT structure S1 returned by the algorithm of FIG. 21 is the same as IT structure S1, then IT structures S1 and S2 are composition-congruent If specifically congruent comprises topologically-congruent in usage of FIG. 29, then the algorithm of FIG. 22 may be used to determine whether IT structures S1 and S2 are topologically-congruent, by specifying IT structures S1 and S2 as the input parameters to the algorithm of FIG. 22. If the maximum subset of IT structure S1 returned by the algorithm of FIG. 22 is the same as IT structure S1, then IT structures S1 and S2 are topologically-congruent.

If specifically congruent comprises interface congruent in usage of FIG. 29, then the algorithm of FIG. 26 may be used to determine whether IT structures S1 and S2 are interface congruent, by specifying IT structures S1 and S2 as the input parameters to the algorithm of FIG. 26. If the algorithm of FIG. 26 determines that the external interfaces of IT structure S1 are identical, then IT structures S1 and S2 are interface congruent.

If step 29090 ascertains that IT structure S1 is not specifically congruent to the IT structure S2, then the method branches to step 29150; otherwise, the processing continues at step 29100.

In step 29100, the method calculates the new goal function G(new) for the enterprise IT structure under the assumption that S1 and S2 would be consolidated, using the formula or G in Section 4.1.2 (i.e., $G(new)=k_1*TCO+k_2*CC+k_3*CH+k_4*CI$).

In step 29110, the method ascertains whether the value of G(new) calculated n step 29100 is less than the value of G of the enterprise IT structure. If step 29110 ascertains that the value of G(new) calculated n step 29100 is less than the value of G of the enterprise IT structure, then the processing continues at step 29120; otherwise the method branches to step 29150.

In step 29120, the instructions to consolidate IT structures S1 and S2 are generated.

In step 29130, the variable G is assigned the value of G(new) calculated in step 29100.

In step 29140, the elements C(i) and C(j) of the auxiliary array C( ) are assigned the value of 1 to indicate that the IT structures produced by the i-th and the j-th elements of the combinations vector Comb, have already been consolidated, and thus must be excluded from the further consolidation attempts.

In step 29150, the counter j of the combinations from the vector Combo, is incremented, and in step 29160 the method loops back to step 29070 if elements of vector Combo are not yet exhausted (i.e., if j is less than the size (Comb.size( )) of Comb).

In step 29170, the counter i of the combinations from the vector Combo, is incremented, and in step 29180 the method loops back to step 29040 if elements of vector Comb( ) are not yet exhausted (i.e., if i is less than the size (Comb.size( ) of Comb).

The method terminates in step 29190. The consolidated enterprise IT structure is stored in any memory device or any output device identified in FIG. 20 described infra.

5.0 Computer System

Figure 20:
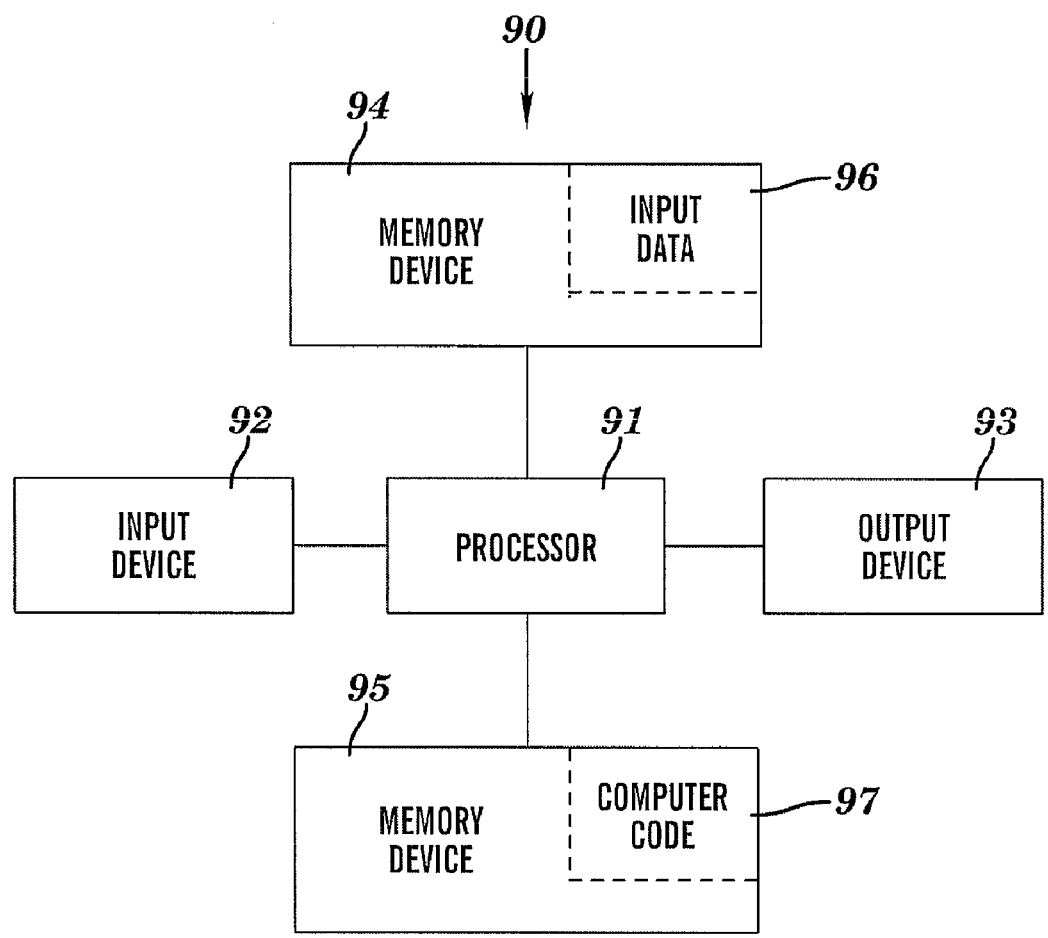
FIG. 20 illustrates a computer system used for implementing an IT Entity Model and associated processes, in accordance with embodiments of the present invention.

FIG. 20 illustrates a computer system 90 used for implementing an IT Entity Model and associated processes, for optimization of aspects of an IT structure, and for methods relating to IT congruent and similar structures, including any subset of the algorithms and methods described herein, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes one or more algorithms for implementing an IT Entity Model and associated processes, for optimization of aspects of an IT structure, and for methods relating to IT congruent and similar structures, including any subset of the algorithms and methods described herein. The processor 91 executes the computer code 97. The memory device 94 includes input data 96. The input data 96 includes input required by the computer code 97. The output device 93 stores or displays output from the computer code 97 for any algorithm described herein. Either or both memory devices 94 and 95 (or one or more additional memory devices not shown in FIG. 20) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for implementing an IT Entity Model and associated processes, for optimization of aspects of an IT structure, and for methods relating to IT congruent and similar structures, including any subset of the algorithms and methods described herein.

While FIG. 20 shows the computer system 90 as a particular configuration of hardware and software, any configuration of hardware and software, as would be known to a person of ordinary skill in the art, may be utilized for the purposes stated supra in conjunction with the particular computer system 90 of FIG. 20. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for consolidating N elements of an enterprise Information Technology (TT) structure that consists of L elements, L being a positive integer of at least 2, N being a specified positive integer of at least 2 subject to N not exceeding L, said method comprising:
    generating, by a hardware computer processor of a computer system, all combinations of M elements of the N elements, wherein M is a specified positive integer of at least 1 and less than N, each combination being an IT structure of the M elements that said each combination consists of;
    said processor ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent such that S1 and S2 have identical primitive compositions, topologically congruent with respect to an IT relationship class R having subclasses such that S1 and S2 have identical sets of IT relationships of class R and of the subclasses of class R, interface congruent such that S1 and S2 have identical sets of external IT interfaces, said composition congruent and said topologically congruent, said composition congruent and said interface congruent, said topologically congruent and said interface congruent, and said composition congruent and said topologically congruent and said interface congruent; and
    said processor consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure, a cost (CC) of performing consolidation operations for the pair P, and a cost (CH) of new hardware required for each said consolidating the pair P.

2. The method of claim 1, wherein said specifically congruent comprises said composition congruent.

3. The method of claim 1, wherein said specifically congruent comprises said topologically congruent.

4. The method of claim 1, wherein said specifically congruent comprises said interface congruent.

5. The method of claim 1, wherein said specifically congruent consists of said composition congruent and said topologically congruent and said interface congruent.

6. The method of claim 1, wherein $G = k_1 * TCO + k_2 * CC + k_3 * CH$, wherein $k_1$ is a real positive number, and wherein $k_2$ and $k_3$ are each independently zero or a real positive number.

7. The method of claim 6, wherein $k_1 = C_1$ raised to a power of a number of years, wherein $C_1$ is equal to one minus a current Federal Reserve discount rate, and wherein the number of years is equal to an expected lifetime of the enterprise IT structure.

8. The method of claim 6, wherein $k_2 = C_2$ divided by a probability of performing said consolidating the pair P within a specified budget and by a specified date, and wherein $C_2$ is a positive real number not exceeding 1.

9. The method of claim 6, wherein $k_3 = C_3$ divided by a probability of acquiring the new hardware within a specified budget and by a specified date, and wherein $C_3$ is a positive real number not exceeding 1.

10. The method of claim 6, wherein $k_2 > 0$ and $k_3 > 0$.

11. The method of claim 6, wherein $k_1 = 1$, $k_2 = 0$, and $k_3 = 0$.

12. The method of claim 6, wherein $k_2 > 0$ and $k_3 = 0$.

13. The method of claim 6, wherein $k_2 = 0$ and $k_3 > 0$.

14. The method of claim 1, wherein $N = L$.

15. The method of claim 1, wherein $N < L$.

16. A computer program product, comprising a computer readable hardware storage device having a computer readable program code stored therein, said computer readable program code configured to be executed by a hardware computer processor of a computer system to implement a method for consolidating N elements of an enterprise Information Technology (IT) structure that consists of L elements, L being a positive integer of at least 2, N being a specified positive integer of at least 2 subject to N not exceeding L, said method comprising:
    said processor generating all combinations of M elements of the N elements, wherein M is a specified positive integer of at least 1 and less than N, each combination being an IT structure of the M elements that said each combination consists of;
    said processor ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent such that S1 and S2 have identical primitive compositions, topologically congruent with respect to an IT relationship class R having subclasses such that S1 and S2 have identical sets of IT relationships of class R and of the subclasses of class R, interface congruent such that S1 and S2 have identical sets of external IT interfaces, said composition congruent and said topologically congruent, said composition congruent and said interface congruent, said topologically congruent and said interface congruent, and said composition congruent and said topologically congruent and said interface congruent; and
    said processor consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure, a cost (CC) of performing consolidation operations for the pair P, and a cost (CH) of new hardware required for each said consolidating the pair P.

17. A computer system comprising a hardware computer processor and a computer readable memory unit coupled to the processor, said memory unit containing instructions configured to be executed by the processor via the memory unit to perform a method for consolidating N elements of an enterprise Information Technology (IT) structure that consists of L elements, L being a positive integer of at least 2, N being a specified positive integer of at least 2 subject to N not exceeding L, said method comprising:
    said processor generating all combinations of M elements of the N elements, wherein M is a specified positive integer of at least 1 and less than N, each combination being an IT structure of the M elements that said each combination consists of:

said processor ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent such that S1 and S2 have identical primitive compositions, topologically congruent with respect to an IT relationship class R having subclasses such that S1 and S2 have identical sets of IT relationships of class R and of the subclasses of class R, interface congruent such that S1 and S2 have identical sets of external IT interfaces, said composition congruent and said topologically congruent, said composition congruent and said interface congruent, said topologically congruent and said interface congruent, and said composition congruent and said topologically congruent and said interface congruent; and said processor consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure, a cost (CC) of performing consolidation operations for the pair P, and a cost (CH) of new hardware required for each said consolidating the pair P.

18. A process for deploying computing infrastructure, said process comprising integrating computer-readable code into a computing system, wherein the code is configured to be executed by a hardware computer processor of the computing system to perform a method for consolidating N elements of an enterprise Information Technology (IT) structure that consists of L elements, L being a positive integer of at least 2, N being a specified positive integer of at least 2 subject to N not exceeding L, said method comprising:

generating all combinations of M elements of the N elements, wherein M is a specified positive integer of at least 1 and less than N, each combination being an IT structure of the M elements that said each combination consists of;

said processor ascertaining one or more pairs of combinations selected from said all combinations such that each ascertained pair consists of an IT structure S1 and an IT structure S2 which are specifically congruent with respect to each other, and wherein said specifically congruent is selected from the group consisting of composition congruent such that S1 and S2 have identical primitive compositions, topologically congruent with respect to an IT relationship class R having subclasses such that S1 and S2 have identical sets of IT relationships of class R and of the subclasses of class R, interface congruent such that S1 and S2 have identical sets of external IT interfaces, said composition congruent and said topologically congruent, said composition congruent and said interface congruent, said topologically congruent and said interface congruent, and said composition congruent and said topologically congruent and said interface congruent; and said processor consolidating at least one pair of combinations selected from said one or more pairs of combinations into a consolidated enterprise IT structure, wherein said consolidating each pair P reduces a goal function G that is a function of a total cost of ownership (TCO) of the enterprise IT structure, a cost (CC) of performing consolidation operations for the pair P, and a cost (CH) of new hardware required for each said consolidating the pair P.

19. The process of claim 18, wherein said specifically congruent comprises said composition congruent.

20. The process of claim 18, wherein said specifically congruent comprises said topologically congruent.

21. The process of claim 18, wherein said specifically congruent comprises said interface congruent.

22. The process of claim 18, wherein said specifically congruent consists of said composition congruent and said topologically congruent and said interface congruent.

23. The process of claim 18, wherein $G=k_1*TCO+k_2*CC+k_3*CH$, wherein $k_1$ is a real positive number, and wherein $k_2$ and $k_3$ are each independently zero or a real positive number.

24. The process of claim 23, wherein $k_1=C_1$ raised to a power of a number of years, wherein $C_1$ is equal to one minus a current Federal Reserve discount rate, and wherein the number of years is equal to an expected lifetime of the enterprise IT structure.

25. The process of claim 23, wherein $k_2=C_2$ divided by a probability of performing said consolidating the pair P within a specified budget and by a specified date, and wherein $C_2$ is a positive real number not exceeding 1.

26. The process of claim 23, wherein $k_3=C_3$ divided by a probability of acquiring the new hardware within a specified budget and by a specified date, and wherein $C_3$ is a positive real number not exceeding 1.

27. The process of claim 23, wherein $k_2>0$ and $k_3>0$.

28. The process of claim 23, wherein $k_1=1$ and $k_2=0$, and $k_3=0$.

29. The computer program product of claim 16, wherein $G=k_1*TCO+k_2*CC+k_3*CH$, wherein $k_1$ is a real positive number, and wherein $k_2$ and $k_3$ are each independently zero or a real positive number.

30. The computer system of claim 17, wherein $G=k_1 TCO+k_2*CC+k_3*CH$, wherein $k_1$ is a real positive number, and wherein $k_2$ and $k_3$ are each independently zero or a real positive number.

* * * * *